US012602910B2

(12) United States Patent
Wang et al.

(10) Patent No.: US 12,602,910 B2
(45) Date of Patent: Apr. 14, 2026

(54) METHOD FOR DETECTING DEFECT AND METHOD FOR TRAINING MODEL

(71) Applicants: BEIJING ZHONGXIANGYING TECHNOLOGY CO., LTD., Beijing (CN); BOE TECHNOLOGY GROUP CO., LTD., Beijing (CN)

(72) Inventors: Yaoping Wang, Beijing (CN); Zhaoyue Li, Beijing (CN); Haodong Yang, Beijing (CN); Meijuan Zhang, Beijing (CN); Dong Chai, Beijing (CN); Hong Wang, Beijing (CN)

(73) Assignees: Beijing Zhongxiangying Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 642 days.

(21) Appl. No.: 17/978,384

(22) Filed: Nov. 1, 2022

(65) Prior Publication Data

US 2023/0048386 A1 Feb. 16, 2023

Related U.S. Application Data

(63) Continuation-in-part of application No. 17/764,707, filed on Mar. 29, 2022.

(51) Int. Cl.
*G06V 10/776* (2022.01)
*G06T 7/00* (2017.01)
(Continued)

(52) U.S. Cl.
CPC .......... *G06V 10/776* (2022.01); *G06T 7/0004* (2013.01); *G06V 10/764* (2022.01);
(Continued)

(58) Field of Classification Search
None
See application file for complete search history.

(56) References Cited

U.S. PATENT DOCUMENTS

| 10,607,331 | B1 | 3/2020 | Adama et al. |
| 2019/0065979 | A1* | 2/2019 | Shao ...................... G06N 20/00 |

(Continued)

FOREIGN PATENT DOCUMENTS

| CN | 106645180 A | 5/2017 |
| CN | 108352339 A | 7/2018 |

(Continued)

OTHER PUBLICATIONS

Lipton et al., Thresholding Classifiers to Maximize F1 Score, May 14, 2014 (Year: 2014).*

(Continued)

*Primary Examiner* — Barbara D Reinier
(74) *Attorney, Agent, or Firm* — Calfee, Halter & Griswold LLP

(57) ABSTRACT

The present disclosure provides a method and device for detecting an image category. The method includes: acquiring a sample data set including a plurality of sample images labeled with a category, the sample data set including a training data set and a verification data set; training a deep learning model using the training data set to obtain, according to different numbers of training rounds, at least two trained models; testing the at least two trained models using the verification data set to generate a verification test result; generating, based on the verification test result, a verification test index; determining, according to the verification test index, a target model from the at least two trained models; and predict a to-be-tested image of the target object using the target model to obtain the category of the to-be-tested image.

20 Claims, 32 Drawing Sheets

Parameter configuration
*Site:
*Model keyword:
*Category for training: Select
Selected category: Category1、Category2、Category3、Category4、Category5、Category6、Category7、Category8
*Model number:
*Model type: Image classification model
*Image size: 500 688 854 1000 1200
*Total number of training rounds: 200000
*Number of rounds when learning rate descending: 8000 120000 150000
*Number of rounds when testing: 120000 150000 200000
Training reason: xxx
Complete Return

2500A

Model effect
Accuracy rate 87.5%
Recall rate 83%
F1 score 85.19%

| UID | Number of training rounds | Accuracy rate | Recall rate | F1 score |
|---|---|---|---|---|
| XX | 120000 | 0.9167 | 0.8152 | 0.8630 |
| XX | 150000 | 0.875 | 0.83 | 0.8519 |
| XX | 200000 | 0.875 | 0.856 | 0.8654 |

Return

(51) Int. Cl.
    *G06V 10/70*       (2022.01)
    *G06V 10/764*     (2022.01)
    *G06V 10/774*     (2022.01)
    *G06V 10/94*      (2022.01)

(52) U.S. Cl.
    CPC ............ *G06V 10/774* (2022.01); *G06V 10/87*
    (2022.01); *G06V 10/945* (2022.01); *G06T*
    *2207/20081* (2013.01)

(56) References Cited

U.S. PATENT DOCUMENTS

| | | | |
|---|---|---|---|
| 2019/0164055 A1 | 5/2019 | Ljung Larhed et al. | |
| 2020/0027009 A1* | 1/2020 | Khan | G06N 7/01 |
| 2020/0151573 A1* | 5/2020 | Das | G06N 3/04 |
| 2020/0349875 A1 | 11/2020 | Yawei et al. | |
| 2020/0380301 A1* | 12/2020 | Siracusa | G06F 18/2193 |
| 2023/0048386 A1 | 2/2023 | Wang et al. | |

FOREIGN PATENT DOCUMENTS

| | | | | |
|---|---|---|---|---|
| CN | 108802041 A | 11/2018 | | |
| CN | 108961238 A | 12/2018 | | |
| CN | 109143199 A | 1/2019 | | |
| CN | 109146873 A | 1/2019 | | |
| CN | 109559298 A | 4/2019 | | |
| CN | 109683360 A | 4/2019 | | |
| CN | 110020691 A | 7/2019 | | |
| CN | 110378887 A | 10/2019 | | |
| CN | 110675789 A | 1/2020 | | |
| CN | 111080633 A | 4/2020 | | |
| CN | 111160432 A | 5/2020 | | |
| CN | 111325744 A | 6/2020 | | |
| CN | 111340233 A | * 6/2020 | ............ | G06N 20/00 |
| CN | 111951212 A | 11/2020 | | |
| CN | 112990035 A | * 6/2021 | .......... | G06F 18/214 |
| WO | 2017096758 A1 | 6/2017 | | |
| WO | 2018090355 A1 | 5/2018 | | |

OTHER PUBLICATIONS

Search Report from European Application No. 21921830.2 dated Jul. 11, 2023.
Jiang et al. "Surface Defect Detection for Mobile Phone Back Glass Based on Symmetric Convolutional Neural Network Deep Learning", Appli. Science 2020, 10, 3621, 13 pgs.
International Search Report from PCT/CN2021/074263 dated Oct. 27, 2021.
Non-final OA of U.S. Appl. No. 17/764,707 dated Jul. 18, 2024.

* cited by examiner

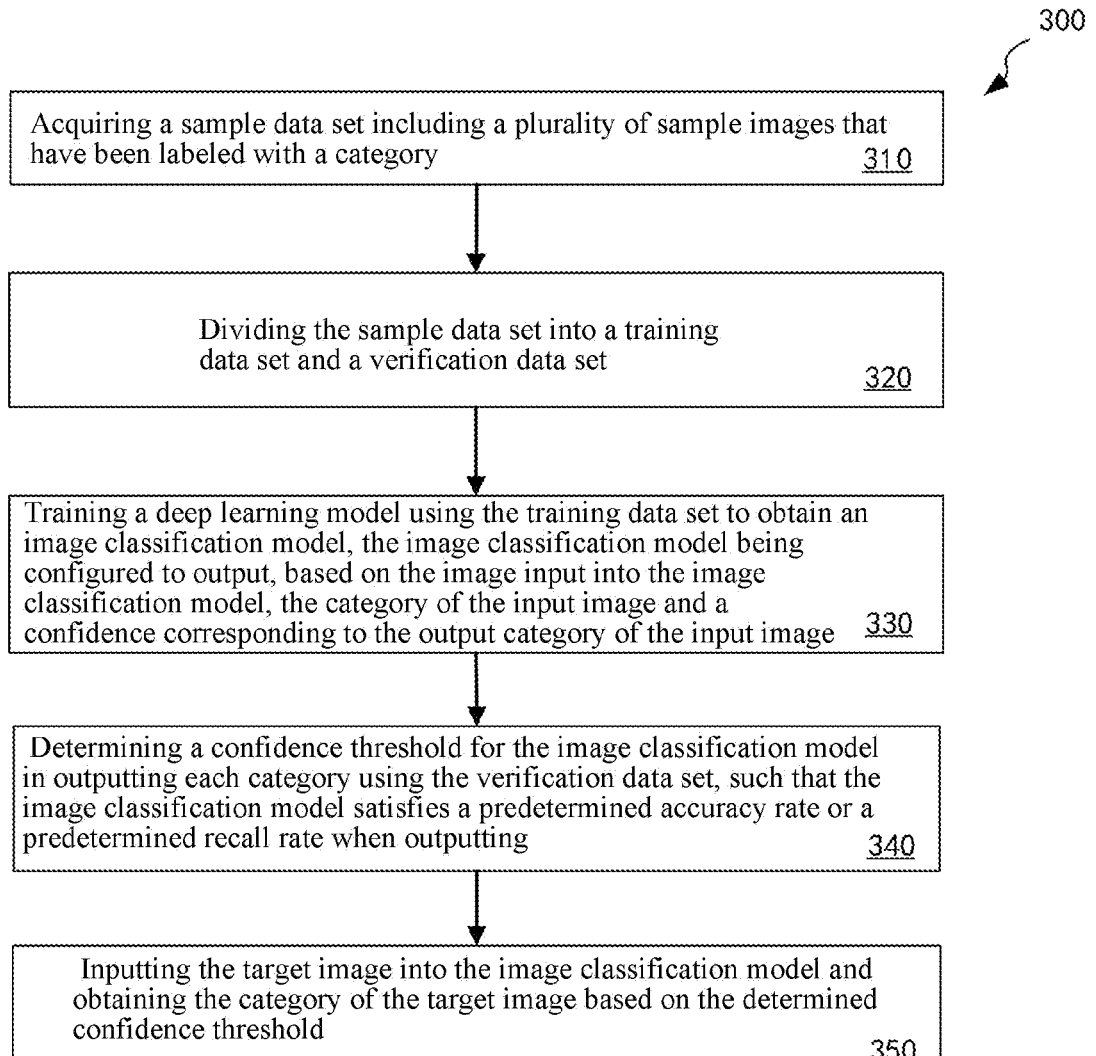

300

Acquiring a sample data set including a plurality of sample images that
have been labeled with a category                                    310

Dividing the sample data set into a training
data set and a verification data set                            320

Training a deep learning model using the training data set to obtain an
image classification model, the image classification model being
configured to output, based on the image input into the image
classification model, the category of the input image and a
confidence corresponding to the output category of the input image    330

Determining a confidence threshold for the image classification model
in outputting each category using the verification data set, such that the
image classification model satisfies a predetermined accuracy rate or a
predetermined recall rate when outputting                          340

Inputting the target image into the image classification model and
obtaining the category of the target image based on the determined
confidence threshold
                                                                  350

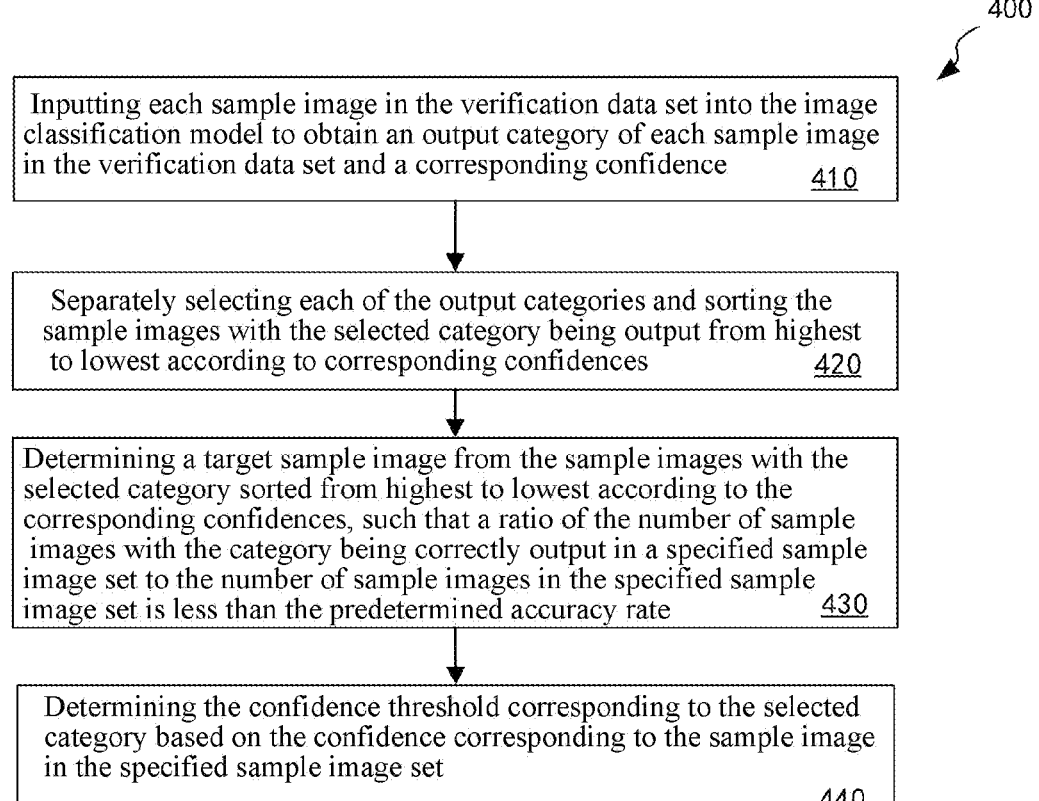

Inputting each sample image in the verification data set into the image classification model to obtain an output category of each sample image in the verification data set and a corresponding confidence          410

Separately selecting each of the output categories and sorting the sample images with the selected category being output from highest to lowest according to corresponding confidences          420

Determining a target sample image from the sample images with the selected category sorted from highest to lowest according to the corresponding confidences, such that a ratio of the number of sample images with the category being correctly output in a specified sample image set to the number of sample images in the specified sample image set is less than the predetermined accuracy rate          430

Determining the confidence threshold corresponding to the selected category based on the confidence corresponding to the sample image in the specified sample image set
440

FIG.4

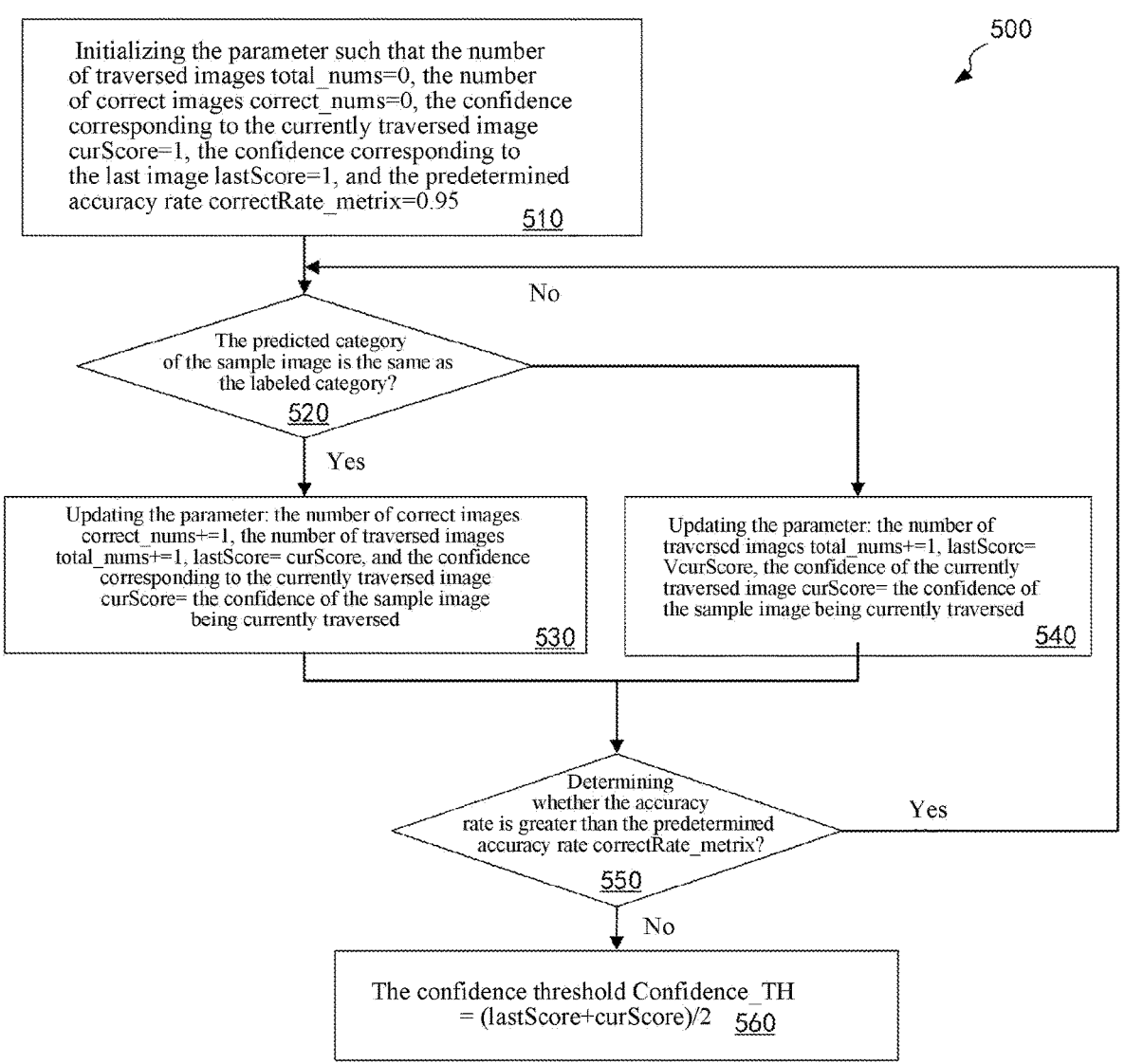

Initializing the parameter such that the number
of traversed images total_nums=0, the number
of correct images correct_nums=0, the confidence
corresponding to the currently traversed image
curScore=1, the confidence corresponding to
the last image lastScore=1, and the predetermined
accuracy rate correctRate_metrix=0.95          510

500

No

The predicted category
of the sample image is the same as
the labeled category?
520

Yes

Updating the parameter: the number of correct images
correct_nums+=1, the number of traversed images
total_nums+=1, lastScore= curScore, and the confidence
corresponding to the currently traversed image
curScore= the confidence of the sample image
being currently traversed          530

Updating the parameter: the number of
traversed images total_nums+=1, lastScore=
VcurScore, the confidence of the currently
traversed image curScore= the confidence of
the sample image being currently traversed          540

Determining
whether the accuracy
rate is greater than the predetermined
accuracy rate correctRate_metrix?
550

Yes

No

The confidence threshold Confidence_TH
= (lastScore+curScore)/2   560

FIG.5

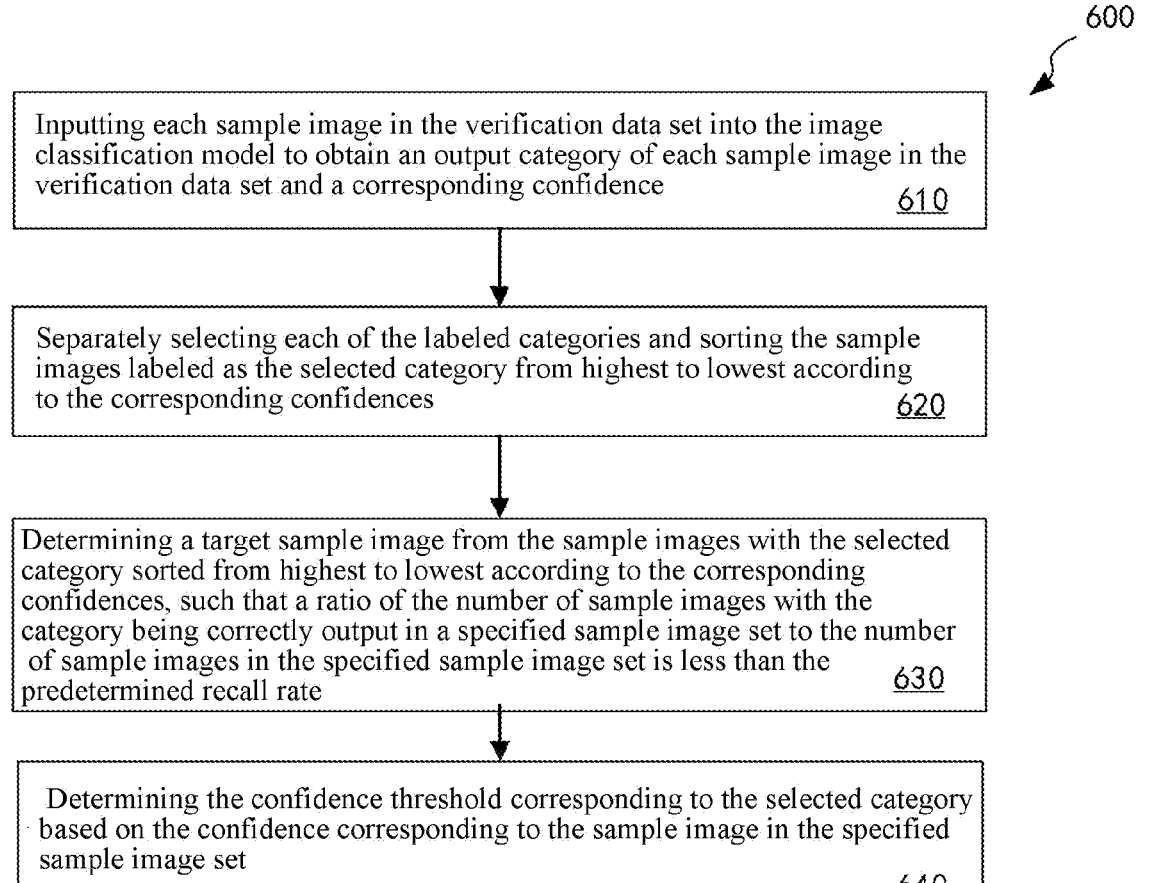

_600_

Inputting each sample image in the verification data set into the image classification model to obtain an output category of each sample image in the verification data set and a corresponding confidence          610

Separately selecting each of the labeled categories and sorting the sample images labeled as the selected category from highest to lowest according to the corresponding confidences          620

Determining a target sample image from the sample images with the selected category sorted from highest to lowest according to the corresponding confidences, such that a ratio of the number of sample images with the category being correctly output in a specified sample image set to the number of sample images in the specified sample image set is less than the predetermined recall rate          630

Determining the confidence threshold corresponding to the selected category based on the confidence corresponding to the sample image in the specified sample image set          640

FIG.6

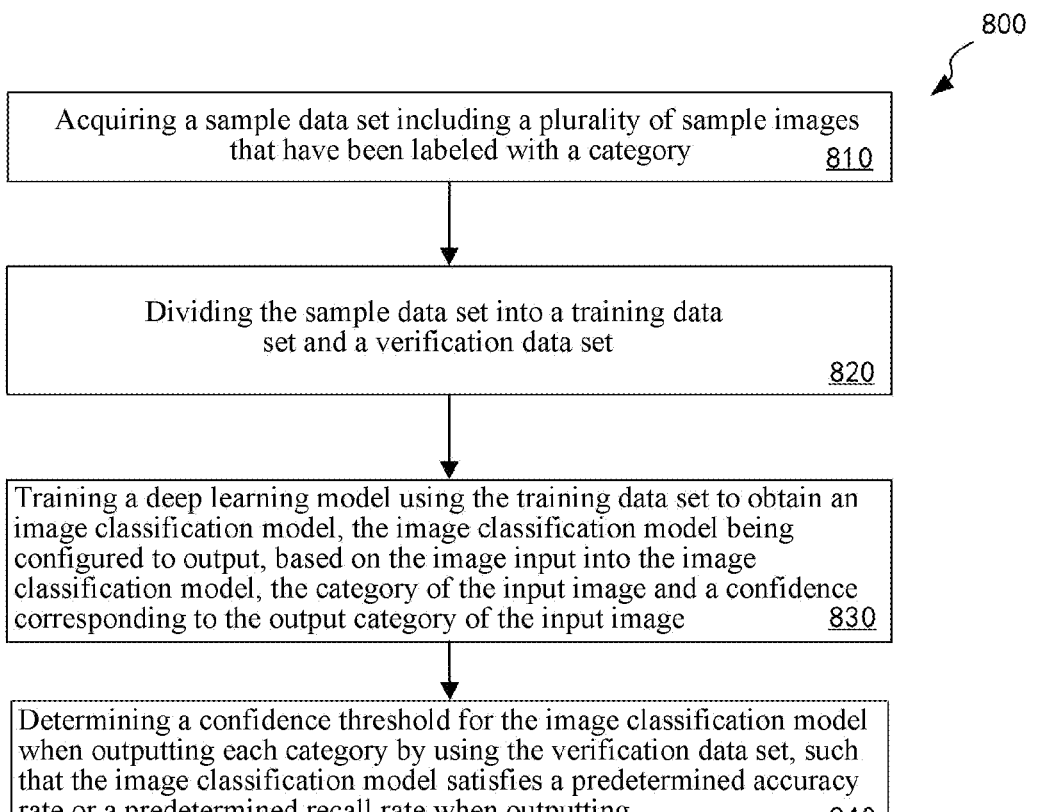

800

Acquiring a sample data set including a plurality of sample images
that have been labeled with a category                    810

Dividing the sample data set into a training data
set and a verification data set
                                                          820

Training a deep learning model using the training data set to obtain an
image classification model, the image classification model being
configured to output, based on the image input into the image
classification model, the category of the input image and a confidence
corresponding to the output category of the input image        830

Determining a confidence threshold for the image classification model
when outputting each category by using the verification data set, such
that the image classification model satisfies a predetermined accuracy
rate or a predetermined recall rate when outputting        840

Acquiring a sample data set in response to a parameter configuration operation of a user on the sample data set, the sample data set including a plurality of sample images that have been labeled with a category 910

↓

Dividing the sample data set into a training data set and a verification data set

920

↓

Training a deep learning model using the training data set to obtain an image classification model, the image classification model being configured to output, based on the image input into the image classification model, the category of the input image and a confidence corresponding to the output category of the input image          930

↓

Determining a confidence threshold for the image classification model in outputting each category by using the verification data set, such that the image classification model satisfies a predetermined accuracy rate or a predetermined recall rate when outputting          940

↓

Generating a confidence display interface for displaying the confidence threshold for the image classification model in outputting each category          950

FIG.9

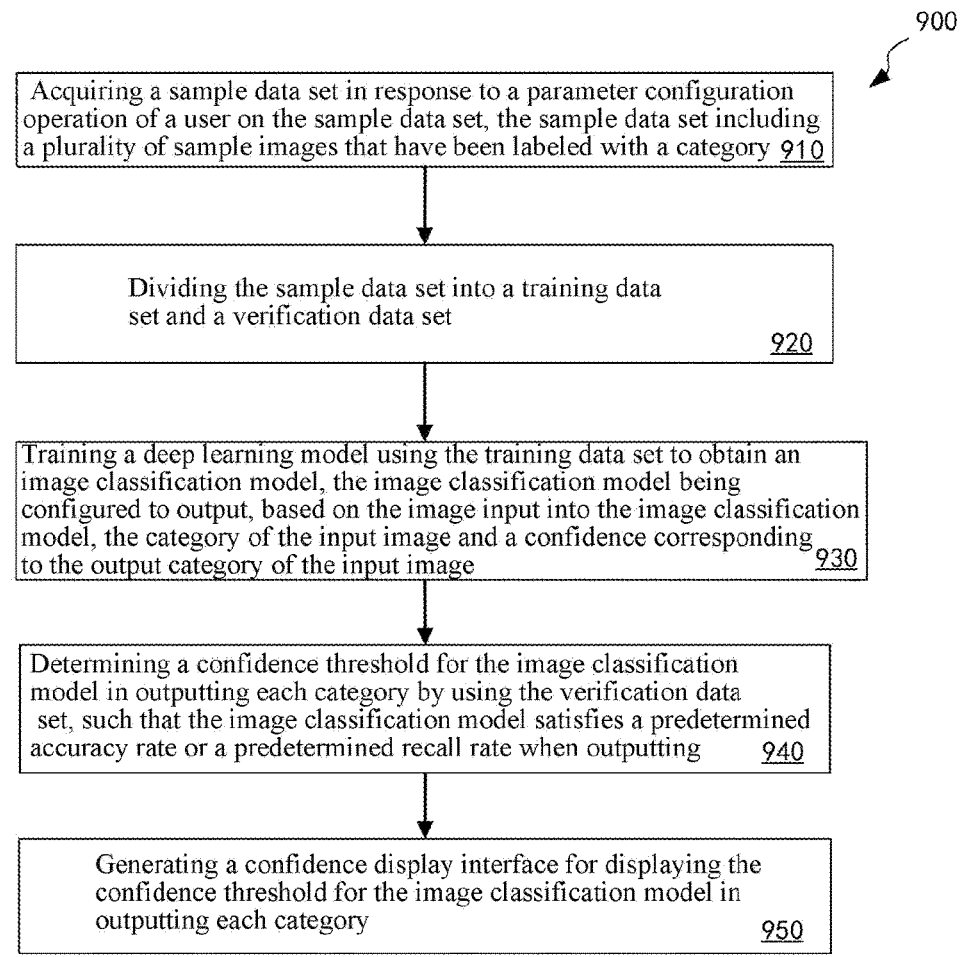

Dataset configuration

*Training type:  [Image classification ▽]  *Training set selection: [L490A_6LBF_MT ▽]  *Version: [V1 ◉ ▽]  [Add]

Training set name          Training set version          Sample quantity          Select or not L490A_6LBF_MT                      V1                              10000                            ☑

[Confirm]

Training set data quantity: 9000
Verification set data quantity: 1000

FIG.10

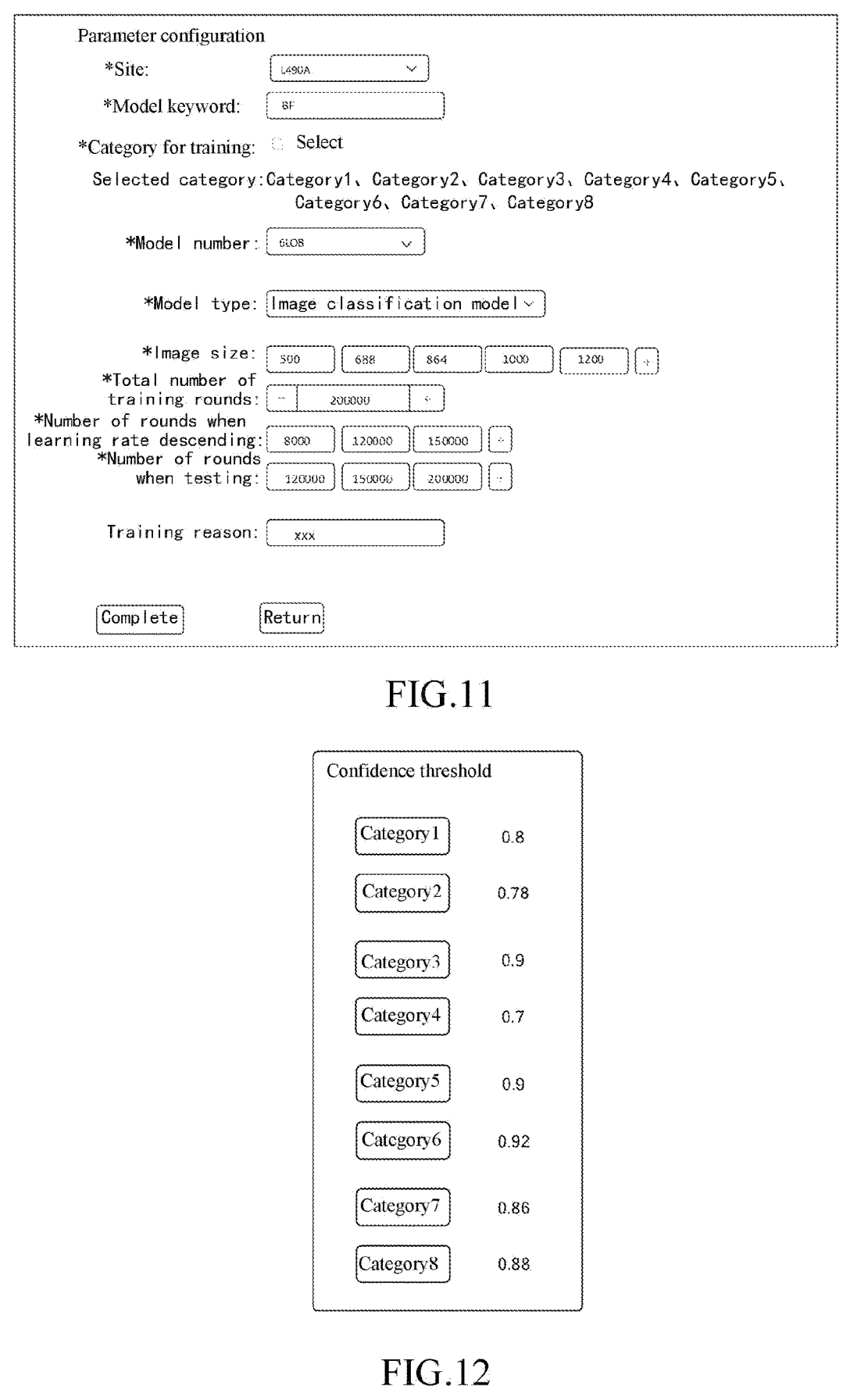

Parameter configuration

*Site:                    [ L490A            ∨ ]

*Model keyword:            [ BF ]

*Category for training:    ⦾ Select

Selected category:Category1、Category2、Category3、Category4、Category5、
                    Category6、Category7、Category8

*Model number :            [ GLO8            ∨ ]

*Model type:  [ Image classification model ∨ ]

*Image size:   [ 500 ] [ 688 ] [ 864 ] [ 1000 ] [ 1200 ] [ + ]

*Total number of
 training rounds:  [ ‐ | 200000 ] [ + ]

*Number of rounds when
learning rate descending:  [ 8000 ] [ 120000 ] [ 150000 ] [ + ]

*Number of rounds
 when testing:  [ 120000 ] [ 150000 ] [ 200000 ] [ + ]

Training reason:  [ xxx ]

[ Complete ]      [ Return ]

FIG.11

Confidence threshold

[ Category1 ]      0.8

[ Category2 ]      0.78

[ Category3 ]      0.9

[ Category4 ]      0.7

[ Category5 ]      0.9

[ Category6 ]      0.92

[ Category7 ]      0.86

[ Category8 ]      0.88

FIG.12

| Create training task | 🔲 Starting date to Ending date | Select task state ⌄ | Select release state ⌄ | Training person | Training set or model name | Query |
|---|---|---|---|---|---|---|

| Model name | Training state | Number of training rounds | Current round number | Release state | Operation | | | |
|---|---|---|---|---|---|---|---|---|
| Image classification model | To-be-trained | 100000 | 0 | Not release | Start training | Training detail | View configuration | Delete |

FIG.13

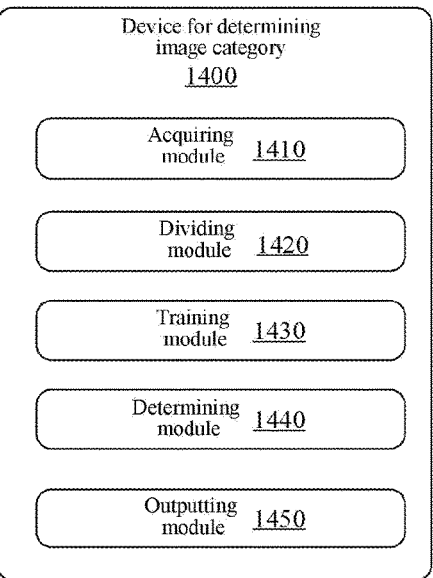

Device for determining image category
1400

Acquiring module  1410

Dividing module  1420

Training module  1430

Determining module  1440

Outputting module  1450

FIG.14

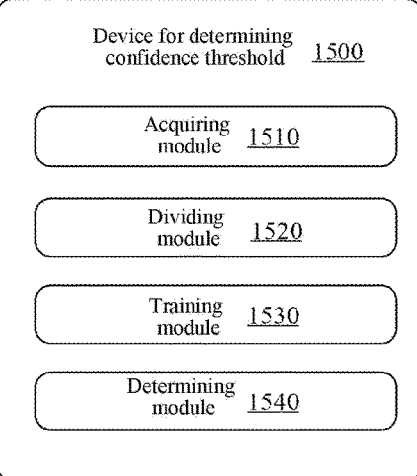

Device for determining confidence threshold  1500

Acquiring module  1510

Dividing module  1520

Training module  1530

Determining module  1540

FIG.15

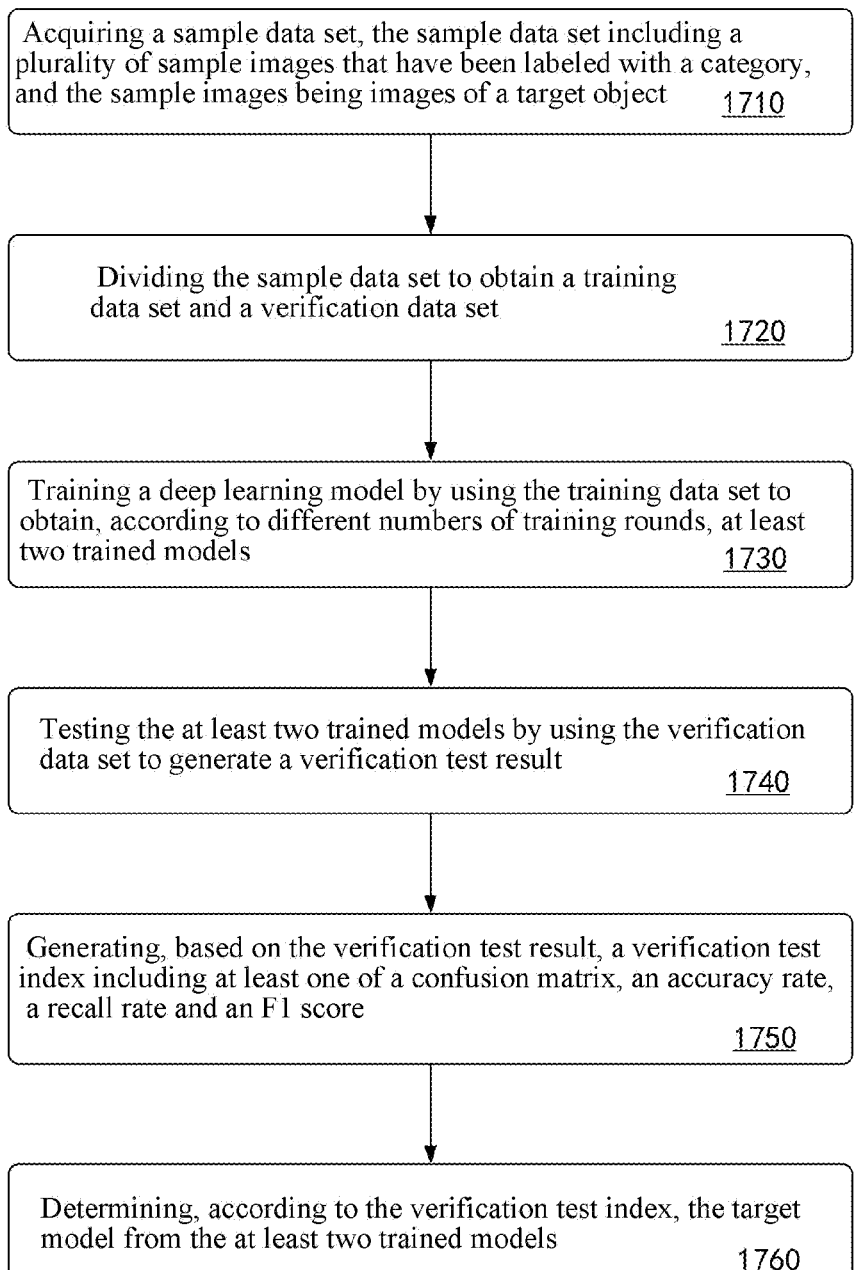

1700

Acquiring a sample data set, the sample data set including a plurality of sample images that have been labeled with a category, and the sample images being images of a target object    1710

Dividing the sample data set to obtain a training data set and a verification data set    1720

Training a deep learning model by using the training data set to obtain, according to different numbers of training rounds, at least two trained models    1730

Testing the at least two trained models by using the verification data set to generate a verification test result    1740

Generating, based on the verification test result, a verification test index including at least one of a confusion matrix, an accuracy rate, a recall rate and an F1 score    1750

Determining, according to the verification test index, the target model from the at least two trained models    1760

Figures 18, 19:
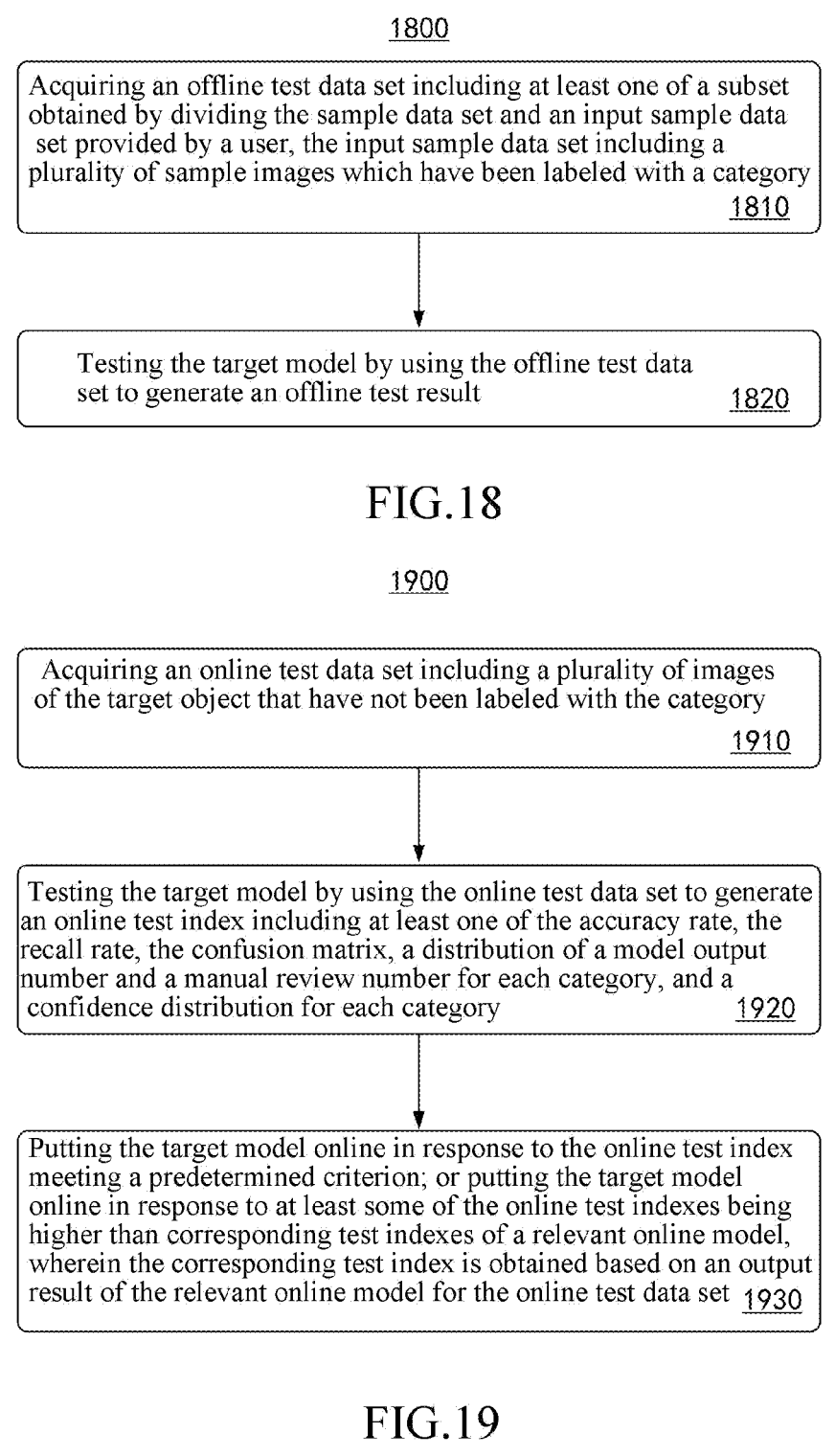

Acquiring an offline test data set including at least one of a subset obtained by dividing the sample data set and an input sample data set provided by a user, the input sample data set including a plurality of sample images which have been labeled with a category
1810

Testing the target model by using the offline test data set to generate an offline test result          1820

Acquiring an online test data set including a plurality of images of the target object that have not been labeled with the category
1910

Testing the target model by using the online test data set to generate an online test index including at least one of the accuracy rate, the recall rate, the confusion matrix, a distribution of a model output number and a manual review number for each category, and a confidence distribution for each category          1920

Putting the target model online in response to the online test index meeting a predetermined criterion; or putting the target model online in response to at least some of the online test indexes being higher than corresponding test indexes of a relevant online model, wherein the corresponding test index is obtained based on an output result of the relevant online model for the online test data set 1930

Figures 20, 21:
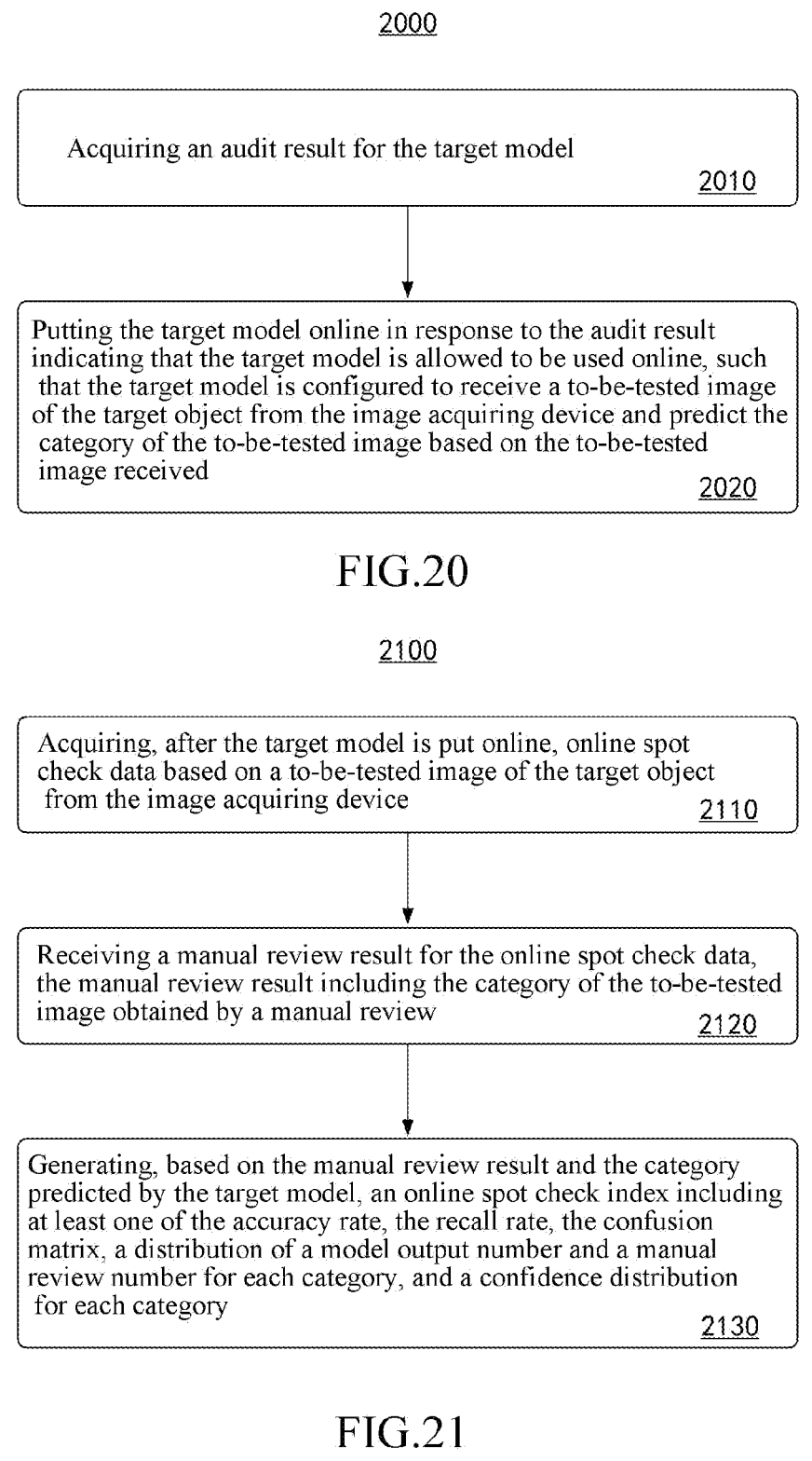

Acquiring an audit result for the target model

2010

Putting the target model online in response to the audit result indicating that the target model is allowed to be used online, such that the target model is configured to receive a to-be-tested image of the target object from the image acquiring device and predict the category of the to-be-tested image based on the to-be-tested image received

Acquiring, after the target model is put online, online spot check data based on a to-be-tested image of the target object from the image acquiring device

2110

Receiving a manual review result for the online spot check data, the manual review result including the category of the to-be-tested image obtained by a manual review

2120

Generating, based on the manual review result and the category predicted by the target model, an online spot check index including at least one of the accuracy rate, the recall rate, the confusion matrix, a distribution of a model output number and a manual review number for each category, and a confidence distribution for each category

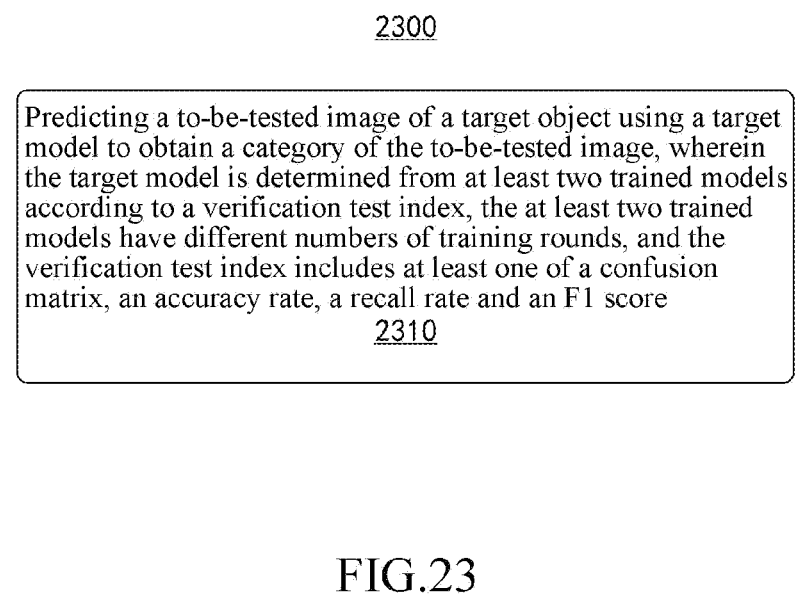

Predicting a to-be-tested image of a target object using a target model to obtain a category of the to-be-tested image, wherein the target model is determined from at least two trained models according to a verification test index, the at least two trained models have different numbers of training rounds, and the verification test index includes at least one of a confusion matrix, an accuracy rate, a recall rate and an F1 score
2310

FIG.23

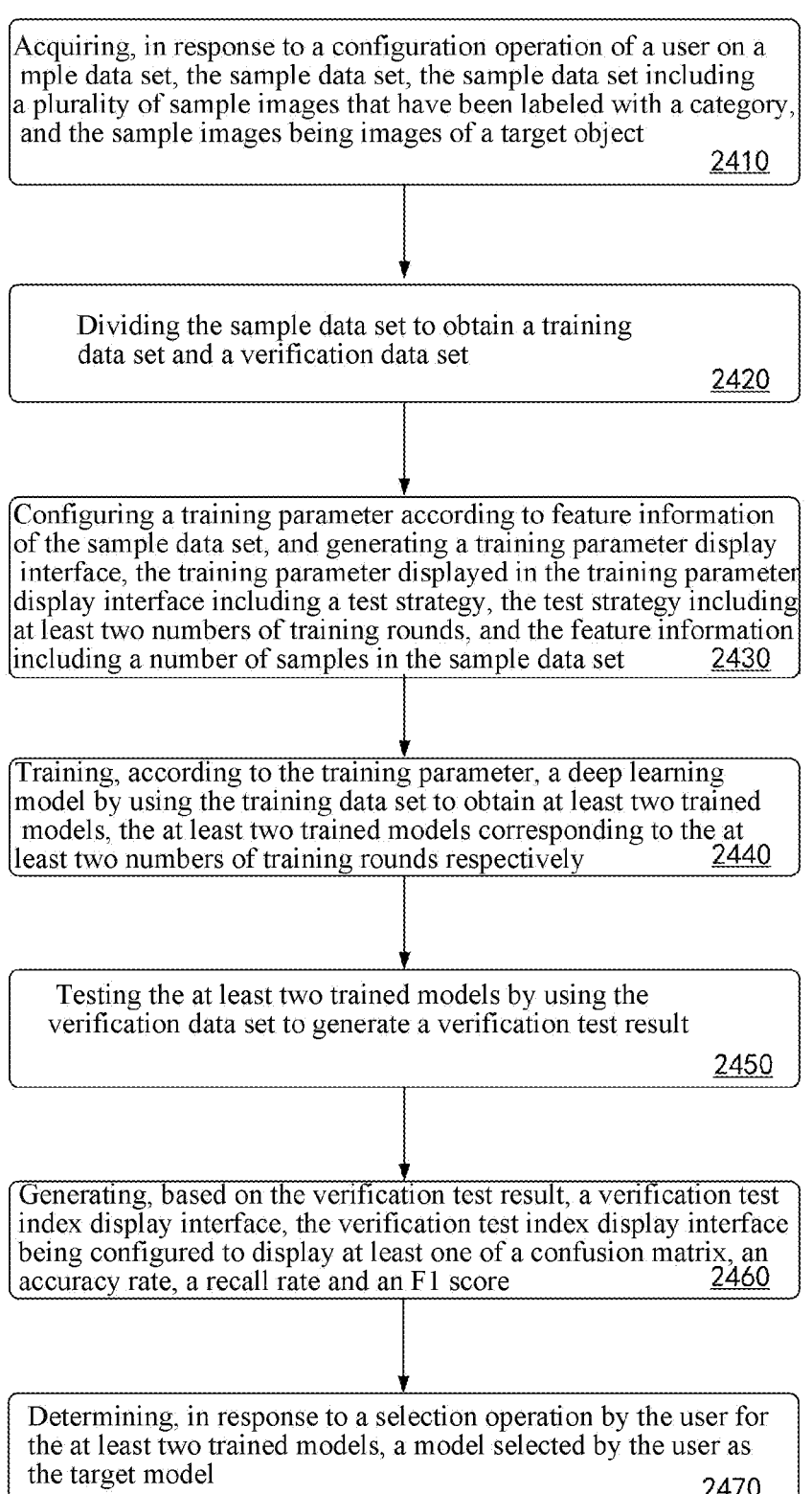

Acquiring, in response to a configuration operation of a user on a
mple data set, the sample data set, the sample data set including
a plurality of sample images that have been labeled with a category,
and the sample images being images of a target object
2410

Dividing the sample data set to obtain a training
data set and a verification data set
2420

Configuring a training parameter according to feature information
of the sample data set, and generating a training parameter display
interface, the training parameter displayed in the training parameter
display interface including a test strategy, the test strategy including
at least two numbers of training rounds, and the feature information
including a number of samples in the sample data set          2430

Training, according to the training parameter, a deep learning
model by using the training data set to obtain at least two trained
models, the at least two trained models corresponding to the at
least two numbers of training rounds respectively          2440

Testing the at least two trained models by using the
verification data set to generate a verification test result
2450

Generating, based on the verification test result, a verification test
index display interface, the verification test index display interface
being configured to display at least one of a confusion matrix, an
accuracy rate, a recall rate and an F1 score          2460

Determining, in response to a selection operation by the user for
the at least two trained models, a model selected by the user as
the target model
2470

| UID | Number of training rounds | Accuracy rate | Recall rate | F1 score |
|---|---|---|---|---|
| XX | 120000 | 0. 9167 | 0. 8152 | 0. 8630 |
| XX | 150000 | 0. 875 | 0. 83 | 0. 8519 |
| XX | 200000 | 0. 875 | 0. 856 | 0. 8654 |

Return

2500B

Model effect

Detail assessment

Confusion matrix:Number of rounds=120000,Accuracy rate=0.9286,Recall rate=0.9265

|  | A | B | C | D | E | Unknow | Recall rate |
|---|---|---|---|---|---|---|---|
| A | 1244 | 27 | 0 | 18 | 0 | 0 | 0. 9651 |
| B | 171 | 1305 | 0 | 11 | 6 | 1 | 0. 8735 |
| C | 3 | 1 | 119 | 2 | 0 | 2 | 0. 9370 |
| D | 2 | 0 | 0 | 352 | 3 | 0 | 0. 9860 |
| E | 0 | 6 | 0 | 3 | 268 | 5 | 0. 9504 |

Return

2600

| Offline test task creation | ✕ |
| --- | --- |

| Site | XX ⌄ |
| --- | --- |
| Product | XX ⌄ |
| Data set name | XX ⌄ |
| Data set version | XX ⌄ |
| Model name | XX ⌄ |
| Remark | XX ⌄ |

[ Submit task ]     [ Cancel ]

View confidence threshold          ✕

| Category | Confidence threshold |
| --- | --- |
| A | 0. 88 |
| B | 0. 7 |
| C | 0. 88 |
| D | 0. 88 |
| E | 0. 8493 |

Set confidence threshold          ✕

Model name [ XX          ∨ ]

Remark [          ]

| Category | Confidence threshold |
|----------|---------------------|
| A | 0. 88 |
| B | 0. 7 |
| C | 0. 88 |
| D | 0. 88 |
| E | 0. 8493 |

[ Confirm ]     [ Cancel ]

Confidence scatter diagram

3200

Recall rate:  89. 01%

Accuracy rate:  91. 46%

|   | A | B | C | D | E |
|---|---|---|---|---|---|
| A | 1244 | 27 | 0 | 18 | 0 |
| B | 171 | 1305 | 0 | 11 | 6 |
| C | 3 | 1 | 119 | 2 | 0 |
| D | 2 | 0 | 0 | 352 | 3 |
| E | 0 | 6 | 0 | 3 | 268 |

3300

Abnormal data statistics

Filtering some results for same images

| Label name | Total data volume |
|------------|-------------------|
| A | 15 |
| B | 4 |
| C | 46 |
| D | 10 |
| E | 7 |
| F | 7 |
| G | 1 |
| H | 8 |

Image1     Image2     Image3

Image4     Image5     Image6

Image7     Image8     Image9

| Online test task creation | ✕ |
|---|---|

| | |
|---|---|
| Task name | XX |
| Test type | ⦿ Model online test |
| | ◯ Model update test |
| Site | XX ⌄ |
| Model number | XX ⌄ |
| Product number | XX ⌄ |
| $_n$mainCode model | XX ⌄ |
| subCode model | XX ⌄ |
| Select | ◯ LOT_ID ⦿ GLS_COUNT |
| GLS_COUNT | XX |
| Remark | XX ⌄ |

Submit task     Cancel

Figure 34B:
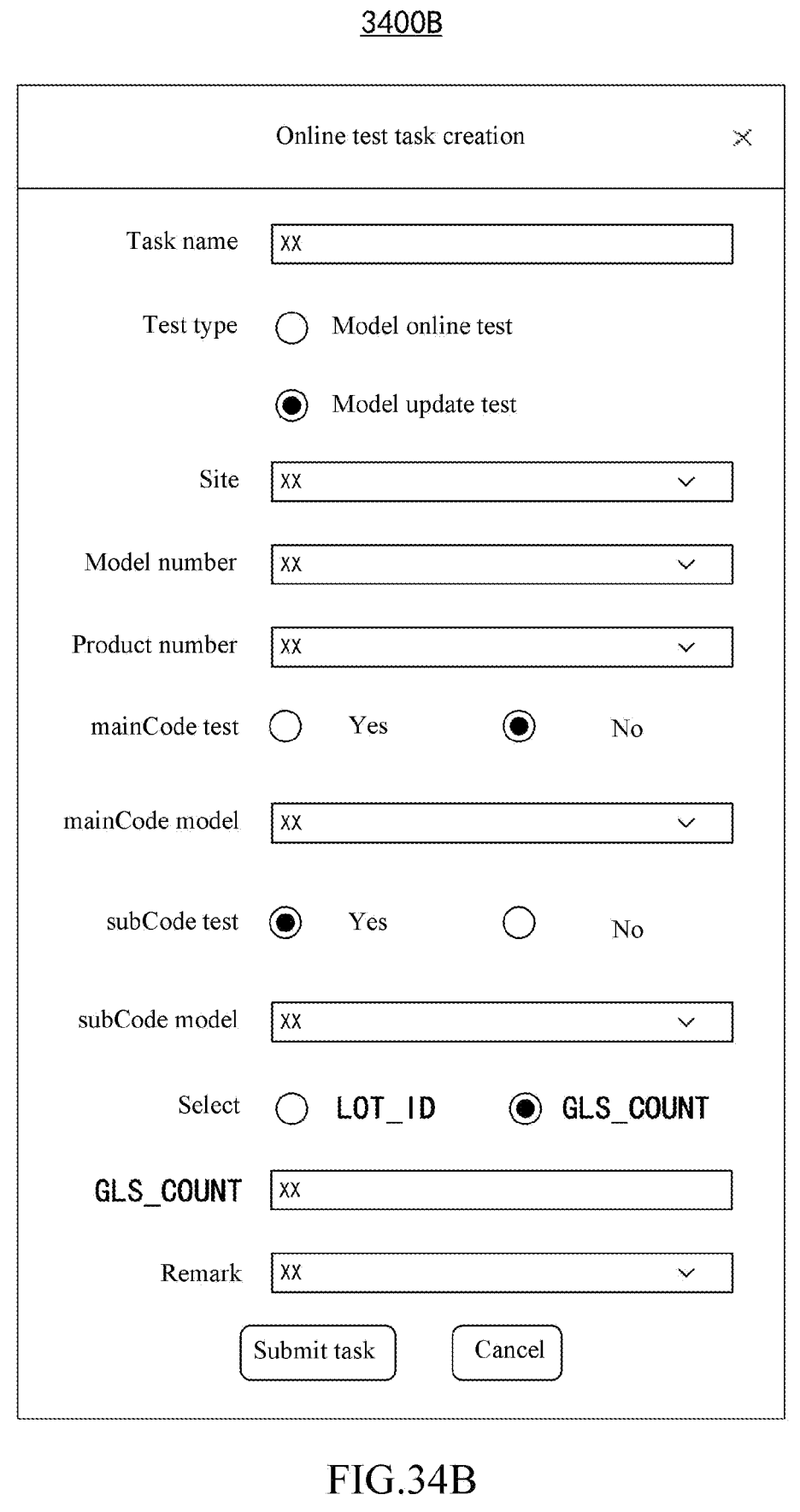

Online test task creation                    ✕

Task name        | XX |

Test type        ◯  Model online test

◉  Model update test

Site             | XX                              ∨ |

Model number     | XX                              ∨ |

Product number   | XX                              ∨ | mainCode test    ◯  Yes        ◉  No mainCode model   | XX                              ∨ | subCode test     ◉  Yes        ◯  No subCode model    | XX                              ∨ |

Select           ◯  LOT_ID     ◉  GLS_COUNT

GLS_COUNT        | XX                                |

Remark           | XX                              ∨ |

[ Submit task ]    [ Cancel ]

| | Model online | ✕ |
|---|---|---|
| Site | XX | ⌄ |
| Model number | XX | ⌄ |
| Product number | XX | ⌄ |
| Remark | XX | |

[ Confirm ]     [ Cancel ]

| Starting date to Ending date | Select site ⌄ | Select product ⌄ | Please select ⌄ | Name/Site/Product/Product number |
|---|---|---|---|---|

[ Screen ]  [ Export table ]

| Site number | Product | Product number | Model name | Operation | | | | | |
|---|---|---|---|---|---|---|---|---|---|
| XX | XX | XX | XX | Change model | View confidence threshold | Modify confidence threshold | Back | Offline | Synchronization |
| XX | XX | XX | XX | Change model | View confidence threshold | Modify confidence threshold | Back | Offline | Synchronization |
| XX | XX | XX | XX | Change model | View confidence threshold | Modify confidence threshold | Back | Offline | Synchronization |

| Starting date to Ending date | Select site | ∨ | Select product ∨ | Name/Site/Product/Product number |
| --- | --- | --- | --- | --- |

Screen   Export table

Creation task

| Creation time | Creation person | Review person | Creation purpose | Data source | Site | Operation | | | |
| --- | --- | --- | --- | --- | --- | --- | --- | --- | --- |
| XX | XX | XX | XX | XX | XX | Model assessment | Review again | Result distribution | Review result | Delete |
| XX | XX | XX | XX | XX | XX | Model assessment | Review again | Result distribution | Review result | Delete |
| XX | XX | XX | XX | XX | XX | Model assessment | Review again | Result distribution | Review result | Delete |

| Monitoring task creation | ✕ |

| Time | Starting date to Ending date |

| Site | XX ⌄ |

| Model number | XX ⌄ |

| Product number | XX ⌄ |

| Label group | XX ⌄ |

Acquiring OP result   ⦿ Yes      ◯ No

Acquiring model result   ⦿ Yes      ◯ No

Select   ⦿ LOT_ID

| LOT_ID | XX ⌄ |

Code   ◯ mainCode      ◯ subCode

◯ allCode

| Creation purpose | Daily monitoring ⌄ |

FIG.38

Predicting module
4010

Device for determining image category
4000

METHOD FOR DETECTING DEFECT AND METHOD FOR TRAINING MODEL

CROSS-REFERENCE TO RELATED APPLICATIONS

This application is a CIP of U.S. application Ser. No. 17/764,707, filed on Mar. 29, 2022, which is based upon International Application No. PCT/CN2021/074263 filed on Jan. 28, 2021, the entire contents of which are incorporated herein by reference.

TECHNICAL FIELD

The present disclosure relates to the technical field of image processing and, in particular, to a method for determining a target model, a method for determining an image category, a system for determining an image category, a computing device, a computer readable storage media and a computer program product.

BACKGROUND

With the development of computer technology, an advanced technology such as artificial intelligence and deep learning algorithms is widely used. For example, a deep learning model based on the advanced technology such as artificial intelligence and deep learning algorithms may be used for image classification, thereby reducing manual workload and increasing efficiency. For another example, in the field of screen production, as there may be a problem in aspects such as equipment, parameter, operation and environmental interference, a product produced may have a defect, a category of a screen defect may be detected by classifying a screen image through using a deep learning model. However, in the actual production process, it is a very careful task to deploy a trained model to the production line as the prediction effect of the model may directly affect the production process of the product.

SUMMARY

The present disclosure provides a method for determining a target model, a method for determining an image category, a system for determining an image category, a computing device, a computer readable storage media and a computer program product.

An aspect of the present disclosure provides a method for determining a target model, including:

acquiring a sample data set, the sample data set including a plurality of sample images that have been labeled with a category, and the sample images being images of a target object;

dividing the sample data set to obtain a training data set and a verification data set;

training a deep learning model by using the training data set to obtain, according to different numbers of training rounds, at least two trained models;

testing the at least two trained models by using the verification data set to generate a verification test result;

generating, based on the verification test result, a verification test index, the verification test index including at least one of a confusion matrix, an accuracy rate, a recall rate and an F1 score; and determining, according to the verification test index, the target model from the at least two trained models.

In some embodiments, the method further includes:

acquiring an offline test data set, the offline test data set including at least one of a subset obtained by dividing the sample data set and an input sample data set provided by a user, and the input sample data set including a plurality of sample images which have been labeled with a category; and testing the target model by using the offline test data set to generate an offline test result.

In some embodiments, the method further includes:

generating, based on the verification test result or the offline test result, an accuracy curve and a recall curve for at least one category, the accuracy curve reflecting a relationship between the accuracy rate and a confidence threshold, and the recall curve reflecting a relationship between the recall rate and the confidence threshold; and updating, according to the accuracy curve and the recall curve, the confidence threshold for the at least one category.

In some embodiments, the updating, according to the accuracy curve and the recall curve, the confidence threshold for the at least one category includes:

updating the confidence threshold for the at least one category according to an intersection point of the accuracy curve and the recall curve.

In some embodiments, the method further includes:

based on the verification test result or the offline test result, determining a recommended confidence threshold for each category according to the accuracy rate or the recall rate; and updating the confidence threshold for at least one category based on the recommended confidence threshold.

In some embodiments, the method further includes:

generating, based on the offline test result, an offline test index, the offline test index including at least one of the accuracy rate, the recall rate, the F1 score, the confusion matrix, a distribution of a model output number and a true number for each category, and a confidence distribution for each category; and updating the confidence threshold for at least one category according to the offline test index.

In some embodiments, the method further includes:

according to an updated confidence threshold, generating, based on the offline test result, at least one of the accuracy rate, the recall rate, the F1 score, the confusion matrix, the distribution of the model output number and the true number for each category and the confidence distribution for each category.

In some embodiments, the method further includes:

acquiring an online test data set, the online test data set including a plurality of images of the target object that have not been labeled with the category; and testing the target model by using the online test data set to generate an online test index, the online test index including at least one of the accuracy rate, the recall rate, the confusion matrix, a distribution of a model output number and a manual review number for each category, and a confidence distribution for each category, and the method further includes one of:

putting the target model online in response to the online test index meeting a predetermined criterion; and putting the target model online in response to at least some of the online test indexes being higher than corresponding test indexes of a relevant online model, wherein the corresponding test index is obtained based on an output result of the relevant online model for the online test data set.

In some embodiments, the method further includes one of two of:

updating the target model by retraining or adjusting the confidence threshold in response to the online test index not meeting the predetermined criterion; and updating the target model by retraining or adjusting the confidence threshold in response to the online test index being not higher than the corresponding test index of the relevant online model.

In some embodiments, the acquiring the online test data set includes:

establishing a communication connection with an image acquiring device, the image acquiring device being configured to acquire a to-be-tested image of the target object;

receiving the to-be-tested image of the target object from the image acquiring device through the communication connection; and acquiring the online test data set based on the to-be-tested image received.

In some embodiments, the acquiring the online test data set includes:

acquiring the online test data set based on an image received by the relevant online model, wherein the relevant online model is configured to receive a to-be-tested image of the target object from an image acquiring device and to predict the category of the to-be-tested image based on the to-be-tested image received.

In some embodiments, the putting the target model online includes:

acquiring an audit result of a user for the target model; and putting the target model online in response to the audit result indicating that the target model is allowed to be used online, such that the target model is configured to receive a to-be-tested image of the target object from the image acquiring device and predict the category of the to-be-tested image based on the to-be-tested image received.

In some embodiments, the method further includes:

acquiring, after the target model is put online, online spot check data based on a to-be-tested image of the target object from the image acquiring device;

receiving a manual review result for the online spot check data, the manual review result including the category of the to-be-tested image obtained by a manual review; and generating, based on the manual review result and the category predicted by the target model, an online spot check index, the online spot check index including at least one of the accuracy rate, the recall rate, the confusion matrix, a distribution of a model output number and a manual review number for each category, and a confidence distribution for each category.

In some embodiments, acquiring the online spot check data based on the to-be-tested image of the target object from the image acquiring device includes at least one of:

randomly selecting, from the to-be-tested images of the target object from the image acquiring device, some image, and generating the online spot check data based on the images selected; and receiving a filtering condition for the to-be-tested image of the target object from the image acquiring device, filtering the to-be-tested image of the target object from the image acquiring device based on the filtering condition, and generating the online spot check data based on the image filtered.

In some embodiments, the determining, according to the verification test index, the target model from the at least two trained models includes:

determining the target model from the at least two trained models according to the F1 score.

In some embodiments, the determining, according to the verification test index, the target model from the at least two trained models includes:

determining whether the target model determined satisfies a predetermined requirement according to the confusion matrix; and updating the target model by retraining or adjusting the confidence threshold in response to the target model determined not satisfying the predetermined requirement.

In some embodiments, the target object is a target product and the category is a product defect category of the target product.

Another aspect of the present disclosure provides a method for determining an image category, including:

predicting a to-be-tested image of a target object using a target model to obtain a category of the to-be-tested image, wherein the target model is determined from at least two trained models according to a verification test index, the at least two trained models have different numbers of training rounds, and the verification test index includes at least one of a confusion matrix, an accuracy rate, a recall rate and an F1 score.

Yet another aspect of the present disclosure provides a method for determining a target model including:

acquiring, in response to a configuration operation of a user on a sample data set, the sample data set, the sample data set including a plurality of sample images that have been labeled with a category, and the sample images being images of a target object;

dividing the sample data set to obtain a training data set and a verification data set;

configuring a training parameter according to feature information of the sample data set, and generating a training parameter display interface, the training parameter displayed in the training parameter display interface including a test strategy, the test strategy including at least two numbers of training rounds, and the feature information including a number of samples in the sample data set;

training, according to the training parameter, a deep learning model by using the training data set to obtain at least two trained models, the at least two trained models corresponding to the at least two numbers of training rounds respectively;

testing the at least two trained models by using the verification data set to generate a verification test result;

generating, based on the verification test result, a verification test index display interface, the verification test index display interface being configured to display at least one of a confusion matrix, an accuracy rate, a recall rate and an F1 score; and determining, in response to a selection operation by the user for the at least two trained models, a model selected by the user as the target model.

In some embodiments, the method further includes:

generating, in response to an offline test task creation operation by the user for the target model, an offline test parameter configuration interface;

creating an offline test task according to a configuration input by the user on the offline test parameter configuration interface;

acquiring an offline test data set according to the configuration input, the offline test data set including a plurality of sample images which have been labeled with the category; and testing the target model by using the offline test data set to generate an offline test result.

In some embodiments, the method further includes:

generating, based on the verification test result or the offline test result, a curve display interface configured to display an accuracy curve and a recall curve for each category, the accuracy curve reflecting a relationship between the accuracy rate and a confidence threshold, and the recall curve reflecting a relationship between the recall rate and the confidence threshold; and updating the confidence threshold for at least one category in response to a modification operation of the user on the confidence threshold for the at least one category.

In some embodiments, the method further includes:

based on the verification test result or the offline test result, determining a recommended confidence threshold for each category according to the accuracy rate or the recall rate;

updating the confidence threshold for at least one category based on the recommended confidence threshold; and generating a confidence threshold display interface in response to a view operation of the user on the confidence threshold.

In some embodiments, the method further includes:

generating, based on the offline test result, an offline test index display interface configured to display at least one of the accuracy rate, the recall rate, the F1 score, the confusion matrix, a distribution of a model output number and a true number for each category, and a confidence distribution for each category; and updating the confidence threshold for at least one category in response to a modification operation of the user on the confidence threshold for the at least one category.

In some embodiments, the method further includes:

generating, based on the offline test result, an error result display interface configured to display data where a model output category is inconsistent with a true category.

In some embodiments, the method further includes:

in response to the confidence threshold being updated, generating, based on the offline test result, an index display interface configured to display at least one of the accuracy rate, the recall rate, the F1 score, the confusion matrix, the distribution of the model output number and the true number for each category, and the confidence distribution for each category.

In some embodiments, the offline test parameter configuration interface includes a data set selection option, and wherein the acquiring the offline test data set according to the configuration input includes:

in response to a selection operation performed by the user through the data set selection option, acquiring the offline test data set based on the sample data set corresponding to the selection operation.

In some embodiments, the offline test parameter configuration interface includes a data set upload option, and wherein the acquiring the offline test data set according to the configuration input includes:

receiving an input sample data set in response to an upload operation performed by the user through the data set upload option; and acquiring the offline test data set based on the input sample data set.

In some embodiments, the method further includes:

generating, in response to an online test task creation operation by the user for the target model, an online test parameter configuration interface;

creating an online test task according to a configuration input by the user on the online test parameter configuration interface;

acquiring an online test data set based on the configuration input, the online test data set including a plurality of images of the target object which have not been labeled with the category; and testing the target model by using the online test data set to generate an online test index including at least one of the accuracy rate, the recall rate, the confusion matrix, a distribution of a model output number and a manual review number for each category, and a confidence distribution for each category, the method further includes one of:

displaying an option for putting the target model online in response to the online test index meeting a predetermined criterion; and displaying the option for putting the target model online in response to at least some of the online test indexes being higher than corresponding test indexes of a relevant online model, wherein the corresponding test index is obtained based on an output result of the relevant online model for the online test data set.

In some embodiments, the online test parameter configuration interface includes an option for putting a new model online, and the acquiring the online test data set based on the configuration input includes:

establishing a communication connection with an image acquiring device in response to a selection operation of the user on the option for putting the new model online, the image acquiring device being configured to acquire a to-be-tested image of the target object;

receiving the to-be-tested image of the target object from the image acquiring device through the communication connection; and acquiring the online test data set based on the to-be-tested image received.

In some embodiments, the online test parameter configuration interface includes a model update option, and the acquiring the online test data set based on the configuration input includes:

in response to a selection operation of the user on the model update option, acquiring the online test data set based on an image received by the relevant online model, wherein the relevant online model is configured to receive a to-be-tested image of the target object from an image acquiring device and to predict the category of the to-be-tested image based on the to-be-tested image received.

In some embodiments, the method further includes:

generating a being-online audit interface in response to a selection operation of putting the target model online by the user; and putting the target model online in response to a confirmation operation by the user on a being-online audit, such that the target model is configured to receive a to-be-tested image of the target object from an image acquiring device and to predict the category of the to-be-tested image based on the to-be-tested image received.

In some embodiments, the method further includes:

generating a monitoring task parameter configuration interface in response to a monitoring task creation operation by the user for the target model that has been put online;

creating a monitoring task according to a configuration input by the user on the monitoring task parameter configuration interface;

according to the configuration input, acquiring online spot check data based on the to-be-tested image of the target object from the image acquiring device;

receiving a manual review result for the online spot check data, the manual review result including the category of the to-be-tested image obtained by a manual review; and generating, based on the manual review result and the category predicted by the target model, an online spot check index, the online spot check index including at least one of the accuracy rate, the recall rate, the confusion matrix, the distribution of the model output number and the manual review number for each category, and the confidence distribution for each category.

Yet another aspect of the present disclosure provides a system for determining an image category, including:

a data management module, configured to store and manage sample data;

a training and test management module, configured to perform the method for determining the target model or the method for determining the image category according to any one of the embodiments in the previous aspects; and a model management module, configured to store, display and manage the target model.

Yet another aspect of the present disclosure provides a computing device, including:

a memory, configured to store computer-executable instructions; and a processor, configured to execute the method according to any one of the embodiments in the previous aspects when the computer-executable instructions are executed by the processor.

Yet another aspect of the present disclosure provides a computer-readable storage medium having computer-executable instructions stored thereon that, when being executed, execute the method according to any one of the embodiments in the previous aspects.

Yet another aspect of the present disclosure provides a computer program product including computer instructions that, when being executed by a processor, implement the steps of the method according to any one of the embodiments in the previous aspects.

BRIEF DESCRIPTION OF THE DRAWINGS

Embodiments of the present disclosure will be described in details below with reference to the drawings in which:

FIG. 3 illustrates a schematic flow diagram of a method for determining an image category according to an embodiment of the present disclosure;

FIG. 4 illustrates an exemplary flowchart of a method for determining a confidence threshold for an image classification model in predicting respective categories using a verification data set according to an embodiment of the present disclosure;

FIG. 5 illustrates an exemplary implementation flowchart of a method for determining a confidence threshold for an image classification model in predicting respective categories using a verification data set according to an embodiment of the present disclosure;

FIG. 6 illustrates an exemplary flowchart of a method for determining a confidence threshold for an image classification model in predicting respective categories using a verification data set according to an embodiment of the present disclosure;

FIG. 8 illustrates a schematic flowchart of a method for determining a confidence threshold according to an embodiment of the present disclosure;

FIG. 9 illustrates a schematic flowchart of a method for determining a confidence threshold in accordance with another embodiment of the present disclosure; and FIG. 10 illustrates a graphical interface on which a user may configure a parameter of a sample data set according to another embodiment of the present disclosure;

FIG. 11 illustrates an exemplary parameter configuration interface according to an embodiment of the present disclosure;

FIG. 12 illustrates an exemplary display interface for a confidence threshold on which confidence thresholds for respective categories are visually displayed according to an embodiment of the present disclosure;

FIG. 13 illustrates a display interface for a training schedule according to an embodiment of the present disclosure;

FIG. 14 illustrates an exemplary structure block diagram of a device for determining an image category according to an embodiment of the present disclosure;

FIG. 15 illustrates an exemplary structure block diagram of a device for determining a confidence threshold according to an embodiment of the present disclosure;

FIG. 17 illustrates a schematic flowchart of a method for determining a target model according to an embodiment of the present disclosure;

FIG. 18 illustrates a schematic flowchart of an offline test method according to an embodiment of the present disclosure;

FIG. 19 illustrates a schematic flowchart of an online test method according to an embodiment of the present disclosure;

FIG. 20 illustrates a schematic flowchart of an audit method according to an embodiment of the present disclosure;

FIG. 21 illustrates a schematic flowchart of an online review method according to an embodiment of the present disclosure;

FIG. 23 illustrates a schematic flowchart of a method for determining an image category according to an embodiment of the present disclosure; and FIG. 24 illustrates a schematic flowchart of a method for determining a target model according to an embodiment of the present disclosure;

FIG. 26 illustrates a schematic view of an offline test task creation interface according to an embodiment of the present disclosure;

FIG. 27 illustrates a schematic view of a confidence threshold display interface according to an embodiment of the present disclosure;

FIG. 29 illustrates a schematic view of a confidence threshold setting interface according to an embodiment of the present disclosure;

FIG. 33 illustrates a schematic view of an error result display interface according to an embodiment of the present disclosure;

FIGS. 34A and 34B illustrate schematic views of an online test task creation interface according to an embodiment of the present disclosure;

FIG. 35 illustrates a schematic view of an audit interface according to an embodiment of the present disclosure;

FIG. 36 illustrates a schematic view of an online model management interface according to an embodiment of the present disclosure;

FIG. 37 illustrates a schematic view of a model monitoring task interface according to an embodiment of the present disclosure;

FIG. 38 illustrates a schematic view of a monitoring task creation interface according to an embodiment of the present disclosure;

DETAILED DESCRIPTION

The following description provides particular details of various embodiments of the present disclosure so that those skilled in the art may fully understand and implement various embodiments of the present disclosure. It should be understood that the technical solution of the present disclosure may be implemented without some of these details. In some instances, the present disclosure does not show or describe in detail some familiar structures or functions so as to avoid these unnecessary descriptions from obscuring the description of the embodiments of the present disclosure. Terms used in the present disclosure should be understood in their broadest reasonable manner, even if they are used in conjunction with particular embodiments of the present disclosure.

Figure 1:
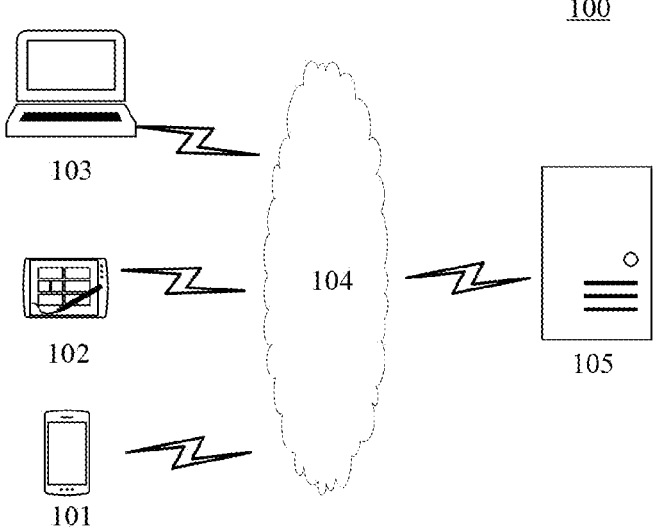
FIG. 1 illustrates a schematic view of an exemplary system architecture to which an embodiment of the present disclosure may be applied.

FIG. 1 illustrates a schematic view of a system architecture of an exemplary application environment to which a method for determining an image category, a method for determining a confidence threshold, and a method for determining a target model according to an embodiment of the present disclosure may be applied.

As shown in FIG. 1, a system architecture 100 may include a network 104, a server 105 and one or more of terminal devices 101, 102 and 103. The network 104 is a medium for providing a communication link between the terminal devices 101, 102 and 103 and the server 105. The network 104 may include various connection types, such as wired, wireless communication links, or fiber optic cables. The terminal devices 101, 102, and 103 may be various computing devices having a computing or processing function, including but not limited to a desktop computer, a portable computer, a smart phone, a tablet computer, and the like. It should be understood that the numbers of terminal devices, networks and servers in FIG. 1 are merely illustrative. There may be any number of terminal devices, networks and servers according to the implementation need. For example, the server 105 may be a server cluster composed of a plurality of servers.

A method (including one or more of a method for determining an image category, a method for determining a confidence threshold, and a method for determining a target model) provided in an embodiment of the present disclosure may be executed by the terminal devices 101, 102, and 103, and correspondingly, a device for determining an image category, a device for determining a confidence threshold, and a device for determining a target model provided in an embodiment of the present disclosure may be implemented (as a computer application or product) in the terminal devices 101, 102, and 103. However, those skilled in the art may easily understand that the method provided by an embodiment of the present disclosure may also be executed by the server 105, or may be jointly executed by the terminal devices 101, 102, and 103 and the server 105, which is not limited in the embodiment. For example, in an exemplary embodiment, the terminal devices 101, 102, and 103 may acquire a sample data set including a plurality of sample images that have been labeled with a category, and then send the sample data set to the server 105. The server divides the sample data set into a training data set and a verification data set, trains a deep learning model by using the training data set to obtain an image classification model, and determines a confidence threshold for the image classification model in predicting each category by using the verification data set. The user then obtains a target image via the terminal devices 101, 102, 103 and transmits the target image to the server 105. The server predicts the target image of the user based on the determined confidence threshold by using the image classification model to obtain the category of the target image, and then transmits the category of the target image to the terminal devices 101, 102, 103. Alternatively, the server divides the sample data set to obtain a training data set and a verification data set, trains a deep learning model by using the training data set to obtain at least two trained models, generates, based on the verification data set, a verification test index including at least one of a confusion matrix, an accuracy rate, a recall rate and an F1 score, and determines, according to the verification test index generated, the target model from the at least two trained models. The user then acquires a to-be-tested image of the target object via the terminal devices 101, 102, 103, and then transmits the to-be-tested image of the target object to the server 105. The server uses the determined target model to predict the to-be-tested image of the target object to obtain the category of the to-be-tested image, and then transmits the category of the to-be-tested image to the terminal devices 101, 102, 103.

An exemplary embodiment of the present disclosure provides a computing device for implementing the above method, which may be the terminal devices 101, 102 and 103 or the server 105 in FIG. 1. The computing device includes at least a processor and a memory for storing executable instructions of the processor, and the processor is configured to perform the above method by executing the executable instructions.

In an exemplary embodiment of the present disclosure, the above system architecture may be a distributed system, which may be a system formed by a group of computers which are interconnected, transmit messages, communicate with each other and coordinate behaviors through a network. The network may be the Internet of Things based on the Internet and/or a telecommunication network, which may be a wired network or a wireless network, for example a local area network (LAN), a metropolitan area network (MAN), a wide area network (WAN)), a cellular data communication networks and other electronic networks that can realize the function of information exchange. The distributed system may have software components such as software objects or other types of individually addressable isolated entities such as distributed objects, agents, actors, virtual components, and the like. Typically, each such component is individually addressable and has a unique identity (such as an integer, GUID, string, or opaque data structure) in the distributed system. In a distributed system that allows geographic distribution, an application may be deployed to reside in a cluster. There are various systems, components, and network configurations that support a distributed computing environment.

The distributed system provides sharing of computer resources and services through communication exchanges between computing devices and systems. These resources and services include information exchange, cache storage, and disk storage for objects (e.g., files). These resources and services also include the sharing of processing capacities across a plurality of processing units for load balancing, resource scaling, specialization of processing and the like. For example, the distributed system may include a host having for example client devices/servers and network topologies and network infrastructures of peer-to-peer or hybrid architectures.

The structure of the computing device will be described below by taking a mobile terminal 200 in FIG. 2 as an example. It would be understood by those skilled in the art that the configuration in FIG. 2 may also be applied to a device of a stationary type, in addition to components specifically for a mobile purpose. In other embodiments, the mobile terminal 200 may include more or fewer components than that shown in the figure, or combine some components, or separate some components, or include different component arrangements. The illustrated component may be implemented in hardware, software, or a combination of software and hardware. An interface connection relationship between the components is only schematically shown, and does not constitute a structural limitation on the mobile terminal 200. In other embodiments, the mobile terminal 200 may also adopt an interface connection manner different from that in FIG. 2, or a combination of a plurality of interface connection manners.

Figure 2:
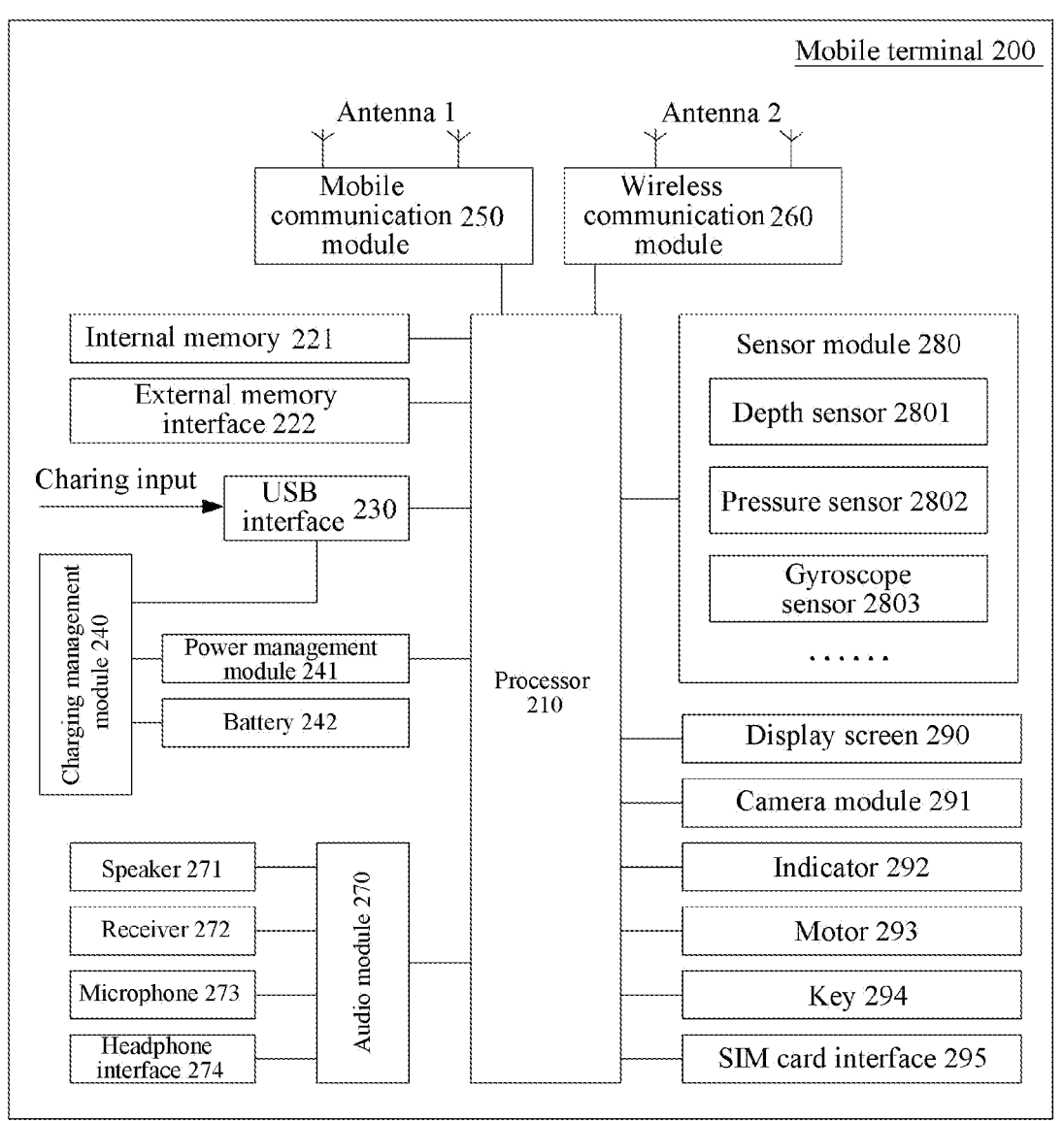
FIG. 2 illustrates a schematic view of a computing device to which an embodiment of the present disclosure may be applied.

As shown in FIG. 2, the mobile terminal 200 may specifically include: a processor 210, an internal memory 221, an external memory interface 222, a universal serial bus (USB) interface 230, a charging management module 240, a power management module 241, a battery 242, an antenna 1, an antenna 2, a mobile communication module 250, a wireless communication module 260, an audio module 270, a speaker 271, a receiver 272, a microphone 273, a headphone interface 274, a sensor module 280, a display screen 290, a camera module 291, an indicator 292, a motor 293, a key 294, a subscriber identification module (SIM) card interface 295, and the like. The sensor module 280 may include a depth sensor 2801, a pressure sensor 2802, a gyroscope sensor 2803, and the like.

The processor 210 may include one or more processing units, for example, the processor 210 may include an application processor (AP), a modem processor, a graphics processing unit (GPU), an image signal processor (ISP), a controller, a video codec, a digital signal processor (DSP), a baseband processor and/or a neural-network processing unit (NPU), and the like. Different processing units may be independent devices, or may be integrated in one or more processors.

The NPU is a neural network (NN) computing processor, which can quickly process input information and continuously learn by referring to a biological neural network structure such as a transmission mode between neurons in human brain. An application such as intelligent cognition (for example, image recognition, face recognition, speech recognition, text understanding) of the mobile terminal 200 may be implemented through the NPU.

A memory is provided in the processor 210. The memory may store instructions for implementing six modular functions: detection instructions, connection instructions, information management instructions, analysis instructions, data transmission instructions, and notification instructions, and the execution thereof is controlled by the processor 210.

The charging management module 240 is used to receive charging input from a charger. The power management module 241 is used for connecting the battery 242, the charging management module 240 and the processor 210. The power management module 241 receives input from the battery 242 and/or the charging management module 240, and supplies power to the processor 210, internal memory 221, display screen 290, camera module 291, wireless communication module 260, and the like.

The wireless communication function of the mobile terminal 200 may be implemented by the antenna 1, the antenna 2, the mobile communication module 250, the wireless communication module 260, the modem processor, the baseband processor, and the like. The antenna 1 and the antenna 2 are used for transmitting and receiving electromagnetic wave signals; the mobile communication module 250 may provide a wireless communication solution including 2G/3G/4G/5G applied to the mobile terminal 200; the modem processor may include a modulator and a demodulator; and the wireless communication module 260 may provide a wireless communication solution including a wireless local area network (WLAN) (such as wireless fidelity (Wi-Fi) network, Bluetooth (BT) and the like) applied to the mobile terminal 200. In some embodiments, the antenna 1 of the mobile terminal 200 is coupled with the mobile communication module 250, and the antenna 2 is coupled with the wireless communication module 260, so that the mobile terminal 200 may communicate with the network and other devices through wireless communication technology.

The mobile terminal 200 implements a display function through the GPU, display screen 290, application processor, and the like. The GPU is a microprocessor for image processing, and is connected to the display screen 290 and the application processor. The GPU is used to perform mathematical and geometric calculations for graphics rendering. The processor 210 may include one or more GPUs that execute program instructions to generate or alter display information.

The mobile terminal 200 may implement a shooting/ photographing function through the ISP, camera module 291, video codec, GPU, display screen 290, application processor, and the like. The ISP is used to process data fed back by the camera module 291; the camera module 291 is used to capture still images or videos; the digital signal processor is used to process digital signals, and may also process other digital signals than the digital image signal; the video codec is used to compress or decompress the digital video, and the mobile terminal 200 may also support one or more video codecs.

The external memory interface 222 may be used to connect to an external memory card, such as a Micro SD card, to expand the storage capacity of the mobile terminal 200. The external memory card communicates with the processor 210 through the external memory interface 222 to realize the data storage function. For example, files such as music, video may be stored in external memory card.

The internal memory 221 may be used to store computer executable program codes, which include instructions. The internal memory 221 may include a program-storing area and a data-storing area. The program-storing area may store an operating system, an application program required for at least one function (such as a sound playback function, an image playback function), and the like. The data-storing area may store data (such as audio data, phone book) created during the use of the mobile terminal 200 and the like. In addition, the internal memory 221 may include a high-speed random access memory, and may also include a non-volatile memory, such as at least one magnetic disk storage device, flash memory device, universal flash storage (UFS), and the like. The processor 210 executes various functional applications and data processing of the mobile terminal 200 by executing instructions stored in the internal memory 221 and/or instructions stored in a memory provided in the processor.

The mobile terminal 200 may implement audio functions (such as music playback, recording) through the audio module 270, speaker 271, receiver 272, microphone 273, headphone interface 274, application processor, and the like.

The depth sensor 2801 is used to acquire depth information of scene. In some embodiments, the depth sensor may be provided in the camera module 291.

The pressure sensor 2802 is used to sense pressure signals, and may convert the pressure signals into electrical signals. In some embodiments, the pressure sensor 2802 may be provided in the display screen 290. There are many types of pressure sensors 2802, such as resistive pressure sensor, inductive pressure sensor, capacitive pressure sensor, and the like.

The gyroscope sensor 2803 may be used to determine a motion attitude of the mobile terminal 200. In some embodiments, an angular velocity of the mobile terminal 200 about three axes (i.e., x, y and z axes) may be determined by the gyroscope sensor 2803. The gyroscope sensor 2803 may be used for image stabilization, navigation, and somatosensory game scenes.

In addition, sensors with other functions such as an air pressure sensor, a magnetic sensor, an acceleration sensor, a distance sensor, a proximity light sensor, a fingerprint sensor, a temperature sensor, a touch sensor, an ambient light sensor, and a bone conduction sensor may also be provided in the sensor module 280 according to actual needs.

The mobile terminal 200 may further include other devices providing auxiliary functions. For example, the key 294 includes a power-on key, a volume key and the like, and a user may input by pressing the key to generate key signal input related to user settings and function control of the mobile terminal 200. Another example is the indicator 292, the motor 293, the SIM card interface 295, and the like.

In the related art, in the field of screen production, as there may be a problem in aspects such as equipment, parameter, operation and environmental interference, a product produced may have a defect. A detection is performed by using AOI after each process, and a large amount of image data may be generated. Professional operators are required to determine defect levels of these images and classify these images. With the rise of artificial intelligence algorithms such as deep learning, AI algorithms are introduced into the process, which can greatly improve the processing efficiency and accuracy.

FIG. 3 illustrates a schematic flowchart of a method 300 for determining an image category according to an embodiment of the present disclosure. The method for determining the image category as described may be implemented, for example, by the terminal device 101, 102, 103, a server 105 or a combination thereof as shown in FIG. 1. As shown in FIG. 3, the method 300 described includes the following steps.

At step 310, a sample data set is acquired. The sample data set includes a plurality of sample images that have been labeled with a category. The plurality of sample images includes images corresponding to a sample product, and the labeled category is a product defect category. Herein, the product may for example be a display screen, a display panel and the like, and the labeled category may refer to a display screen defect category such as presence of residue, presence of dust, too thin or too thick electrical line and the like.

At step 320, the sample data set is divided into a training data set and a verification data set. The training data set will be used to train a deep learning model to obtain an image classification model. The verification data set will be used to determine a confidence threshold for the image classification model in predicting each category. In some embodiments, the sample data set may be divided into the training data set and the verification data set in a ratio of 9:1, i.e. the training data includes 90% of the sample images in the sample data set and the verification data set includes 10% of the sample images in the sample data set. Of course, such a division ratio is not mandatory, and other division ratios may be used as required. Typically, the division ratio of 9:1 provides a better balance between training and determining the confidence threshold, resulting in a better use of the trained model and the determined confidence threshold.

At step 330, a deep learning model is trained by using the training data set to obtain an image classification model. The image classification model is used to output, based on the image input into the image classification model, the category of the input image and a confidence corresponding to the output category of the input image.

In some embodiments, the deep learning model may be a convolutional neural network (CNN) model, a target detection convolutional neural network (faster-RCNN) model, a recurrent neural network (RNN) model, and a generative adversarial network (GAN) model, which however is not limited thereto, and other neural network models known to those skilled in the art may also be used.

In some embodiments, a training parameter for training the deep learning model may be configured in advance, and the training parameter includes at least a category for training, a type of the deep learning model, a learning rate descent strategy, a total number of training rounds and a test strategy. The training parameter may also include a size of the image input into the deep learning model.

It should be noted that in the present disclosure, that the image classification model outputs the category of the image refers to that the image classification model predicts the category of the image. In other words, the terms "output" and "predict" may be used equivalently and have the same meaning with respect to the image classification model. For example, that the image classification model is used to output the category of the input image based on the image input into the image classification model may also be expressed as that the image classification model is used to predict the category of the input image based on the image input into the image classification model.

At step 340, a confidence threshold for the image classification model in outputting each category is determined by using the verification data set, such that the image classification model satisfies a predetermined accuracy rate or a predetermined recall rate when outputting. The accuracy rate represents a ratio of the number of images with a corresponding category being correctly output to the number of images with said corresponding category being output, and the recall rate represents a ratio of the number of images with a corresponding category being correctly output to the true number of images with said corresponding category.

In practice, it is necessary to set the confidence threshold for the image classification model in predicting each category, so that the image classification model achieves a particular accuracy rate or recall rate in predicting each category, or achieves a balance between the accuracy rate and the recall rate and thus the prediction of the classification model is more efficient. In the related art, the confidence is generally set in a simple "one-size-fits-all" manner, i.e. the same confidence is set for all trained categories. In an embodiment of the present disclosure, it may train the image classification model by using the training data set and then use the verification data set to determine the confidence threshold for the image classification model in predicting each category, such that the image classification model meets a predetermined accuracy rate or a predetermined recall rate in predicting each category. This allows for fast calculation of the confidence threshold and integration with the training process for calculation, making it intuitive to know the confidence threshold for each category after training the model. Furthermore, for the case where the distribution of sample categories is very uneven, the prediction or classification accuracy of each category is controlled by subdividing the confidence threshold for each category, which is beneficial in achieving a balance between the prediction accuracy rate and recall rate of the deep learning model.

It should be noted that any suitable method may be used to determine the confidence threshold for the image classification model in predicting each category by using the verification data set, so that the image classification model meets a predetermined accuracy rate or a predetermined recall rate in the prediction, which is not restrictive herein.

At step 350, the target image is input into the image classification model and the category of the target image is obtained based on the determined confidence threshold. The target image described here and the sample image described above are of the same type of images. For example, the target image is also the image corresponding to the target product. The target product described here may for example be a display screen, a display panel and the like. The category of the target image may be a display screen defect category, e.g. presence of residue, presence of dust, too thin or too thick electrical line and the like.

In the method for determining the image category described in the embodiment of the present disclosure, the labeled sample data set is divided into the training data set and the verification data set, the image classification model is trained by using the training data set, the verification data set is used to determine the confidence threshold for the image classification model in predicting each category, such that the image classification model satisfies a predetermined accuracy rate or a predetermined recall rate in the prediction thereof. This allows for fast calculation of the confidence threshold and integration with the training process for calculation, making it intuitive to know the confidence threshold for each category after training the model. Furthermore, for the case where the distribution of sample categories is very uneven, the technical solution of the present disclosure may control the prediction or classification accuracy of each category by subdividing the confidence threshold for each category, which can well handle the recognition of each category by the deep learning model and is beneficial in achieving a balance between the prediction accuracy rate and recall rate of the deep learning model, thereby improving the efficiency of the classification of the target image.

FIG. 4 illustrates an exemplary flowchart of a method 400 for determining a confidence threshold for an image classification model in predicting each category using a verification data set according to an embodiment of the present disclosure. The method 400 may be implemented, for example, by the terminal devices 101, 102, 103, the server 105, or a combination thereof, as shown in FIG. 1. As shown in FIG. 4, the method 400 includes the following steps.

At step 410, each sample image in the verification data set is input into the image classification model to obtain an output category of each sample image in the verification data set and a corresponding confidence. The image classification model may be the image classification model obtained above at step 330, and the image classification model may predict the category of the input image and the confidence corresponding to the predicted category of the input image.

At step 420, each of the output categories is selected separately and the sample images with the selected category being output are sorted from highest to lowest according to corresponding confidences. As described above, the accuracy rate represents a ratio of the number of images with a corresponding category being correctly predicted to the number of images with said corresponding category being predicted. Thus, in this manner, the sample images with the selected category being predicted may be sorted from highest to lowest according to corresponding confidences, thereby facilitating the verification of the prediction accuracy rate of the image classification model.

At step 430, a target sample image is determined from the sample images with the selected category sorted from highest to lowest according to the corresponding confidences, such that a ratio of the number of sample images with the category being correctly output in a specified sample image set to the number of sample images in the specified sample image set is less than the predetermined accuracy rate. The sample images with the category being correctly output include sample images with the output category being the same as the labeled category, and the sample images in the specified sample image set include the target sample image and the sample image, with the corresponding confidence being higher than that of the target sample image, among the sample images with the selected category being output. In some embodiments, the sample images with the selected category being predicted may be traversed sequentially in a descending order of confidence until the ratio of the number of sample images, with the category being correctly predicted, among the traversed sample images to the number of traversed sample images is less than the predetermined accuracy rate. The sample images with the category being correctly predicted include sample images with the predicted category being the same as the labeled category, and the traversed sample images include a currently traversed sample image and the sample image traversed before a current traversal. As an example, among 1000 sample images that have been traversed and is sorted in the descending order of confidence (where the 1000 sample images are predicted to be of the same category), the category of 900 sample images is correctly predicted (i.e., the predicted category is the same as the labeled category), and the category of 100 sample images is not correctly predicted, therefore the ratio of the number of sample images, with the category being correctly predicted, among the traversed sample images to the number of traversed sample images is 0.9. This step may be used to find two critical images when the accuracy rate index is not satisfied. The predetermined accuracy rate may be determined according to an actual requirement, which represents the accuracy rate index that the image classification model needs to achieve in prediction. As an example, if the current traversal is the fifth traversal, then the traversals prior to the current traversal are the first to fourth traversals and the last traversal is the fourth traversal.

At step 440, the confidence threshold corresponding to the selected category is determined based on the confidence corresponding to the sample image in the specified sample image set. For example, the confidence threshold corresponding to the selected category may be determined by calculating a weighted sum of the confidences corresponding to the sample images in the specified sample image set, or the confidence corresponding to the previous sample image to the target sample image in the sample images with the selected category sorted from highest to lowest according to the corresponding confidences may be determined directly as the confidence threshold corresponding to the selected category. The weighting and the weight used here may be set as desired.

In some embodiments, the confidence threshold corresponding to the selected category may be determined based on the confidence corresponding to the target sample image and the confidence corresponding to the previous sample image to the target sample image in the sample images with the selected category sorted from highest to lowest according to the corresponding confidences. For example, a weighted sum of the confidence corresponding to the target sample image and the confidence corresponding to the previous sample image may be determined as the confidence threshold corresponding to the selected category. Specifically, an average of the confidence corresponding to the target sample image and the confidence corresponding to the previous sample image is determined as the confidence threshold corresponding to the selected category.

The above embodiments of the present disclosure provide a method for dynamically calculating a confidence threshold for an image classification model in predicting each category, which may maximize the recall rate of the model while ensuring a predetermined accuracy rate of the model.

FIG. 5 illustrates an exemplary implementation flowchart 500 of a method 400 for determining a confidence threshold for an image classification model in predicting each category by using a verification data set according to an embodiment of the present disclosure. As shown in FIG. 500, after step 420 described above, i.e., after selecting the predicted category and sorting the sample images with the selected category being predicted from highest to lowest according to the corresponding confidences, the parameter may be initialized at 510, such that the number of traversed images total_nums=0, the number of correct images correct_nums=0, the confidence corresponding to the currently traversed image curScore=1, the confidence corresponding to the last image lastScore=1, and the predetermined accuracy rate correctRate_metrix=0.95.

Then, the sample images with the selected category being predicted are traversed sequentially in a descending order of confidence, and at 520, it is determined whether the predicted category of the sample image is the same as the labeled category. If they are the same, the parameter is updated at 530: the number of correct images correct_nums+=1, the number of traversed images total_nums+=1, lastScore=curScore, and the confidence corresponding to the currently traversed image curScore=the confidence of the sample image being currently traversed. If they are different, the parameter is updated at 540: the number of traversed images total_nums+=1, lastScore=curScore, the confidence of the currently traversed image curScore=the confidence of the sample image being currently traversed, but the number of correct images correct_nums remains the same.

Then, at 550, it is determined whether the accuracy rate is greater than the predetermined accuracy rate correctRate_metrix. The accuracy rate is the ratio of the number of correct images correct_nums to the number of traversed images total_nums. To avoid a case of the denominator being 0, the accuracy rate may be expressed as correct_nums/(total_nums+0.0001). If the accuracy rate>the predetermined accuracy rate correctRate_metrix, then it continues traversing the next image.

If the accuracy rate<=the predetermined accuracy rate correctRate_metrix, the next image is not traversed. Then, at 560, the average of the confidence corresponding to the currently traversed sample image and the confidence corresponding to the last traversed sample image may be determined as the confidence threshold corresponding to the selected category, i.e., the confidence threshold Confidence_TH=(lastScore+curScore)/2.

The calculation of confidence for the remaining selected categories is then performed in a similar manner until the calculation has been performed for all categories.

In the above manner, a simple and efficient method for dynamically calculating a confidence threshold for an image classification model in predicting each category is provided, which may maximize the recall rate of the model while ensuring the predetermined accuracy rate of the model. According to the confidence threshold obtained from the above dynamic calculation, for most of the categories, the requirement may be met in the production line inference. However, the confidence threshold obtained for some categories may be very low (e.g., below 0.5), which may lead to other categories being misclassified as this category, resulting in the category being classified more. Therefore, in such cases, post-processing may be added to adjust the confidence threshold below 0.5 to be 0.5.

It should be noted that in some cases, there may be a plurality of product defects in the sample product and therefore the sample image corresponding to the sample product may be labelled with a plurality of categories. In such cases, in some embodiments, the plurality of categories may be provided with different priorities so that a more important product defect has a higher priority. At the same time, the category with a higher priority is provided with a lower confidence threshold so that the image classification model better meets a predetermined accuracy rate in the output thereof. Of course, if the confidence thresholds corresponding to two categories differ by a relatively large amount (e.g., greater than a predetermined difference threshold, e.g., 0.5), the priorities of both are no longer considered.

FIG. 6 illustrates an exemplary flowchart of a method for determining a confidence threshold for an image classification model in predicting respective categories using a verification data set according to an embodiment of the present disclosure. The method 600 may be implemented, for example, by the terminal device 101, 102, 103, the server 105, or a combination thereof, as shown in FIG. 1. As shown in FIG. 6, the method 600 includes the following steps.

At step 610, each sample image in the verification data set is input into the image classification model to obtain an output category of each sample image in the verification data set and a corresponding confidence. The image classification model may be the image classification model obtained above at step 330, and the image classification model may predict the category of the input image and the confidence corresponding to the predicted category of the input image.

At step 620, each of the labeled categories is selected separately and the sample images labeled as the selected category are sorted from highest to lowest according to the corresponding confidences. As mentioned previously, the recall rate represents a ratio of the number of images with a corresponding category being correctly predicted to the true number of images with said corresponding category. Herein, the true number of images with the corresponding category is the number of sample images labelled with the corresponding category. Thus in this way, the sample images labelled with the corresponding category may be sorted from highest to lowest according to the corresponding confidences, thereby facilitating examination of the recall rate of the image classification model.

At step 630, a target sample image is determined from the sample images with the selected category sorted from highest to lowest according to the corresponding confidences, such that a ratio of the number of sample images with the category being correctly output in a specified sample image set to the number of sample images in the specified sample image set is less than the predetermined recall rate. The sample images with the category being correctly output include sample images with the output category being the same as the labeled category, and the sample images in the specified sample image set include the target sample image and the sample image, with the corresponding confidence being higher than that of the target sample image, among the sample images labeled with the selected category. In some embodiments, the sample images labeled with the selected category may be traversed sequentially in a descending order of confidence until the ratio of the number of sample images, with the category being correctly predicted, among the traversed sample images to the number of traversed sample images is less than the predetermined recall rate. The sample images with the category being correctly predicted include sample images with the predicted category being the same as the labeled category, and the traversed sample images include a currently traversed sample image and the sample image traversed before a current traversal. As an example, among 1000 sample images that have been traversed and are sorted in the descending order of confidence (where the 1000 sample images are labeled with the same category), the category of 900 sample images is correctly predicted (i.e., the predicted category is the same as the labeled category), and the category of 100 sample images is not correctly predicted, therefore the ratio of the number of sample images, with the category being correctly predicted, among the traversed sample images to the number of traversed sample images is 0.9. This step may be used to find two critical sample images when the predetermined recall rate is not satisfied. The predetermined recall rate may be determined according to an actual requirement, which represents the recall rate index that the image classification model needs to achieve in prediction. As an example, if the current traversal is the fifth traversal, then the traversals prior to the current traversal are the first to fourth traversals and the last traversal is the fourth traversal.

At step 640, the confidence threshold corresponding to the selected category is determined based on the confidence corresponding to the sample image in the specified sample image set. For example, the confidence threshold corresponding to the selected category may be determined by calculating a weighted sum of the confidences corresponding to the sample images in the specified sample image set, or the confidence corresponding to the previous sample image to the target sample image in the sample images with the selected category sorted from highest to lowest according to the corresponding confidences may be determined directly as the confidence threshold corresponding to the selected category. The weighting and the weight used here may be set as desired.

In some embodiments, the confidence threshold corresponding to the selected category may be determined based on the confidence corresponding to the target sample image and the confidence corresponding to the previous sample image to the target sample image in the sample images with the selected category sorted from highest to lowest according to the corresponding confidences. For example, a weighted sum of the confidence corresponding to the target sample image and the confidence corresponding to the previous sample image may be determined as the confidence threshold corresponding to the selected category. Specifically, an average of the confidence corresponding to the target sample image and the confidence corresponding to the previous sample image is determined as the confidence threshold corresponding to the selected category.

The above embodiments of the present disclosure provide a method for dynamically calculating a confidence threshold for an image classification model in predicting each category, which may maximize the accuracy rate of the model while ensuring a predetermined recall rate of the model.

Figure 7:
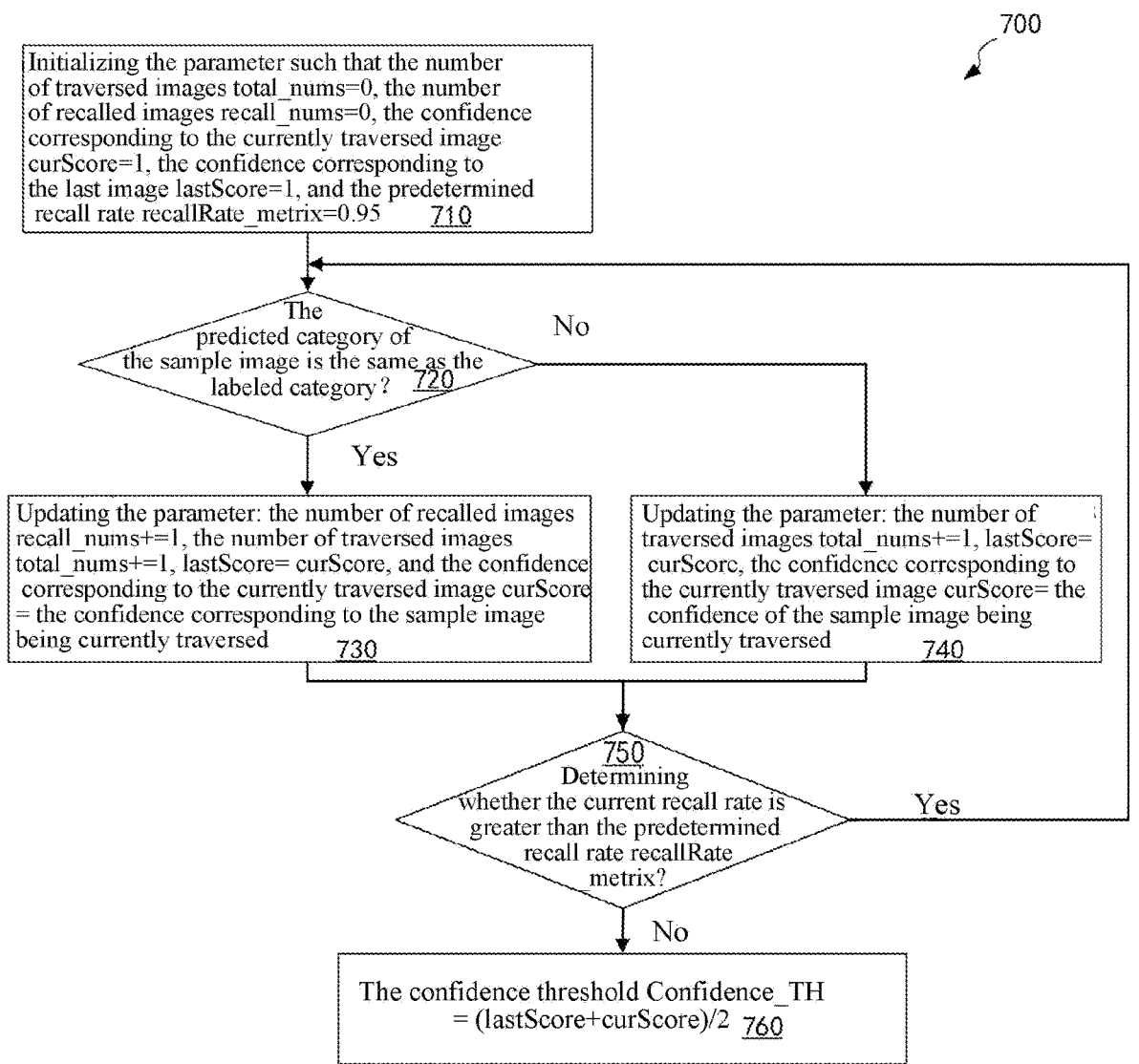
FIG. 7 illustrates an exemplary implementation flowchart of a method for determining a confidence threshold for an image classification model in predicting respective categories using a verification data set according to an embodiment of the present disclosure.

FIG. 7 illustrates an exemplary implementation flowchart 700 of a method 600 for determining a confidence threshold for an image classification model in predicting each category by using a verification data set according to an embodiment of the present disclosure. As shown in FIG. 700, after step 620 described above, i.e., after selecting the labeled category and sorting the sample images labeled with the selected category from highest to lowest according to the corresponding confidences, the parameter may be initialized at 710, such that the number of traversed images total_nums=0, the number of recalled images recall_nums=0, the confidence corresponding to the currently traversed image curScore=1, the confidence corresponding to the last image lastScore=1, and the predetermined recall rate recallRate_metrix=0.95.

Then, the sample images labeled with the selected category are traversed sequentially in a descending order of confidence, and at 720, it is determined whether the predicted category of the sample image is the same as the labeled category. If they are the same, the parameter is updated at 730: the number of recalled images recall_nums+=1, the number of traversed images total_nums+=1, lastScore=curScore, and the confidence corresponding to the currently traversed image curScore=the confidence corresponding to the sample image being currently traversed. If they are different, the parameter is updated at 740: the number of traversed images total_nums+=1, lastScore=curScore, the confidence corresponding to the currently traversed image curScore=the confidence of the sample image being currently traversed, but the number of recalled images recall_nums remains the same.

Then, at 750, it is determined whether the current recall rate is greater than the predetermined recall rate recallRate_metrix. The current recall rate is the ratio of the number of recalled images recall_nums to the number of traversed images total_nums. To avoid a case of the denominator being 0, the current recall rate may be expressed as recall_nums/(total_nums+0.0001). If the recall rate>the predetermined recall rate recallRate_metrix, then it continues traversing the next image.

If the current recall rate<=the predetermined recall rate recallRate_metrix, the next image is not traversed. Then, at 760, the average of the confidence corresponding to the currently traversed sample image and the confidence corresponding to the last traversed sample image may be determined as the confidence threshold corresponding to the selected category, i.e., the confidence threshold Confidence_TH=(lastScore+curScore)/2.

The calculation of confidence for the remaining selected categories is then performed in a similar manner until the calculation has been performed for all categories.

In the above manner, a simple and efficient method for dynamically calculating a confidence threshold for an image classification model in predicting each category is provided, which may maximize the accuracy rate of the model while ensuring the predetermined recall rate of the model. According to the confidence threshold obtained from the above dynamic calculation, for most of the categories, the requirement may be met in the production line inference. However, the confidence threshold obtained for some categories may be very low (e.g., below 0.5), which may lead to other categories being misclassified as this category, resulting in the category being classified more. Therefore, in such cases, post-processing may be added to adjust the confidence threshold below 0.5 to be 0.5.

It should be noted that in some cases, there may be a plurality of product defects in the sample product and therefore the sample image corresponding to the sample product may be labelled with a plurality of categories. In such cases, in some embodiments, the plurality of categories may be provided with different priorities so that a more important product defect has a higher priority. At the same time, the category with a higher priority is provided with a lower confidence threshold so that the image classification model better meets a predetermined recall rate in the output thereof. Of course, if the confidence thresholds corresponding to two categories differ by a relatively large amount (e.g., greater than a predetermined difference threshold, e.g., 0.5), the priorities of both are no longer considered.

FIG. 8 illustrates an exemplary flowchart of a method 800 for determining a confidence threshold according to an embodiment of the present disclosure. The method for determining the confidence threshold may be implemented, for example, by the terminal device 101, 102, 103, the server 105, or a combination thereof, as shown in FIG. 1. As shown in FIG. 8, the method 800 includes the following steps.

At step 810, a sample data set is acquired. The sample data set includes a plurality of sample images that have been labeled with a category. The plurality of sample images includes images corresponding to a sample product, and the labeled category is a product defect category. Herein, the product may for example be a display screen, a display panel and the like, and the labeled category may refer to a display screen defect category such as presence of residue, presence of dust, too thin or too thick electrical line and the like.

At step 820, the sample data set is divided into a training data set and a verification data set. The training data set will be used to train a deep learning model to obtain an image classification model. The verification data set will be used to determine a confidence threshold for the image classification model in predicting each category. In some embodiments, the sample data set may be divided into the training data set and the verification data set in a ratio of 9:1, i.e. the training data includes 90% of the sample images in the sample data set and the verification data set includes 10% of the sample images in the sample data set. Of course, such a division ratio is not mandatory, and other division ratios may be used as required. Typically, the division ratio of 9:1 provides a better balance between training and determining the confidence threshold, resulting in a better use of the trained model and the determined confidence threshold.

At step 830, a deep learning model is trained by using the training data set to obtain an image classification model. The image classification model is used to output, based on the image input into the image classification model, the category of the input image and a confidence corresponding to the output category of the input image. In some embodiments, the deep learning model may be a convolutional neural network (CNN) model, a target detection convolutional neural network (faster-RCNN) model, a recurrent neural network (RNN) model, and a generative adversarial network (GAN) model, which however is not limited thereto, and other neural network models known to those skilled in the art may also be used.

In some embodiments, a training parameter for training the deep learning model may be configured in advance, and the training parameter includes at least a category for training, a type of the deep learning model, a learning rate descent strategy, a total number of training rounds and a test strategy. The training parameter may also include a size of the image input into the deep learning model.

At step 840, a confidence threshold for the image classification model in outputting each category is determined by using the verification data set, such that the image classification model satisfies a predetermined accuracy rate or a predetermined recall rate in outputting each category. The accuracy rate represents a ratio of the number of images with a corresponding category being correctly output to the number of images with said corresponding category being output, and the recall rate represents a ratio of the number of images with a corresponding category being correctly output to the true number of images for said corresponding category. It should be noted that any suitable method may be used to determine the confidence threshold for the image classification model in predicting each category by using the verification data set, so that the image classification model meets a predetermined accuracy rate or a predetermined recall rate in the prediction, which is not restrictive herein.

In the method for determining the confidence threshold according to the embodiment of the present disclosure, the labeled sample data set is divided into the training data set and the verification data set, the training data set is used to train and obtain the image classification model and then the verification data set is used to determine the confidence threshold for the image classification model in predicting each category, such that the image classification model meets a predetermined accuracy rate or a predetermined recall rate in predicting each category. This allows for fast calculation of the confidence threshold and integration with the training process for calculation, making it intuitive to know the confidence threshold for each category after training the model. Furthermore, for the case where the distribution of sample categories is very uneven, the technical solution of the present disclosure may control the prediction or classification accuracy of each category is by subdividing the confidence threshold for each category, which can well handle the recognition of each category by the deep learning model and is beneficial in achieving a balance between the prediction accuracy rate and recall rate of the deep learning model, thereby improving the efficiency of the classification of the image classification model.

It should be understood that the present embodiment is concerned with the process of determining the confidence threshold for the image classification model, while the embodiment described with reference to FIG. 3 is concerned with the process of building and using the image classification model. Accordingly, the relevant embodiments described above with reference to FIGS. 3 to 7 are also applicable to the present embodiment, and the details of which are not detailed here.

Thus, in some embodiments, determining the confidence threshold for the image classification model in outputting each category by using the verification data set includes: inputting each sample image in the verification data set into the image classification model to obtain an output category of each sample image in the verification data set and a corresponding confidence; separately selecting each of the output categories and sorting the sample images with the selected category being output from highest to lowest according to corresponding confidences; determining a target sample image from the sample images with the selected category sorted from highest to lowest according to the corresponding confidences, such that a ratio of the number of sample images with the category being correctly output in a specified sample image set to the number of sample images in the specified sample image set is less than the predetermined accuracy rate, wherein the sample images with the category being correctly output include sample images with the output category being the same as the labeled category, and the sample images in the specified sample image set include the target sample image and the sample image, with the corresponding confidence being higher than that of the target sample image, among the sample images with the selected category being output; and determining the confidence threshold corresponding to the selected category based on the confidence corresponding to the sample image in the specified sample image set.

In some embodiments, determining the confidence threshold for the image classification model in outputting each category by using the verification data set includes: inputting each sample image in the verification data set into the image classification model to obtain an output category of each sample image in the verification data set and a corresponding confidence; separately selecting each of the labeled categories and sorting the sample images labeled with the selected category from highest to lowest according to the corresponding confidences; determining a target sample image from the sample images with the selected category sorted from highest to lowest according to the corresponding confidences, such that a ratio of the number of sample images with the category being correctly output in a specified sample image set to the number of sample images in the specified sample image set is less than the predetermined recall rate, wherein the sample images with the category being correctly output include sample images with the output category being the same as the labeled category, and the sample images in the specified sample image set include the target sample image and the sample image, with the corresponding confidence being higher than that of the target sample image, among the sample images labeled with the selected category; and determining the confidence threshold corresponding to the selected category based on the confidence corresponding to the sample image in the specified sample image set.

Determining the confidence threshold corresponding to the selected category based on the confidence corresponding to the sample image in the specified sample image set, includes: determining the confidence threshold corresponding to the selected category based on the confidence corresponding to the target sample image and the confidence corresponding to the previous sample image to the target sample image in the sample images with the selected category sorted from highest to lowest according to the corresponding confidences.

Determining the confidence threshold corresponding to the selected category based on the confidence corresponding to the target sample image and the confidence corresponding to the previous sample image to the target sample image in the sample images with the selected category sorted from highest to lowest according to the corresponding confidences, includes: determining an average of the confidence corresponding to the currently traversed sample image and the confidence corresponding to the previous sample image as the confidence threshold corresponding to the selected category.

FIG. 9 illustrates a schematic flowchart of a method 900 for determining a confidence threshold according to an embodiment of the present disclosure. The method for determining the confidence threshold as described may be implemented, for example, by the terminal device 101, 102, 103, the server 105 or a combination thereof as shown in FIG. 1. As shown in FIG. 9, the method 900 described includes the following steps.

At step 910, a sample data set is acquired in response to parameter configuration operation of a user on the sample data set. The sample data set includes a plurality of sample images that have been labeled with a category. The plurality of sample images includes images corresponding to a sample product, and the labeled category is a product defect category. Herein, the product may for example be a display screen, a display panel and the like, and the labeled category may refer to a display screen defect category such as presence of residue, presence of dust, too thin or too thick electrical line and the like.

As an example, the user may configure the parameter of the sample data set on a graphical interface as shown in FIG. 10, and the parameter may for example include a training type (e.g., image classification), selected sample data set (e.g., L490A_6LBF_maincode), and a version number of sample data set (e.g., V1) and the like.

At step 920, the sample data set is divided into a training data set and a verification data set. The training data set will be used to train a deep learning model to obtain an image classification model. The verification data set will be used to determine a confidence threshold for the image classification model in predicting each category. As shown in FIG. 10, the sample data set (including 10,000 sample images) may be divided into the training data set and the verification data set in a ratio of 9:1, i.e., the training data includes 90% of the sample images in the sample data set (i.e., 9,000 sample images), and the verification data set includes 10% of the sample images in the sample data set (i.e., 1,000 sample images).

At step 930, a deep learning model is trained by using the training data set to obtain an image classification model. The image classification model is used to output, based on the image input into the image classification model, the category of the input image and a confidence corresponding to the output category of the input image. In some embodiments, the deep learning model may be a convolutional neural network (CNN) model, a target detection convolutional neural network (faster-RCNN) model, a recurrent neural network (RNN) model, and a generative adversarial network (GAN) model, which however is not limited thereto, and other neural network models known to those skilled in the art may also be used.

In some embodiments, a training parameter for training the deep learning model may be configured in advance, and the training parameter includes at least a category for training, a type of the deep learning model, a learning rate descent strategy, a total number of training rounds and a test strategy. The training parameter may also include a size of the image input into the deep learning model.

As an example, a training task may be created in response to a task creation operation of a user and a parameter configuration interface may be generated for configuring the training parameter for training the deep learning model. The training parameter includes at least a category for training, a type of the deep learning model, a learning rate descent strategy, a total number of training rounds and a test strategy. The deep learning model is then trained according to the training parameter and using the training data set to obtain an image classification to obtain an image classification model.

As shown in FIG. 11, a training task is be created in response to a task creation operation of a user and a parameter configuration interface is generated. The user can configure the training parameter for training the deep learning model on the parameter configuration interface. The training parameter may include a category for training, a type of the deep learning model, a total number of training rounds, a learning rate descent strategy (e.g., a number of rounds when the learning rate descends), a test strategy (e.g., a number of test rounds), a size of an image input into the deep learning model and the like. In addition, the training parameter may optionally include some self-defined parameters, e.g., a department, a section, a site, a model keyword and the like, which are not limited thereto. After the user then clicks on the "configuration complete", the deep learning model is trained according to the training parameter and using the training data set.

In an embodiment, a plurality of classification models are trained according to the test strategy and the classification model corresponding to the maximum number of test rounds is obtained as the image classification model. As in FIG. 11, there are three numbers of test rounds (120,000, 150,000 and 200,000) in the training strategy, the classification model corresponding to the maximum number of the test rounds (200,000) may be obtained as the image classification model.

In some embodiments, the total number of training rounds is positively correlated with the number of sample images in the sample data set. For example, if the number of sample images is less than or equal to 10,000, the total number of training rounds is configured as 300,000; and if the number of sample images is greater than 10,000, the total number of training rounds is configured using the following formula for determining the total number of rounds:

$$Y=300000+\mathrm{INT}(X/10000)\times b$$

where Y represents the total number of training rounds, X represents the number of sample images and is greater than or equal to 10000, INT is a rounding function, and b represents a growth factor having a fixed value and is greater than or equal to 30000 and less than or equal to 70000. In an exemplary embodiment, the value of b may be 50000 or 60000, which is not specifically limited in the exemplary embodiment.

At step 940, a confidence threshold for the image classification model in outputting each category is determined by using the verification data set, such that the image classification model satisfies a predetermined accuracy rate or a predetermined recall rate in outputting. The accuracy rate represents a ratio of the number of images with a corresponding category being correctly output to the number of images with said corresponding category being output, and the recall rate represents a ratio of the number of images with a corresponding category being correctly output to the true number of images with said corresponding category. It should be noted that any suitable method may be used to determine the confidence threshold for the image classification model in predicting each category by using the verification data set, so that the image classification model meets a predetermined accuracy rate or a predetermined recall rate in outputting, which is not restrictive herein.

At step 950, a confidence display interface is generated for displaying the confidence threshold for the image classification model in outputting each category. As shown in FIG. 12, a confidence threshold display interface, on which the confidence threshold for each category is visually displayed, may be generated, thereby facilitating the user to obtain and correct that confidence threshold.

In the method for determining the confidence threshold according to the embodiment of the present disclosure, the labeled sample data set is divided into the training data set and the verification data set, the training data set is used to train and obtain the image classification model and then the verification data set is used to determine the confidence threshold for the image classification model in predicting each category, such that the image classification model meets a predetermined accuracy rate or a predetermined recall rate in predicting each category. This allows for fast calculation of the confidence threshold and integration with the training process for calculation, making it intuitive to know the confidence threshold for each category after training the model. Furthermore, for the case where the distribution of sample categories is very uneven, the technical solution of the present disclosure may control the prediction or classification accuracy of each category is by subdividing the confidence threshold for each category, which can well handle the recognition of each category by the deep learning model and is beneficial in achieving a balance between the prediction accuracy rate and recall rate of the deep learning model, thereby improving the efficiency of the classification of the image classification model.

In some embodiments, during the training process, a training progress table may be generated and displayed. The training progress table includes a task cancellation symbol and a task detail symbol, as shown in FIG. 13. Training of the deep learning model may be stopped after a trigger operation of the user on the task cancellation symbol, thereby allowing the user to control the training process. A loss curve of the training process is generated and displayed after a trigger operation of the user on the task detail symbol, and the training parameter may then be updated according to the loss curve. The loss curve is typically a curve having a two-dimensional coordinate with a horizontal coordinate representing a number of training rounds and a vertical coordinate representing a loss value, which is updated in real time according to a training state during the training of the model. The user may observe the loss curve and then adjust the training parameter according to the curve state. Specifically, if the loss curve is always haphazard and does not show a decreasing trend as the horizontal coordinate increases, which indicates that the training parameter is not appropriately configured, it should stop the training and reconfigure the parameter for retraining. If the loss curve decreases slowly, the user may continuously observe the loss curve, stop the training, and increase the learning rate in the next training. If the loss curve still shows a decreasing trend after the training is completed (which should normally be smooth eventually), the total number of training rounds may be increased for retraining after the training is completed.

It should be understood that the present embodiment is concerned with the process of building the image classification model, while the embodiment described with reference to FIG. 3 is concerned with the process of building and using the image classification model. Accordingly, the relevant solution described above with reference to FIGS. 3 to 7 is also applicable to the present embodiment, and the details of which are not detailed here.

For example, in some embodiments, determining the confidence threshold for the image classification model in outputting each category by using the verification data set includes: inputting each sample image in the verification data set into the image classification model to obtain an output category of each sample image in the verification data set and a corresponding confidence; separately selecting each of the output categories and sorting the sample images with the selected category being output from highest to lowest according to corresponding confidences; determining a target sample image from the sample images with the selected category sorted from highest to lowest according to the corresponding confidences, such that a ratio of the number of sample images with the category being correctly output in a specified sample image set to the number of sample images in the specified sample image set is less than the predetermined accuracy rate, wherein the sample images with the category being correctly output include sample images with the output category being the same as the labeled category, and the sample images in the specified sample image set include the target sample image and the sample image, with the corresponding confidence being higher than that of the target sample image, among the sample images with the selected category being output; and determining the confidence threshold corresponding to the selected category based on the confidence corresponding to the sample image in the specified sample image set.

In some embodiments, determining the confidence threshold for the image classification model in outputting each category by using the verification data set includes:

inputting each sample image in the verification data set into the image classification model to obtain an output category of each sample image in the verification data set and a corresponding confidence; separately selecting each of the labeled categories and sorting the sample images labeled with the selected category from highest to lowest according to the corresponding confidences; determining a target sample image from the sample images with the selected category sorted from highest to lowest according to the corresponding confidences, such that a ratio of the number of sample images with the category being correctly output in a specified sample image set to the number of sample images in the specified sample image set is less than the predetermined recall rate, wherein the sample images with the category being correctly output include sample images with the output category being the same as the labeled category, and the sample images in the specified sample image set include the target sample image and the sample image, with the corresponding confidence being higher than that of the target sample image, among the sample images labeled with the selected category; and determining the confidence threshold corresponding to the selected category based on the confidence corresponding to the sample image in the specified sample image set.

Determining the confidence threshold corresponding to the selected category based on the confidence corresponding to the sample image in the specified sample image set, includes: determining the confidence threshold corresponding to the selected category based on the confidence corresponding to the target sample image and the confidence corresponding to the previous sample image to the target sample image in the sample images with the selected category sorted from highest to lowest according to the corresponding confidences.

Determining the confidence threshold corresponding to the selected category based on the confidence corresponding to the target sample image and the confidence corresponding to the previous sample image to the target sample image in the sample images with the selected category sorted from highest to lowest according to the corresponding confidences, includes: determining an average of the confidence corresponding to the currently traversed sample image and the confidence corresponding to the previous sample image as the confidence threshold corresponding to the selected category.

FIG. 14 illustrates an exemplary structure block diagram of a device 1400 for determining an image category according to an embodiment of the present disclosure. As shown in FIG. 14, the device 1400 for determining the image category includes an acquiring module 1410, a dividing module 1420, a training module 1430, a determining module 1440, and an outputting module 1450.

The acquiring module 1410 is configured to acquire a sample data set, and the sample data set includes a plurality of sample images that have been labeled with a category. The dividing module 1420 is configured to divide the sample data set to obtain a training data set and a verification data set. The training module 1430 is configured to train a deep learning model by using the training data set to obtain an image classification model, and the image classification model is used to output, based on the image input into the image classification model, the category of the input image and a confidence corresponding to the output category of the input image. The determining module 1440 is configured to determine a confidence threshold for the image classification model in outputting each category by using the verification data set, such that the image classification model satisfies a predetermined accuracy rate or a predetermined recall rate in outputting. The accuracy rate represents a ratio of the number of images with a corresponding category being correctly output to the number of images with said corresponding category being output, and the recall rate represents a ratio of the number of images with a corresponding category being correctly output to the true number of images with said corresponding category. The outputting module 1450 is configured to input the target image into the image classification model and obtain the category of the target image based on the determined confidence threshold.

FIG. 15 illustrates an exemplary structure block diagram of a device 1500 for determining a confidence threshold according to an embodiment of the present disclosure. As shown in FIG. 15, the device 1500 for determining the confidence threshold includes an acquiring module 1510, a dividing module 1520, a training module 1530, and a determining module 1540.

The acquiring module 1510 is configured to acquire a sample data set, and the sample data set includes a plurality of sample images that have been labeled with a category. The dividing module 1520 is configured to divide the sample data set to obtain a training data set and a verification data set. The training module 1530 is configured to train a deep learning model by using the training data set to obtain an image classification model, and the image classification model is used to output, based on the image input into the image classification model, the category of the input image and a confidence corresponding to the output category of the input image. The determining module 1540 is configured to determine a confidence threshold for the image classification model in outputting each category by using the verification data set, such that the image classification model satisfies a predetermined accuracy rate or a predetermined recall rate in outputting. The accuracy rate represents a ratio of the number of images with a corresponding category being correctly output to the number of images with said corresponding category being output, and the recall rate represents a ratio of the number of images with a corresponding category being correctly output to the true number of images with said corresponding category.

Figure 16:
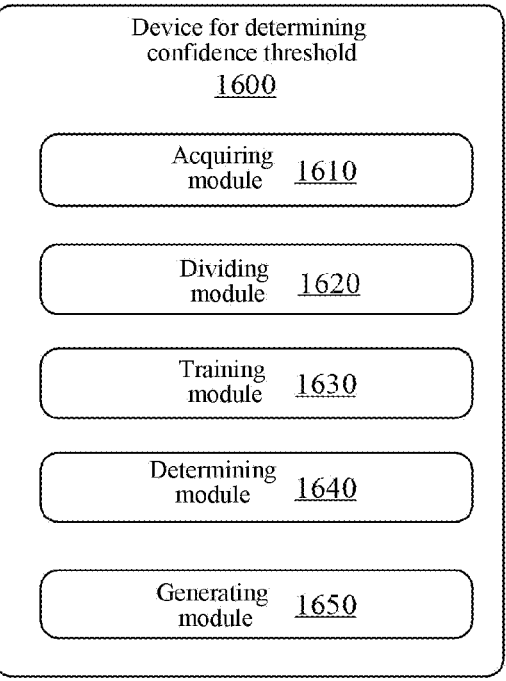
FIG. 16 illustrates an exemplary structure block diagram of a device for determining a confidence threshold according to an embodiment of the present disclosure.

FIG. 16 illustrates an exemplary structure block diagram of a device 1600 for determining a confidence threshold according to an embodiment of the present disclosure. As shown in FIG. 16, the device 1600 for determining the confidence threshold includes an acquiring module 1610, a dividing module 1620, a training module 1630, a determining module 1640 and a generating module 1650.

The acquiring module 1610 is configured to acquire a sample data set, and the sample data set includes a plurality of sample images that have been labeled with a category. The dividing module 1620 is configured to divide the sample data set to obtain a training data set and a verification data set. The training module 1630 is configured to train a deep learning model by using the training data set to obtain an image classification model, and the image classification model is used to output, based on the image input into the image classification model, the category of the input image and a confidence corresponding to the output category of the input image. The determining module 1640 is configured to determine a confidence threshold for the image classification model in outputting each category by using the verification data set, such that the image classification model satisfies a predetermined accuracy rate or a predetermined recall rate in outputting. The accuracy rate represents a ratio of the number of images with a corresponding category being correctly output to the number of images with said corresponding category being output, and the recall rate represents a ratio of the number of images with a corresponding category being correctly output to the true number of images with said corresponding category. The generating module 1650 is configured to generate a confidence display interface for displaying the confidence threshold for the image classification model in outputting each category.

The specific details of the modules in the above device are described in detail in the method embodiments, and undisclosed details may be found in the method embodiments and are therefore not repeated herein.

Furthermore, by analyzing the relevant technology, the applicant found that the relevant product defect detection solution based on deep learning generally includes the following two type. In a first type of solution, when an algorithm person has trained a model, he/she embeds the model in a system software to directly put the same online. The algorithm in such software is less versatile, and when an acquired image changes due to a change in a production process or a product model, the accuracy of the algorithm tends to deteriorate significantly, which in turn leads to a poor detection result of the product defect detection system. This type of solution is widely used in the related technology because of the simplicity of the development and deployment process thereof. In a second type of solution, a model training function may be provided. Specifically, an operation and maintenance person or other managers may implement simple sample data collection and model training when the production process or the product models change, or depending on other specific needs, and then deploy the trained model online. This type of solution is less commonly used today. Compared to the first type of solution, the second type of solution may mitigate a model effect change due to the change in the product processes or the product model. However, in this type of solution, the trained model is often deployed online after a simple test, and there is often a risk that the online result is not consistent with the offline result.

FIG. 17 illustrates a schematic flowchart of a method 1700 for determining a target model according to an embodiment of the present disclosure. The method 1700 for determining the target model may be implemented, for example, by the terminal devices 101, 102, 103, the server 105, or a combination thereof, as shown in FIG. 1. As shown in FIG. 17, the method 1700 includes the following steps.

At step 1710, a sample data set is acquired. The sample data set includes a plurality of sample images that have been labeled with a category, and the sample images may be images of a target object. For example, the target object may be a target product and the category may be a product defect category of the target product. Similarly to what has been mentioned above, the target product herein may for example be a display screen, a display panel and the like, and the labeled category may refer to a display screen defect category such as presence of residue, presence of dust, too thin or too thick electrical line and the like.

At step 1720, the sample data set is divided to obtain a training data set and a verification data set. The training data set may be used to train a deep learning model to obtain a trained model. The verification data set may be used to verify the training effect of the deep learning model, for example, a loss curve (i.e., a change curve of loss function value) may be generated based on the verification data set during the training process to determine the model training effect and to help determine when to stop training. In some embodiments, the sample data set may be divided according to a predetermined ratio to obtain the training data set and the verification data set. For example, the ratio of the training data set to the verification data set may be 9:1, 8:1, 8:2 and the like. For example, when dividing the sample data set, other data sets may be obtained by the dividing in addition to the training data set and the verification data set. For another example, the sample data set may be first divided into a training set and other data sets, and then the training set may be divided into the aforementioned training data set and the verification data set during the training process.

At step 1730, a deep learning model is trained by using the training data set to obtain, according to different numbers of training rounds, at least two trained models. For example, the trained model may be the image classification model mentioned in the previous embodiments, which may be used to predict a category based on an input image and obtain a confidence level corresponding to that category.

In some embodiments, the deep learning model may be a convolutional neural network (CNN) model, a target detection convolutional neural network (faster-RCNN) model, a recurrent neural network (RNN) model, a generative adversarial network (GAN) model, and a self-attention model, which however is not limited thereto, and other neural network models known to those skilled in the art may also be used.

In some embodiments, the training parameter for training the deep learning model may be configured in advance, and the training parameter includes at least a test strategy. For example, two or more numbers of training rounds may be specified in the training parameter such that the trained models with corresponding numbers of training rounds may be stored as alternative models, and a superior model may be selected from these alternative models as the target model during subsequent test. For example, the number of training rounds may be specified directly by the person performing the model training based on experience, or, the number of model training rounds to be stored may be specified indirectly based on a certain parameter, for example, based on a case where the learning rate descends and the like. For example, if the effect of the model is good when the learning rate descends for a second time, several numbers of training rounds around the number of rounds when the learning rate descends for the second time may be selected. It should be understood that it may also specify the number of model training rounds to be stored based on other indexes according to actual needs. Subsequently, when training the deep learning model according to the training parameter described above, the model with the number of training rounds reaching the number of rounds when testing may be output for testing according to the test strategy.

For example, the above test strategy may include a number of tests and a number of rounds when testing, and in addition to the test strategy, the training parameter may include a learning rate descent strategy, a total number of training rounds and the like. Moreover, for another example, configuring the training parameter based on feature information of the sample data set may refer to configuring the learning rate descent strategy, the total number of training rounds, the test strategy and the like based on the number of samples in the feature information.

Specifically, the total number of training rounds above is positively correlated with the number of samples above. For example, if the number of samples is less than or equal to 10,000, the total number of training rounds is configured as 300,000; and if the number of samples is greater than 10,000, the total number of training rounds is configured using the following formula:

$$Y=300000+\text{INT}(X/10000)\times b$$

where Y represents the total number of training rounds, X represents the number of samples and is greater than or equal to 10000, INT is a rounding function, and b represents a growth factor having a fixed value and is greater than or equal to 30000 and less than or equal to 70000. In an exemplary embodiment, the value of b may be 50000 or 60000, which is not specifically limited in the exemplary embodiment. In the exemplary embodiment, the above mapping relationship between the number of samples and the total number of training rounds may be an optimal result obtained after several experiments, or may be defined according to the user's needs, which is not specifically limited in the exemplary embodiment.

In an exemplary embodiment, the number of rounds when the learning rate descends is positively correlated with the total number of training rounds. The number of rounds when testing is greater than or equal to the number of rounds when the learning rate descends for a first time and less than or equal to the total number of rounds in the training group. The learning rate descends a plurality of times, and at least two tests are performed within a preset number of rounds around the number of rounds when the learning rate descends for a second time, for example, two, three or more tests may be performed, which is not specifically limited in the exemplary embodiment. During training, the learning rate may descend a plurality of times, and the time number of the descent with the best result is selected after the learning rate descends the plurality of times, which may improve the accuracy of the obtained target model, and thus improve the accuracy of defect detection. Further, a plurality of tests may be performed on the models of different numbers of training rounds during training, and the model having the best result may be selected as the target model, thereby improving the accuracy of the model.

In an exemplary embodiment, the manner of the above learning rate descent may be piecewise constant decay, exponential decay, natural exponential decay, cosine decay and the like, which is not specifically limited in the exemplary embodiment. The magnitude of the above learning rate descent is related to the above manner of the learning rate descent, and is related to each parameter in the configured manner of the learning rate descent, and may also be directly set to be a constant such as 0.1 and 0.05, which is not specifically limited in the exemplary embodiment.

In an exemplary embodiment of the present disclosure, the above feature information may further include a size and a type of the image in the sample data set, and configuring the training parameter based on the above feature information may further include configuring the training parameter according to the size and the type of the image, for example, configuring the size of the input image input into the deep learning model to be trained. Specifically, the size of the input image is a first preset multiple of the size of the image if the type of the image is an AOI color image or a DM image; and the size of the input image may a second preset multiple of the size of the image if the type of the defective product image is a TDI image. The first preset multiple is less than or equal to 1, and the second preset multiple is greater than or equal to 1.

In an exemplary embodiment of the present disclosure, in the example scenario related to the product defect described above, the feature information may further include a defect level of the defective product and the number of samples corresponding to each defect, and the training parameter may also include a confidence. The confidence in a training process may be configured according to the defect level and the number of samples corresponding to each defect. Specifically, a preset number may be set first, and the number of samples corresponding to each defect is compared with the preset number. If the number of samples corresponding to the defect is greater than the preset number, the confidence may be configured according to the defect level of this defect. For example, the defect level may include a first defect level and a second defect level. if the defect level of the above defect is the first defect level, the corresponding confidence is configured as a first confidence; and if the defect level is the second defect level, the corresponding confidence is configured as a second confidence. The second confidence may be greater than the first confidence. For another example, the above preset number may be 50, 100, and the like, or may be customized according to user requirements, which is not specifically limited in the exemplary embodiment. The first confidence is greater than or equal to 0.6 and less than or equal to 0.7; and the second confidence is greater than or equal to 0.8 and less than or equal to 0.9. The specific values of the first confidence and the second confidence may be customized according to user requirements, which is not specifically limited in the exemplary embodiment.

For example, for a defect with a high occurrence rate and a low importance, that is, a defect with a lower defect level, a lower confidence may be configured. For example, a confidence of 0.6 may be configured for a non-defective PI820 and a light-defective PI800. That is, when a probability score of the image at PI800 or PI820 exceeds 0.6, it is judged as the defect. For a defect with a low occurrence rate but a high importance, that is, a defect with a high defect level, a higher confidence may be configured. For example, a confidence of 0.85 may be configured for GT011 and SD011 with a serious defect. That is, a probability score of the image at GT011 or SD011 exceeds 0.6, it is judged as the defect. For the rest of the images with low confidence, they are all judged as unknow (not recognized by AI), which are to be processed manually to prevent missed judgments.

At step 1740, the at least two trained models obtained at step 1730 are tested by using the verification data set to generate a verification test result. The verification test result may include the output category of the model and the confidence of the corresponding category. The images in the verification data set may be input to each trained model in turn, and the output category of the model and the corresponding confidence may be stored.

At step 1750, a verification test index is generated based on the verification test result. The verification test index includes at least one of a confusion matrix, an accuracy rate, a recall rate and an F1 score. The accuracy rate represents a ratio of the number of images with a corresponding category being correctly predicted to the number of images with the corresponding category being predicted, the recall rate represents a ratio of the number of images with a corresponding category being correctly predicted to the true number of images with the corresponding category, and the F1 score may be considered as a harmonic average of the accuracy rate and the recall rate, i.e., (2*accuracy rate*recall rate)/(accuracy rate+recall rate). If there are n predicted categories in the model, the confusion matrix may be a matrix of n*n. Each column of the matrix represents the category predicted by the model, and the total number in each column represents the number of images with that category being predicted. Each row represents the true category of the image, i.e., the category in the label, and the total number in each row represents the true number of images with that category. In addition, the confusion matrix may include an unknown column, which may include the number of images for which the model did not predict a category. One or more of the above verification test indexes may be generated based on the category and the confidence of the category in the verification test result and the category in the image label in the verification data set.

At step 1760, the target model from the at least two trained models is determined according to the verification test index generated at step 1750. For example, the user may be presented with the aforementioned verification test index, and the user may refer to these verification test indexes to select one of the at least two trained models as the target model based on actual application requirements; alternatively, one of the at least two trained models may be automatically selected as the target model based on these verification test indexes according to a predetermined selection mechanism. It should be understood that in various embodiments of the present disclosure, a similar expression to that in step 1760 is to be similarly understood. In other words, in the present disclosure, unless indicated to the contrary in the description, the expression such as "update/determine . . . based on . . . " should be understood to mean that the system may automatically perform an action such as an update and determination based on one or more indexes, curves and the like, or the system may also present the user with one or more indexes, curves and the like and perform the action such as the update and determination in response to receiving user input.

It should be understood by those skilled in the art, the accuracy rate index is important in the training process of the deep learning model. However, the applicant has found that for a specific application scenario, it is often necessary to consider the performance of the model from different dimensions, rather than just a single index such as the accuracy rate. For example, in the application scenario of screen defect detection, different defect categories may have different priorities. For example, the priority of a screen being scratched may be much higher than that of a screen being stained, as the stain can be washed away, but the screen being scratched must be scrapped. Thus, generating the multi-dimensional verification test indexes based on the verification data set may make the verification data set to function fully, show the training effect of the model more comprehensively, and assist the selection of the target model more effectively, thereby improving the fit of the selected target model to the need of the specific application scenario.

For example, the target model may be determined from the at least two trained models preferentially based on the F1 score. As mentioned above, the F1 score is an index in consideration of both accuracy rate and recall rate, and in general, the closer the F1 score is to 1, the better the model is trained, and conversely, the closer the F1 score is to 0, the worse the model is trained. Furthermore, for example, it may further determine whether the target model determined satisfies a predetermined requirement according to the confusion matrix; and may update the target model by retraining or adjusting the confidence threshold in response to the target model determined not satisfying the predetermined requirement. The test result for each category may be understood in more detail based on the confusion matrix, so that a more comprehensive and detailed understanding of the training of the model for different categories may be obtained. For example, a prediction result distribution, a prediction accuracy rate, the recall rate and the F1 score of the model for some or all categories may be verified based on the confusion matrix, and whether it satisfies the predetermined requirement may be determined. For example, for the screen defect detection application scenario described above, it may be determined whether the prediction accuracy rate, the recall rate and/or the F1 score of the model for some defect categories with higher priorities (or all defect categories) are greater than a predetermined threshold. If the prediction of the target model for one or several categories does not satisfy the predetermined requirement, the target model may be updated by adjusting the confidence threshold for the corresponding category, or the target model may be trained again by supplementing the sample data for the corresponding category to update the target model. Or, if the prediction of the target model for more categories does not satisfy the predetermined requirement, or the prediction of the target model cannot be adjusted to satisfy the predetermined requirement by adjusting the confidence threshold, supplementing the sample data and the like, the target model may be retrained by supplementing the training data set, optimizing the model parameter or the like, or the initial deep learning model may be retrained and the target model may be re-selected.

In method 1700 for determining the target model, the labeled sample data set is divided to obtain the training data set and the verification data set, two or more trained models are obtained by training with the training data set, the two or more trained models are tested by using the verification data set to generate a multi-dimensional verification test index, and the target model is selected from the two or more trained models according to the verification test index. In this way, the multi-dimensional verification test index provides a more comprehensive assessment and presents the training effect of each model to the user, thereby assisting in the selection of the target model that is more suitable for a specific application need. Therefore, the prediction performance and the reliability of prediction function of the final target model may be improved, and thus the classification performance of the entire classification system may be improved. For example, when the method is applied to the field of product defect detection, a more suitable target model may be selected more flexibly according to the specific needs, thereby effectively improving the detection effect of the product defect detection system.

In addition, in comparison with the solution in the related art, the method 1700 of the present disclosure enables the verification data set to be used fully. Specifically, in the solution of the related art, as previously mentioned, the verification data set is often only used to generate a loss curve in the training process to help to determine whether the model training is as expected, after which the verification data set is no longer used. However, it needs a lot of manpower and time to generate the sample data set, and a lot of data annotation in a professional field also requires a technician with a certain professional knowledge, for example, the sample data annotation relating to the product defect generally requires a technician with a certain acknowledge on the related product in order to ensure the annotation accuracy. Therefore, if the annotated sample data is not used fully, it is a waste of the manpower and time involved in the data annotation. The method 1700 of the present disclosure additionally generates the multi-dimensional verification test index based on the verification data set, which allows the verification data set to be more fully used in the process of determining the target model, thereby helping to improve the utilization of the verification data set to the fullest extent.

In some embodiments, the method 1700 for determining the target model described with reference to FIG. 17 may also include an offline test process 1800 shown in FIG. 18. As shown in FIG. 18, the offline test process 1800 may include the following steps.

At step 1810, an offline test data set is acquired. The offline test data set includes a plurality of sample images that have been labeled with a category. Similarly, the sample images may be images of the above target object, which may be a target product such as a display screen, a display panel and the like. The labeled category may be the same as the labeled category of the sample image in the above sample data set, which may be, for example, a display screen defect category such as presence of residue, presence of dust, too thin or too thick electrical line and the like.

For example, the offline test data set may include at least one of a subset obtained by dividing the sample data set and an input sample data set provided by a user, and the input sample data set may include a plurality of sample images which have been labeled with a category. Therefore, the offline test data set may be acquired in at least one of the following ways. In a first way, the offline test data set may be acquired directly based on a subset of the sample data set used in the model training process. For example, the sample data set may be divided into a training data set, a verification data set and an offline test data set in a predetermined ratio. Or, the sample data may be first divided into a training set and an offline test data set in a predetermined ratio, and then the training set may be further divided into a training data set and a verification data set in a predetermined ratio. In a second way, the user may be allowed to provide a new annotated data set. An input sample data set including a plurality of sample images that have been labeled with a category provided by the user may be received, and the offline test data set may be acquired based on the received input sample data set. Alternatively, the offline test data set may be obtained by combining the two ways described above, based on a subset of the original sample data set and the newly provided input sample data set. By providing a new input sample data set, the generalization capability of the target model may be tested. If the input sample data set provided includes data extracted from the actual production line, the prediction performance of the target model on the production line data may also be tested more intuitively, which may prepare for the deployment of the target model to the actual production line.

At step 1820, the target model is tested by using the offline test data set to generate an offline test result. The offline test result may include a category output by the target model and a confidence for the corresponding category. Images in the offline test data set may be sequentially input into the target model and the category and the corresponding confidence output by the target model may be stored.

In some embodiments, the confidence threshold for at least one category may be updated based on the aforementioned verification test result or the offline test result. For example, the verification test result or the offline test result may be presented to the user by various means, and the user may adjust the confidence threshold for at least one category of the target model based on the actual application requirement with reference to the presented results; or, the confidence threshold for at least one category may be automatically adjusted based on the verification test result or the offline test result according to a predetermined adjustment mechanism.

In some embodiments, an accuracy curve and a recall curve for at least one category may be generated based on the above verification test result or the offline test result. The accuracy curve is used to reflect a relationship between the accuracy rate and a confidence threshold, and the recall curve is used to reflect a relationship between the recall rate and the confidence threshold. Then, the confidence threshold for the at least one category may be updated according to the accuracy curve and the recall curve. For example, an intersection point of the accuracy curve and the recall curve is often the most appropriate confidence threshold, so the confidence threshold for the at least one category may be updated automatically or based on user input according to the intersection point of the accuracy curve and the recall curve. Alternatively, the user may be presented with the accuracy curve and the recall curve, and in some embodiments, may be further presented with some other reference indexes, so that the user may more accurately adjust the confidence threshold based on these elements in conjunction with the actually-generated service scenario. For example, the accuracy curve and the recall curve may be generated in embodiments where the recommended confidence threshold is not automatically determined to provide a more detailed reference for the user to adjust the confidence threshold.

In some embodiments, based on the verification test result or the offline test result, a recommended confidence threshold for each category may be determined according to the accuracy rate or the recall rate; and the confidence threshold for at least one category is updated based on the recommended confidence threshold. For example, the confidence threshold may be set in advance for each category at the beginning of model training, either by default or empirically. When at least two trained models are tested using the verification data set or the offline test data set, based on the verification test result or the offline test result, the recommended confidence threshold for each category may be determined for each model according to a predetermined logic. Various verification test indexes may be generated based on the recommended confidence threshold to more accurately reflect the prediction performance of each model, thereby improving the performance of the selected target model. For example, the recommended confidence threshold herein may be determined in accordance with the method for determining the confidence threshold in the various embodiments described previously with reference to FIGS. 3 to 16. As a result, it may be relatively easy and accurate to determine the appropriate confidence threshold for each model, which may provide a range and direction for subsequent manual adjustment of the confidence threshold by the user, or, may prepare for the model to be put online.

In some embodiments, an offline test index may be generated based on the above offline test result, and the offline test index includes at least one of the accuracy rate, the recall rate, the F1 score, the confusion matrix, a distribution of a model output number and a true number for each category, and a confidence distribution for each category; and then, the confidence threshold for at least one category may be updated according to the offline test index. The distribution of the model output number and the true number for each category refers to for each category, the number of images with that category being output by the target model and the number of images being labeled with that category, which may be represented by a histogram, a line chart and the like. The confidence distribution for each category refers to for each category, the confidence output by the target model for each input image, which may be represented by a scatter diagram and the like. For example, the above offline test index may be generated in an embodiment where the recommended confidence threshold is automatically determined so that the user may visually observe the prediction performance of the target model based on the recommended confidence threshold, and then fine-tune the recommended confidence threshold with reference to the current performance in conjunction with actual needs.

In some embodiments, after the confidence threshold has been updated, at least one of the accuracy rate, the recall rate, the F1 score, the confusion matrix, the distribution of the model output number and the true number for each category and the confidence distribution for each category may be further generated according to an updated confidence threshold and based on the above offline test result. As a result, the prediction result of the target model based on the updated confidence threshold may be presented to the user in real time, making it more intuitive and convenient to determine whether to use the updated confidence threshold or whether to continue to adjust the confidence threshold in order to quickly find the most appropriate confidence threshold.

In some embodiments, the method 1700 for determining the target model described with reference to FIG. 17 may further include an online test process 1900 shown in FIG. 19. As shown in FIG. 19, the online test process 1900 may include the following steps.

At step 1910, an online test data set is acquired. The online test data set includes a plurality of images of the target object that have not been labeled with the category. Similarly, the images in the online test data set may be images of the above target object, which may be a target product such as a display screen, a display panel and the like, and may have a display screen defect category such as presence of residue, presence of dust, too thin or too thick electrical line and the like. The images in the online test data set may be images acquired at various production processes in the actual production line. In this way, the test with the online test data set may prevent a case where the effect of the target model is good in the previous test but is bad after being put online, and thus may ensure a stable operation of the target model after being put online.

In some embodiments, the online test data set may be acquired in the following ways. First, a communication connection with an image acquiring device may be established. The image acquiring device is configured to acquire a to-be-tested image of the target object. Then, the to-be-tested image of the target object may be received from the image acquiring device through the communication connection. In this way, the online test data set may be acquired based on the received to-be-tested image. For example, the image acquiring device may be a camera or other device, and may be controlled by a control device of the production system. For example, the control unit may control when the image acquiring device captures an image, where the image acquiring device stores the image and the like. The communication connection with the image acquiring device may be established via a communication connection with such production system, for example, such communication connection may be established via a gateway or other structure. Subsequently, the target model may be informed of a corresponding target object (e.g., a product name, a model number of the target product and the like) via this communication connection, and the production system may provide the image data of the target object applicable to the target model to the target model, e.g., may inform the target model of the address where the relevant image data is stored via the communication connection so that the target model may acquire the relevant image data based on the address.

Alternatively, in some embodiments, the online test data set may be acquired in the following way. The online test data set may be acquired based on an image received by a relevant online model, and the relevant online model is configured to receive a to-be-tested image of the target object from an image acquiring device and to predict the category of the to-be-tested image based on the to-be-tested image received. For example, as described in the previous paragraph, the relevant online model may establish a communication connection with the production system via a structure such as a gateway and acquire the to-be-tested image of the target object acquired by the image acquiring device via the communication connection. Subsequently, after the prediction of the to-be-tested image has been completed, the prediction result may be fed back to the production system again via the communication connection for subsequent storage and analysis. For example, the structure such as gateway may collate the prediction result output by the relevant online model and transmit the same to the production system. For example, in an embodiment where the target model is used to replace the relevant online model, the online test data set may be acquired based on the image data at the relevant online model.

At step 1920, the target model is tested by using the online test data set to generate an online test index. The online test index includes at least one of the accuracy rate, the recall rate, the confusion matrix, a distribution of a model output number and a manual review number for each category, and a confidence distribution for each category. For example, the target model may be tested using the online test data set and the online test result may be obtained based on the output of the target model. The online test result may include the category output by the target model and the confidence for the corresponding category. For example, the images in the online test data set may be sequentially input into the target model and the category and the corresponding confidence output by the target model may be stored. A manual review result on the online test data set may then be received. For example, each image in the online test data set may be presented to a specific person, who may empirically determine the category of each image, for example, the defect category of the target product. The image category input by the specific person may be stored as the manual review result for the corresponding image. As a result, the above online test index may be generated based on the online test result and the manual review result. The user may evaluate the online prediction performance of the target model based on the online test index to further ensure that the target model may achieve the prediction result as desired after being put online.

At step 1930, it may be determined whether to put the target model online according to whether the online test index meets an online criterion. For example, the target model may be put online in response to the online test index meeting a predetermined criterion. Or, the target model may be put online in response to at least some of the online test indexes being higher than corresponding test indexes of the relevant online model. The corresponding test index is obtained based on an output result of the relevant online model for the online test data set. For example, the relevant online model may be an online model having a product model, category (e.g., product defect category) the same as or similar to that detected by the target model. The online model may be understood to be a model that is currently being used to predict the category of the to-be-tested image of the target object. For example, for a product defect detection scenario, the online model may be a model that is arranged on a production line to detect an image of the target product and predict the product defect category. For example, the corresponding test index for the relevant online model may be obtained by the following process, i.e., the output result of the relevant online model for the image in the online test data set may be acquired, and based on the output result and the manual review result described above, these corresponding test indexes are generated. Similarly, the corresponding test index may include at least one of the accuracy rate, the recall rate, the confusion matrix, the distribution of the model output number and the manual review number for each category, and the confidence distribution for each category.

In some embodiments, for a new model to be put online, it may determine whether to put the model online based on whether at least some of the online test indexes reach a predetermined threshold. For an iterative model to be put online, it may determine whether to put the model online based on whether at least some of the online test indexes are higher than corresponding test indexes of the relevant online model. Herein, the new model may mean that for this model, there is no relevant online model currently, while the iterative model may mean an updated iterative version of a relevant model that is currently online. New model and iterative model may be used in different situations. For example, in a product defect detection application, a new model is usually developed to detect a defect in a new product. In some cases, if a similar product to the new product existed previously, the new product may be detected by iteratively updating the relevant model used for the similar product. For the defect detection of an existing product, when there are significant changes in the production process or in the camera arrangement, it is often necessary to develop a new model to detect the product under the new production process or to process the image data acquired under the new camera arrangement. When there are slight changes in the production line or the camera arrangement, it may be possible to update and iterate the current online model to adapt to these changes. In addition, as mentioned in the previous embodiment, the online test data set may be acquired differently for the new model and the updated iterative model. For the new model, it generally needs to establish a new communication connection with the image acquiring device and then receive relevant image data from the image acquiring device. For the updated iterative model, it may acquire the online test data directly based on the image data at the relevant online model, i.e., some or all of the image data at the relevant online model may be divided or copied into two copies, one for use by the relevant online model for regular prediction and the other for use as online test data for the updated iterative model. By providing different methods for acquiring online test data and different online criteria, the different needs of the new model and the updated iterative model may be accommodated, thereby increasing the flexibility of the test process.

In some embodiments, the online test process 1900 may further include one of: updating the target model by retraining or adjusting the confidence threshold in response to the online test index not meeting the predetermined criterion; and updating the target model by retraining or adjusting the confidence threshold in response to the online test index being not higher than the corresponding test index of the relevant online model. For example, as previously mentioned, for a new model to be put online, the target model may be updated by retraining or adjusting the confidence threshold when the online test index does not meet the predetermined criterion, for example, when some or all of the indexes do not reach a predetermined threshold. For an iterative model to be put online, the target model may be updated by retraining or adjusting the confidence threshold when the online test index is not higher than the corresponding test index of the relevant online model. The manner in which the target model is updated by training or adjusting the confidence threshold is described in the embodiment regarding step 1760 and will not be repeated here.

In some embodiments, the method 1700 for determining the target model described with reference to FIG. 17 may further include an audit process 2000 as shown in FIG. 20. As shown in FIG. 20, the audit process 2000 may include the following steps.

At step 2010, an audit result of a user for the target model is acquired. After the target model has been subjected to a previous test, it may be prepared for being deployed online. In order to avoid maloperation and to avoid affecting the production by incorrectly putting the model online, an audit process may be provided before putting the model online. The target model to be put online may be presented to a relevant user, who may confirm whether to put the target model online or not. Optionally, to further ensure the reliability of the system, two or more levels of audit processes may be provided, for example, the target model may be audited by two levels of relevant person before being put online.

At step 2020, the target model is put online in response to the audit result indicating that the target model is allowed to be used online, such that the target model is configured to receive a to-be-tested image of the target object from the image acquiring device and predict the category of the to-be-tested image based on the to-be-tested image received. After passing the audit, the target model may be formally put online, either as a new online model or as an update to the original relevant online model. For example, the online target model may receive the to-be-tested image via the aforementioned communication connection and feedback the prediction result via that communication connection.

In some embodiments, the method 1700 for determining the target model described with reference to FIG. 17 may further include an online review process 2100 shown in FIG. 21. As shown in FIG. 21, the online review process 2100 may include the following steps.

At step 2110, after the target model is put online, online spot check data is acquired based on a to-be-tested image of the target object from the image acquiring device. Some images may be exacted from the to-be-tested images provided to the target model for prediction to form the online spot check data. The online spot check data may be packaged and stored or sent to a relevant reviewer.

In some embodiments, the online spot check data may be obtained in at least one of the following ways. In a first way, an automatic task distributing manner may be used, i.e., some images may be extracted randomly from the to-be-tested images of the target object from the image acquiring device, and the online spot check data may be generated based on the extracted images. For example, a fixed number of to-be-tested images may be randomly extracted during a predetermined period to generate the online spot check data. The predetermined period may for example be one day, two days, one week, and the like. In a second way, a manual task extracting manner may be adopted, i.e., a filtering condition may be received for the to-be-tested images of the target object from the image acquiring device, the to-be-tested images of the target object from the image acquiring device may be filtered based on the filtering condition, and the online spot check data may be generated based on the filtered images. For example, the filtering condition may be set manually by the person concerned, and the filtering condition may for example be time, product model, product defect type, quantity and the like. The to-be-tested images may be filtered according to the set filtering condition and the spot check data may be generated based on the filtered to-be-tested images. Optionally, the spot check data may be generated directly based on the filtered to-be-tested images, or a pre-determined percentage of the filtered to-be-tested images may be randomly extracted to generate the spot check data. Both the manners may respectively meet the needs of daily monitoring and condition-specific spot-checking of the target model.

At step 2120, a manual review result for the online spot check data is received. The manual review result includes the category of the to-be-tested image obtained by a manual review. Each image in the online spot check data may be presented to the relevant reviewer and a review input of the reviewer for each image may be received. The review input may include the category of the image and may be stored as the manual review result.

At step 2130, based on the manual review result and the category predicted by the target model, an online spot check index is generated. The online spot check index includes at least one of the accuracy rate, the recall rate, the confusion matrix, a distribution of a model output number and a manual review number for each category, and a confidence distribution for each category. The user may monitor the online prediction performance of the target model based on the online spot check index in order to monitor the health of the target model from a data perspective and make timely adjustments to the target model.

Figure 22:
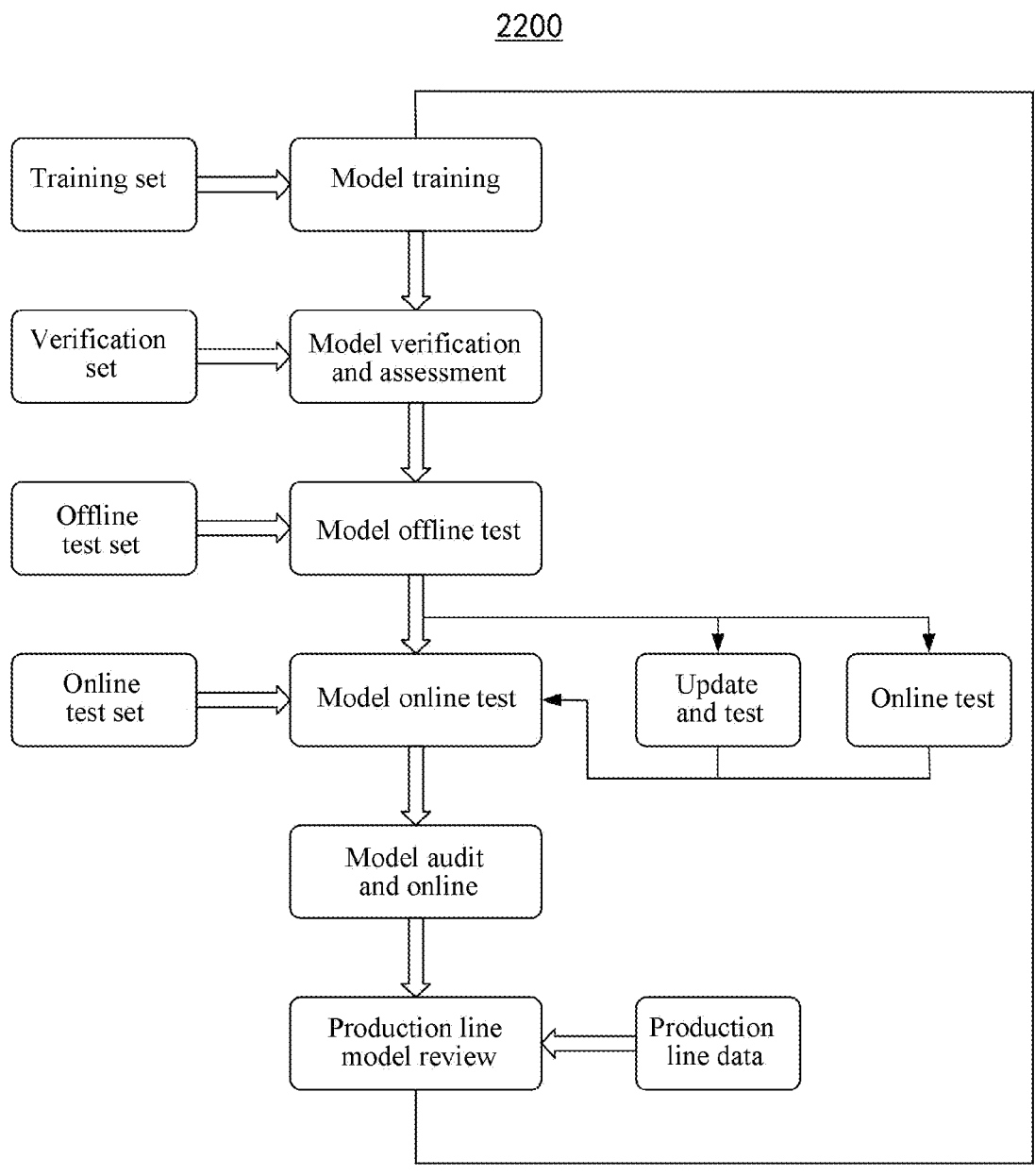
FIG. 22 illustrates a schematic flowchart of a method for training and evaluating an image classification model according to an embodiment of the present disclosure.

In some embodiments, the entire model training and assessment process may be implemented according to the process 2200 shown in FIG. 22.

As shown in FIG. 22, the deep learning model may be trained based on the training data set, and at least two trained models may be obtained based on the training parameter. Then, the at least two trained models may be tested based on the verification data set, and the target model may be determined from the at least two trained models based on the test result. Then, the target model may be tested offline based on an offline test data set, and the confidence threshold of at least one category of the target model may be adjusted based on the offline test result. Then, the target model may be tested online based on the online test data set in order to test the prediction performance of the target model on the production line data. Here, a distinction may be made between update test and online test. As described above, for the online test, the communication connection may be established with the production system, and the online test data set may be received via the communication connection. For the update test, the online test data set may be acquired directly based on the data at the relevant online model. After passing the online test, the target model may be audited and put online, and as described above, two levels of audit process may be adopted. Finally, after the target model has been put online, the target model may be reviewed online periodically or according to specific requirements based on extracted production line data, to monitor the online performance of the target model. Each of the above processes has been described in detail in the previous various embodiments with reference to FIGS. 17 to 21 and will not be repeated here. With the process 2200 shown in FIG. 22, a complete and detailed solution for testing the model and putting the same online is provided while a training function is provided to the user. On the one hand, it may solve the problem that the model is not adaptive after there is a change in the production process, the product model number or the like. On the other hand, it may provide a complete model assessment mechanism, which covers five model test stages of verification and assessment, offline test, online test, audit and online, and production line review, and gives a corresponding assessment index in each stage, so that the user may follow the process and assessment index provided by the present disclosure to carry out model test and online work easily and clearly without the assistance of algorithm personnel. In other words, the embodiment of the present disclosure provides a standard operating procedure for the important task of model test and being-online, which may provide assurance of subsequent maintenance and system scalability and robustness of the product defect detection system or other similar systems, and avoid many risks caused by model change in such systems.

FIG. 23 illustrates a schematic flowchart of a method 2300 for determining an image category according to an embodiment of the present disclosure. The method 2300 for determining the image category may be implemented, for example, by the terminal device 101, 102, 103, the server 105 or a combination thereof as shown in FIG. 1. As shown in FIG. 23, the method 2300 includes the following steps.

At step 2310, a to-be-tested image of a target object is predicted using a target model to obtain a category of the to-be-tested image. The target model is determined from at least two trained models according to a verification test index, the at least two trained models have different numbers of training rounds, and the verification test index includes at least one of a confusion matrix, an accuracy rate, a recall rate and an F1 score. The to-be-tested image of the target object here may be a similar image to the aforementioned sample image, which may show various defects present in the target object. For example, the to-be-tested image here may be an image of the target object acquired from the production line at one or more production processes.

In some embodiments, the target model used in step 2310 may be the target model obtained by the method 1700 described in various embodiments above. By using this target model to predict the category of the to-be-tested image of the target object, a better prediction may be achieved, for example, a higher accuracy rate, a recall rate, and other indexes may be achieved, or a prediction that is more in line with the needs of the specific application may be achieved.

It should be understood that the method 2300 for determining the image category is concerned with the process of acquiring and using the target model, while the various embodiments described with reference to FIGS. 17 to 22 are concerned with the process of acquiring and assessing the target model. Accordingly, the various embodiments described above with reference to FIGS. 17 to 22 are also applicable to the method 2300 for determining the image category, the details of which are not detailed herein.

FIG. 24 illustrates a schematic flowchart of a method 2400 for determining a target model according to an embodiment of the present disclosure. The method for determining the target model may be implemented, for example, by the terminal device 101, 102, 103, the server 105, or a combination thereof, as shown in FIG. 1. As shown in FIG. 24, the method 2400 includes the following steps.

At step 2410, the sample data set is acquired in response to a configuration operation of a user on a sample data set. The sample data set includes a plurality of sample images that have been labeled with a category, and the sample images are images of a target object. For example, the target object may be a target product and the category may be a product defect category of the target product. As mentioned above, the target product may be, for example, a display screen, a display panel and the like, and the labeled category may refer to a display screen defect category, such as presence of residue, presence of dust, too thin or too thick electrical line, and the like.

As an example, the user may configure the parameters of the sample data set on a graphical interface as shown in FIG. 10, and the parameter may include for example a training type (e.g., an image classification), a selected sample data set (e.g., L490A_6LBF_maincode), a version number of the sample data set (e.g., V1), and the like. For example, the user may also select two or more data sets in succession on the graphical interface as shown in FIG. 10 and combine the two or more data sets as the sample data set used in step 2410 by clicking on a button such as "Confirm" or other button.

At step 2420, the sample data set is divided to obtain a training data set and a verification data set. The verification data set may be used to verify the training effect of the deep learning model, for example, a loss curve (i.e., a change curve of loss function value) may be generated based on the verification data set during the training process to determine the model training effect and to help determine when to stop training. In some embodiments, the sample data set may be divided according to a predetermined ratio to obtain the training data set and the verification data set. For example, the ratio of the training data set to the verification data set may be 9:1, 8:1, 8:2 and the like. For example, when dividing the sample data set, other data sets may be obtained by the dividing in addition to the training data set and the verification data set. For another example, the sample data set may be first divided into a training set and other data sets, and then the training set may be divided into the aforementioned training data set and the verification data set during the training process.

For example, after selecting a suitable sample data set, the sample data set may be automatically divided in a predetermined ratio to obtain the training data set and the verification data set, or manually divided by the user into the training data set and the verification data set in a desired ratio. For further example, the sample data set may first be divided into a training set and other data sets, and once the division is complete, the user may select a training set on a graphical interface such as that shown in FIG. 10. Then, the selected training set may be further divided automatically into a training data set and a verification data set according to a predetermined ratio, and the data volumes of the two sets may be displayed.

At step 2430, a training parameter is configured according to feature information of the sample data set, and a training parameter display interface is generated. The training parameter displayed in the training parameter display interface includes a test strategy, the test strategy includes at least two numbers of training rounds, and the feature information includes a number of samples in the sample data set. For example, the test strategy may include a number of tests and a number of rounds when testing. The training parameter may include, in addition to the test strategy, a learning rate descent strategy, a total number of training rounds, and the like. Further, for example, configuring the training parameter based on the feature information of the sample data set may include one or more of: configuring the learning rate descent strategy, the total number of training rounds and the testing strategy based on the number of samples in the feature information, configuring the size of the input image input into the deep learning model to be trained based on the size, type and the like of the image in the sample data set, and (in the example scenario involving the product defect mentioned above) configuring the confidence in the training process based on the number of samples corresponding to the various defects and the defect level, and the like. A specific embodiment may refer to the previous description in step 1730, which will not be repeated herein.

In an example embodiment of the present disclosure, after configuring the above training parameter according to the above feature information, a training parameter display interface may also be generated and a parameter modification symbol is provided on the training parameter display interface. After the user triggers the above parameter modification symbol, a modifiable parameter may be displayed and the user may modify the above configured training parameter on the modification interface.

At step 2440, a deep learning model is trained according to the training parameter by using the training data set to obtain at least two trained models. The at least two trained models correspond to the at least two numbers of training rounds respectively. For example, the trained model may be the image classification model mentioned in the previous embodiments, which may be used to predict a category based on the input image and to obtain a confidence corresponding to that category.

In some embodiments, the deep learning model may be a convolutional neural network (CNN) model, a target detection convolutional neural network (faster-RCNN) model, a recurrent neural network (RNN) model, a generative adversarial network (GAN) model, and a self-attention model, which however is not limited thereto, and other neural network models known to those skilled in the art may also be used.

In some embodiments, as previously described, the training parameter for training the deep learning model may be configured in advance, and the training parameter may include a category for training, a type of the deep learning model, a total number of training rounds, a learning rate descent strategy, a test strategy, a size of the image input into the deep learning model and the like. In addition, two or more numbers of training rounds may be specified in the training parameter such that the trained models with corresponding numbers of training rounds may be stored as alternative models, and a superior model may be selected from these alternative models as the target model during subsequent test. For example, the number of training rounds may be specified directly by the person performing the model training based on experience, or, the number of model training rounds to be stored may be specified indirectly based on a certain parameter, for example, based on a case where the learning rate descends and the like. For example, if the effect of the model is good when the learning rate descends for a second time, several numbers of training rounds around the number of rounds when the learning rate descends for the second time may be selected. It should be understood that it may also specify the number of model training rounds to be stored based on other indexes according to actual needs.

At step 2450, the at least two trained models are tested by using the verification data set to generate a verification test result. The verification test result may include the output category of the model and the confidence of the corresponding category. The images in the verification data set may be input to each trained model in turn, and the output category of the model and the corresponding confidence may be stored.

At step 2460, a verification test index display interface is generated based on the verification test result. The verification test index display interface is configured to display at least one of a confusion matrix, an accuracy rate, a recall rate and an F1 score. The accuracy rate represents a ratio of the number of images with a corresponding category being correctly predicted to the number of images with the corresponding category being predicted, the recall rate represents a ratio of the number of images with a corresponding category being correctly predicted to the true number of images with the corresponding category, and the F1 score may be considered as a harmonic average of the accuracy rate and the recall rate, i.e., (2*accuracy rate*recall rate)/ (accuracy rate+recall rate). If there are n predicted categories in the model, the confusion matrix may be a matrix of n*n. Each column of the matrix represents the category predicted by the model, and the total number in each column represents the number of images with that category being predicted. Each row represents the true category of the image, i.e., the category in the label, and the total number in each row represents the true number of images with that category. In addition, the confusion matrix may include an unknown column, which may include the number of images for which the model did not predict a category. One or more of the above verification test indexes may be generated based on the category and the confidence of the category in the verification test result and the category in the image label in the verification data set.

Figures 25A, 25B:
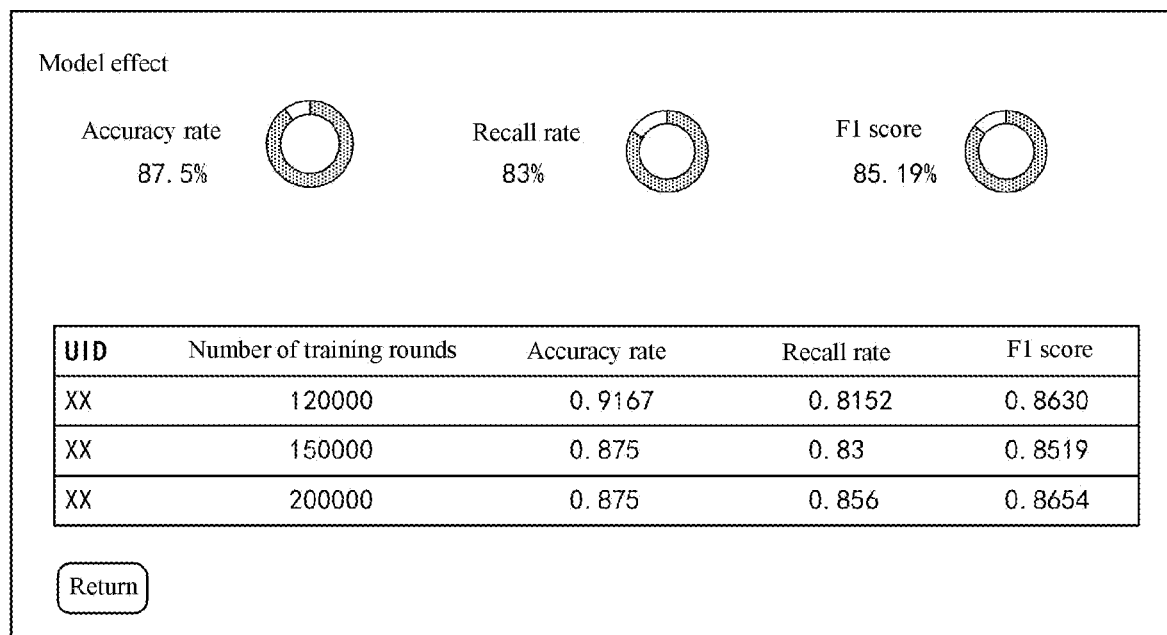
FIGS. 25A and 25B illustrate schematic views of an index display interface according to an embodiment of the present disclosure.

As an example, the user may view the accuracy rate, recall rate and/or F1 score of each trained model on a graphical interface 2500A as shown in FIG. 25A. Optionally, the accuracy rate, recall rate, F1 score and the like of the model may be displayed more visually by means of a pie chart, an annular chart and the like. For example, the user may click on the corresponding symbol associated with the trained model (e.g., UID on the interface) to view a graphical presentation of the accuracy rate, recall rate, F1 score and the like for the corresponding model.

As an example, the user may view the confusion matrix for one or more trained models on the graphical interface 2500B as shown in FIG. 25B. Optionally, in addition to the confusion matrix, the graphical interface 2500B may also display other index parameters such as accuracy rate, recall rate and the like for the corresponding model.

At step 2470, a model selected by the user is determined as the target model in response to a selection operation by the user for the at least two trained models. For example, the user may be presented with the aforementioned verification test index, and the user may refer to these verification test indexes to select one of the at least two trained models as the target model based on actual application requirements. In addition, for example, one of the at least two trained models may be automatically selected as the target model based on these verification test indexes according to a predetermined selection mechanism.

It should be understood by those skilled in the art, the accuracy rate index is important in the training process of the deep learning model. However, the applicant has found that for a specific application scenario, it is often necessary to consider the performance of the model from different dimensions, rather than just a single index such as the accuracy rate. For example, in the application scenario of screen defect detection, different defect categories may have different priorities. For example, the priority of a screen being scratched may be much higher than that of a screen being stained, as the stain can be washed away, but the screen being scratched must be scrapped. Thus, generating the multi-dimensional verification test indexes based on the verification data set may make the verification data set to function fully, show the training effect of the model more comprehensively, and assist the selection of the target model more effectively, thereby improving the fit of the selected target model to the need of the specific application scenario.

As an example, an interface for selecting the target model from the at least two trained models may be provided, enabling the user to select the corresponding model as the target model by clicking thereon.

In method 2400 for determining the target model, the labeled sample data set is divided to obtain the training data set and the verification data set, two or more trained models are obtained by training with the training data set, and the two or more trained models are tested by using the verification data set to generate and display a verification test index display interface for displaying a multi-dimensional verification test index, so that the target model is allowed to be selected from the two or more trained models according to the verification test index. In this way, in comparison with the solution in the related art, the displaying of the multi-dimensional verification test index allows for a more complete utilization of the verification data set, and at the same time, provides a more comprehensive assessment and presents the training effect of each model to the user, thereby assisting in the selection of the target model that is more suitable for a specific application need. Therefore, the prediction performance and the reliability of prediction function of the final target model may be improved, and thus the classification performance of the entire classification system may be improved. For example, when the method is applied to the field of product defect detection, a more suitable target model may be selected more flexibly according to the specific needs, thereby effectively improving the detection effect of the product defect detection system.

In some embodiments, the method 2400 for determining the target model shown in FIG. 24 may further include: generating, in response to an offline test task creation operation by the user for the target model, an offline test parameter configuration interface; creating an offline test task according to a configuration input by the user on the offline test parameter configuration interface; acquiring an offline test data set according to the configuration input, the offline test data set including a plurality of sample images which have been labeled with the category; and testing the target model by using the offline test data set to generate an offline test result.

For example, a button for creating an offline test task may be provided on the graphical interface, or a corresponding physical button or key may be designed. When the user clicks on the button, an offline test parameter configuration interface may be displaced. As an example, an offline test task creation interface 2600 may be displayed as shown in FIG. 26, on which the user may configure an offline test parameter, for example, select a task site, a product model number, a data set for offline test, an identification of the model for offline test and the like. After the user clicks the "submit task" button, an offline test task may be created based on the user configuration, and a corresponding offline test data set may be used to test the target model and generate an offline test result.

In some embodiments, the confidence threshold for at least one category may be updated by based on the verification test result or the offline test result, determining a recommended confidence threshold for each category according to the accuracy rate or the recall rate; updating the confidence threshold for at least one category based on the recommended confidence threshold; and generating a confidence threshold display interface in response to a view operation of the user on the confidence threshold. As an example, the user may view the recommended confidence threshold or the current confidence threshold for each trained model on the graphical interface 2700 as shown in FIG. 27. As show in FIG. 27, the confidence threshold for each category may be displayed in a manner of table. Alternatively, the confidence threshold may be displayed in other manners.

In some embodiments, the confidence threshold for at least one category may be updated by generating, based on the verification test result or the offline test result, a curve display interface configured to display an accuracy curve and a recall curve for each category, the accuracy curve reflecting a relationship between the accuracy rate and a confidence threshold, and the recall curve reflecting a relationship between the recall rate and the confidence threshold; and updating the confidence threshold for at least one category in response to a modification operation of the user on the confidence threshold for the at least one category.

Figure 28:
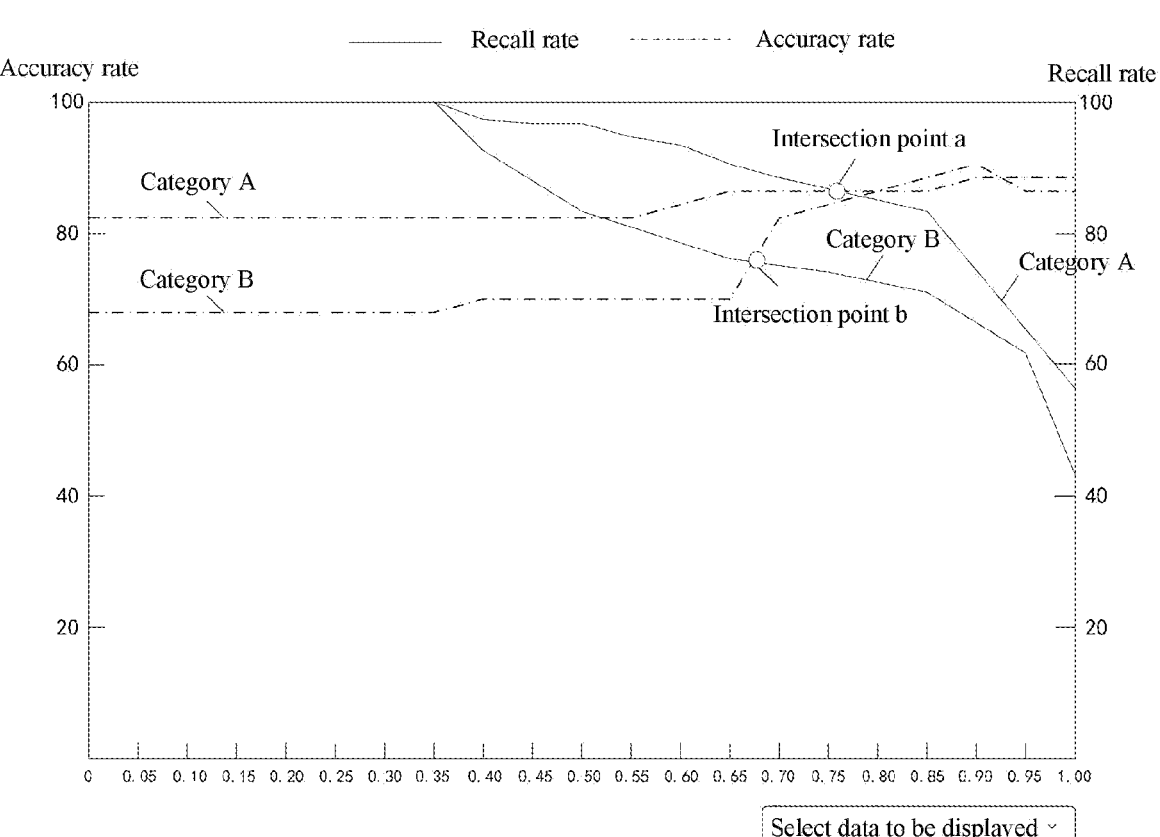
FIG. 28 illustrates a schematic view of a curve display interface according to an embodiment of the present disclosure.

As an example, the user may view the accuracy curve and the recall curve for each category on the graphical interface 2800 as shown in FIG. 28. The accuracy curve and recall curve may be displayed in the same graph, or the accuracy curve and recall curve may be displayed in two separate graphs. For example, based on the categories in the true labels of the images in the offline test data set and the categories output by the target model, the accuracy rate and the recall rate may be calculated separately for each category by setting 20 different confidence thresholds from 0 to 1 with 0.05 interval, and then the accuracy curve and the recall curve shown in FIG. 28 are plotted (which are plotted as the line chart in FIG. 28). Thus, by observing the accuracy curve and the recall curve, the user may determine an appropriate confidence threshold for each category based on operational needs and experience, and modify the confidence threshold for one or more categories based on the result determined. As a further example, generally, the intersection point of the recall curve and the accuracy curve is the most appropriate confidence threshold, for example, the intersection point a of the accuracy curve and the recall curve for the category A and the intersection point b of the accuracy curve and the recall curve for the category B shown in FIG. 28. The user may observe the accuracy curves and the recall curves for different categories and make final adjustments to the confidence thresholds in view of the operations.

As an example, the user may modify the confidence threshold for each category on the graphical interface 2900 as shown in FIG. 29. For example, the user may be provided with a variety of ways to modify the confidence threshold, for example, by direct input, by modification through an increasing or reducing button, and the like.

In some embodiments, the confidence threshold for at least one category may be updated by generating, based on the offline test result, an offline test index display interface configured to display at least one of the accuracy rate, the recall rate, the F1 score, the confusion matrix, a distribution of a model output number and a true number for each category, and a confidence distribution for each category; and updating the confidence threshold for at least one category in response to a modification operation of the user on the confidence threshold for the at least one category.

Figure 30:
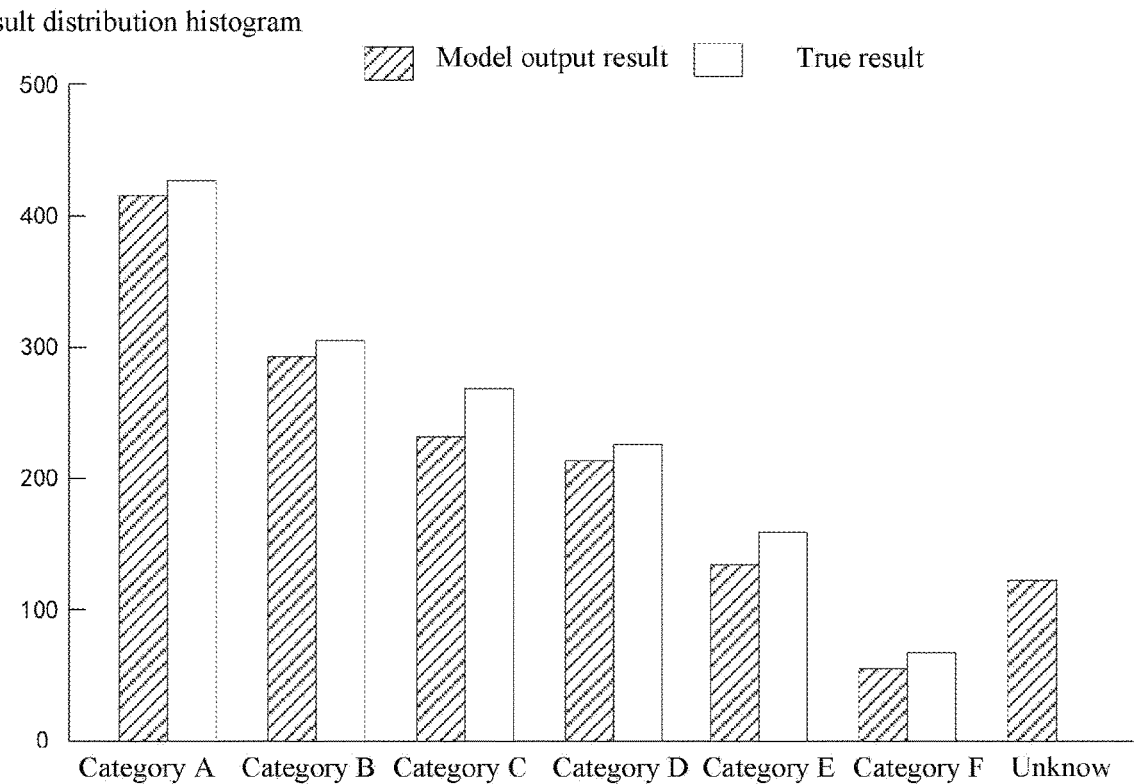
FIG. 30 illustrates a schematic view of a result distribution interface according to an embodiment of the present disclosure.

As an example, the user may view the distribution of the model output number and the true number for each category on the graphical interface 3000 as shown in FIG. 30. As shown in FIG. 30, the model output number and the true number for each category may be displayed in the form of a histogram. For each category, the model output number refers to the number of images with that category being output by the model, the true number refers to the number of images being labeled with that category. Optionally, the number of images with an unknown category, i.e., the number of images with no category assigned by the target model, may be displayed. With this histogram, the user may visually observe the difference between the model output number and the true number for each category.

Figures 31, 32:
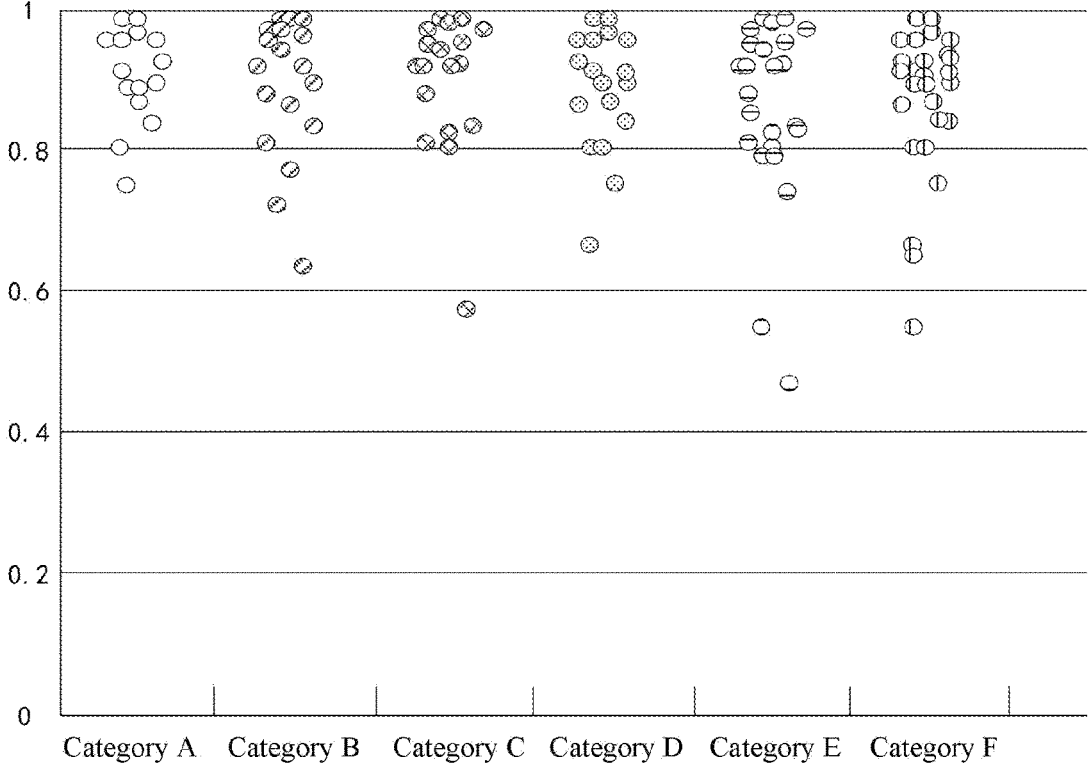
FIG. 31 illustrates a schematic view of a confidence distribution interface according to an embodiment of the present disclosure.
FIG. 32 illustrates a schematic view of a confusion matrix display interface according to an embodiment of the present disclosure.

As an example, the user may view the confidence distribution for each category on the graphical interface 3100 as shown in FIG. 31. As shown in FIG. 31, the confidence distribution for each category may be displayed in the form of a scatter diagram, on which each dot may represent the confidence score of the target model output for a particular image for the corresponding category. With this scatter diagram, the user may visually observe the confidence distribution for each category, which may be useful in setting an appropriate confidence threshold.

As an example, the user may view the accuracy rate, recall rate, confusion matrix and the like on the graphical interface 3200 as shown in FIG. 32.

Similarly, as an example, the user may modify the confidence threshold for each category on the graphical interface 2900 as shown in FIG. 29.

In some embodiments, an error result display interface may also be provided for the user to view image data being incorrectly predicted. That is, the error result display interface may be generated based on the offline test result, and the error result display interface is configured to display data where a model output category is inconsistent with a true category As an example, the user may view the date being incorrectly predicted on the graphical interface 3300 as shown in FIG. 33. For example, as shown in FIG. 33, the volume of data being incorrectly predicted in each category may be displayed on the left of the interface, for example, the volume of data that shall be labelled category A but predicted to be another category may be displayed. When the user selects viewing for a category, a specific image with that category being incorrectly may be displayed on the right of the interface. By viewing the images being incorrectly predicted, the user may get which categories these images are more likely to be incorrectly assigned to, possible reasons why these images are incorrectly predicted and the like. This provides more data to support the fine adjustment of the confidence threshold and helps to further improve the prediction performance of the target model.

In some embodiments, in order to display in real time the impact of updating the confidence threshold on the prediction effect of the model, so as to assist the user in determining whether to adopt the updated confidence threshold or whether to further modify the confidence threshold, a new index display interface may be generated based on the offline test result after the confidence threshold is updated, in order to display at least one of the accuracy rate, the recall rate, the F1 score, the confusion matrix, the distribution of the model output number and the true number for each category, and the confidence distribution for each category.

For example, one or more of the various indexed described above may be displayed on a graphical interface similar to that shown in FIGS. 30 to 32.

In some embodiments, the offline test parameter configuration interface may include a data set selection option. In such embodiment, in response to a selection operation performed by the user through the data set selection option, the offline test data set may be acquired based on the sample data set corresponding to the selection operation.

For example, an existing data set may be selected on the graphical interface 2700 as shown in FIG. 27 by selecting a data set name, a data set version and the like. For example, a subset of the sample data set used in the training of the target model may be selected to form the offline test data set.

In some embodiments, the offline test parameter configuration interface may include a data set upload option. In such embodiment, an input sample data set may be received in response to an upload operation performed by the user through the data set upload option; and the offline test data set may be acquired based on the input sample data set.

For example, the data set upload option may be provided on the graphical interface 2700 as shown in FIG. 27, enabling the user to construct an offline test data set by uploading an input sample data set. Alternatively, a separate data set upload option may be provided, and after a data set is uploaded, the user may select the uploaded data set on the graphical interface 2700 as shown in FIG. 27. For example, an input sample data set may be constructed based on labeled production line image data to test the generalization capability of the target model and also to test the prediction effect of the target model on the production line data.

In some embodiments, the method 2400 for determining the target model shown in FIG. 24 may further include: generating, in response to an online test task creation operation by the user for the target model, an online test parameter configuration interface; creating an online test task according to a configuration input by the user on the online test parameter configuration interface; acquiring an online test data set based on the configuration input, the online test data set including a plurality of images of the target object which have not been labeled with the category; and testing the target model by using the online test data set to generate an online test index including at least one of the accuracy rate, the recall rate, the confusion matrix, a distribution of a model output number and a manual review number for each category, and a confidence distribution for each category. The method further includes one of: displaying an option for putting the target model online in response to the online test index meeting a predetermined criterion; and displaying the option for putting the target model online in response to at least some of the online test indexes being higher than corresponding test indexes of a relevant online model, the corresponding test index being obtained based on an output result of the relevant online model for the online test data set.

For example, one or more of the above online test indexes may be displayed on a graphical interface similar to that shown in FIGS. 30 to 32.

As an example, a graphical interface 3400A, 3400B for creating an online test task as shown in FIGS. 34A, 34B may be displayed to the user. The user may enter various configurations on the interface shown, such as task name, test type, task site, product model number, product number, data volume for test and the like. The data volume for test may be selected for example by LOT_ID and GLS_COUNT, where LOT_ID may indicate data for a single batch, and GLS_COUNT may indicate data captured for one glass panel.

In some embodiments, similar to that shown in FIG. 34A, the online test parameter configuration interface may include an option for putting a new model online. In such embodiment, a communication connection is established with an image acquiring device in response to a selection operation of the user on the option for putting the new model online, the image acquiring device being configured to acquire a to-be-tested image of the target object. The to-be-tested image of the target object may be received from the image acquiring device through the communication connection. The online test data set may be acquired based on the to-be-tested image received.

In some embodiments, similar to that shown in FIG. 34B, the online test parameter configuration interface may include a model update option. In such embodiment, in response to a selection operation of the user on the model update option, the online test data set may be acquired based on an image received by the relevant online model. The relevant online model is configured to receive a to-be-tested image of the target object from an image acquiring device and to predict the category of the to-be-tested image based on the to-be-tested image received.

For example, different configuration options may be displayed for the model being-online test and the model update test. For example, as shown in FIG. 34A, for the model being-online test, a mainCode model and a subCode model to be tested are selected; as shown in FIG. 34B, for the model update test, the mainCode model and the subCode model may be optionally tested. In the above description, the mainCode model may be for defect forms identified by pattern type and the subCode model may be for defect forms identified by repair process. In addition, other types of model configuration options may be set depending on the specific application requirements.

How to determine whether a target model is to be put online has been described in the previous embodiment with reference to FIG. 19 and will not be repeated here.

In some embodiments, the method 2400 for determining the target model shown in FIG. 24 may further include: generating a being-online audit interface in response to a selection operation of putting the target model online by the user; and putting the target model online in response to a confirmation operation by the user on a being-online audit, such that the target model is configured to receive a to-be-tested image of the target object from an image acquiring device and to predict the category of the to-be-tested image based on the to-be-tested image received.

As an example, the user may be presented with an interface 3500 as shown in FIG. 35, on which the user may select a model number of a model to be put online, a corresponding product code, a corresponding site and other information to initiate a being-online audit request. A relevant audit person may then view the being-online audit interface associated with that model and may pass or reject the request. For example, there may be two levels of audit interface. That is, after a first level of audit person has passed the audit, the model may be audited by a second level of audit person, and after both levels of audit have been passed, the model may be officially put online.

As an example, the user may view information about all models that have been put online on the graphical interface 3600 as shown in FIG. 36, and may perform operations on one or more of the models as required, such as changing the model, viewing the confidence threshold, modifying the confidence threshold, backing to the previous version, putting the model offline, synchronizing data and the like.

In some embodiments, the method 2400 for determining the target model shown in FIG. 24 may further include: generating a monitoring task parameter configuration interface in response to a monitoring task creation operation by the user for the target model that has been put online; creating a monitoring task according to a configuration input by the user on the monitoring task parameter configuration interface; according to the configuration input, acquiring online spot check data based on the to-be-tested image of the target object from the image acquiring device; receiving a manual review result for the online spot check data, the manual review result including the category of the to-be-tested image obtained by a manual review; and generating, based on the manual review result and the category predicted by the target model, an online spot check index, the online spot check index including at least one of the accuracy rate, the recall rate, the confusion matrix, the distribution of the model output number and the manual review number for each category, and the confidence distribution for each category.

For example, one or more of the above online spot check indexes may be displayed on a graphical interface similar to that shown in FIGS. 30 to 32.

As an example, the user may view and manage all created monitoring tasks on the graphical interface 3700 as shown in FIG. 37. For example, it is possible to view one or more monitoring tasks, enter or view the model assessments, rereview the model, view the result distribution, view the review result, delete the task and the like on the graphical interface 3700. Furthermore, the user may create a new monitoring task using a button such as "Creation task". As an example, the user may be presented with a monitoring task creation interface 3800 as shown in FIG. 38. For example, the user may configure various parameters of the monitoring task on this interface, such as time period of the monitoring task, site, product model number, product number, label group, selection of whether or not to acquire the operator (OP) result, selection of whether or not to acquire the model result, selection of data for the monitoring task, code, purpose of task creation and the like. A corresponding monitoring task may then be created based on the configuration input of the user. The created monitoring task may be for example be viewed and managed on the graphical interface 3700 shown in FIG. 37.

With respect to the method 2400 for determining the target model shown in FIG. 24, it may have embodiments identical or similar to the various embodiments described with reference to FIGS. 17 to 23, in addition to the various embodiments described previously with reference to the graphical interface in FIGS. 25 to 38, which will not be repeatedly described herein.

Figures 39, 40:
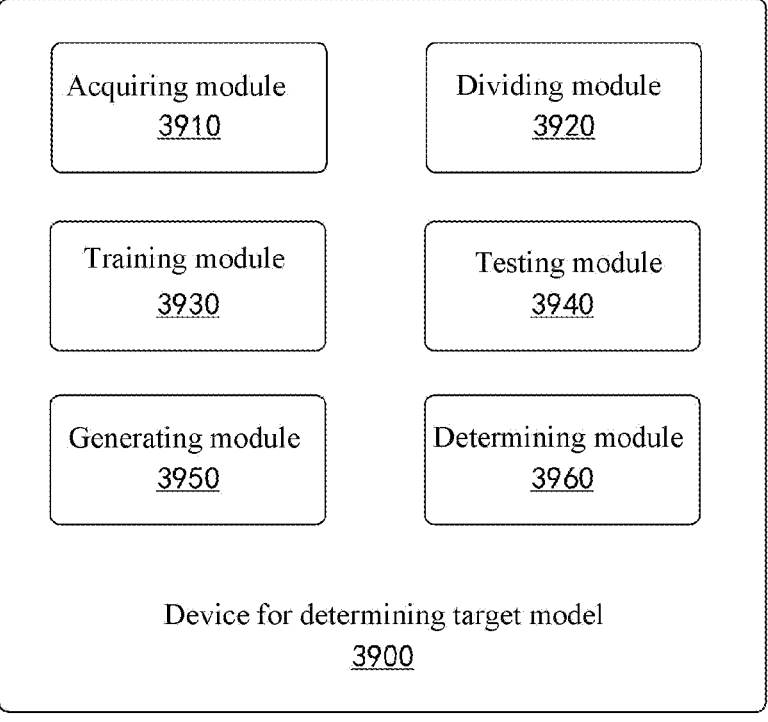
FIG. 39 illustrates an exemplary structure block diagram of a device for determining a target model according to an embodiment of the present disclosure.
FIG. 40 illustrates an exemplary structure block diagram of a device for determining an image category according to an embodiment of the present disclosure.

FIG. 39 illustrates a block diagram of an exemplary structure of a device 3900 for determining a target model according to an embodiment of the present disclosure. As shown in FIG. 39, the device 3900 for determining the image category includes an acquiring module 3910, a dividing module 3920, a training module 3930, a testing module 3940, a generating module 3950, and a determining module 3960.

The acquiring module 3910 may be configured to acquire a sample data set, the sample data set including a plurality of sample images that have been labeled with a category, and the sample images being images of a target object. The dividing module 3920 is configured to divide the sample data set to obtain a training data set and a verification data set. The training module 3930 is configured to train a deep learning model by using the training data set to obtain, according to different numbers of training rounds, at least two trained models. The testing module 3940 is configured to test the at least two trained models by using the verification data set to generate a verification test result. The generating module 3950 is configured to generate, based on the verification test result, a verification test index, the verification test index including at least one of a confusion matrix, an accuracy rate, a recall rate and an F1 score. The determining module 3960 is configured to determine, according to the verification test index, the target model from the at least two trained models.

FIG. 40 illustrates a block diagram of an exemplary structure of a device 4000 for determining an image category according to an embodiment of the present disclosure. As shown in FIG. 40, the device 4000 for determining the target model includes a predicting module 4010.

The predicting module 4010 may be configured to predicting a to-be-tested image of a target object using a target model to obtain a category of the to-be-tested image. The target model is determined from at least two trained models according to a verification test index, the at least two trained models have different numbers of training rounds, and the verification test index includes at least one of a confusion matrix, an accuracy rate, a recall rate and an F1 score.

Figure 41:
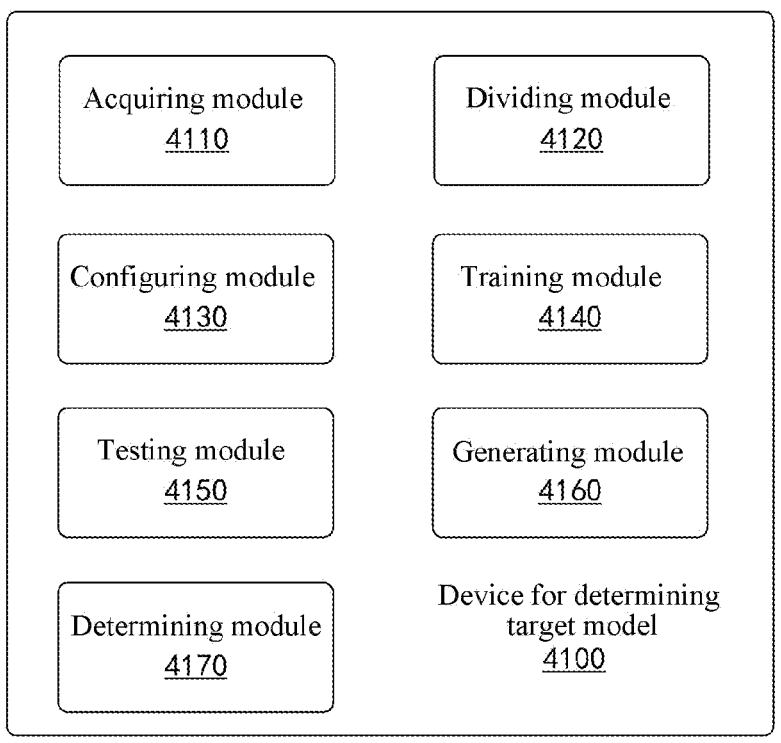
FIG. 41 illustrates an exemplary structure block diagram of a device for determining a target model according to an embodiment of the present disclosure.

FIG. 41 illustrates a block diagram of an exemplary structure of a device 4100 for determining a target model according to an embodiment of the present disclosure. As shown in FIG. 41, the device 4100 for determining the target model includes an acquiring module 4110, a dividing module 4120, a configuring module 4130, a training module 4140, a testing module 4150, a generating module 4160, and a determining module 4170.

The acquiring module 4110 may be configured to acquire, in response to a configuration operation of a user on a sample data set, the sample data set, the sample data set including a plurality of sample images that have been labeled with a category, and the sample images being images of a target object. The dividing module 4120 may be configured to divide the sample data set to obtain a training data set and a verification data set. The configuring module 4130 may be configured to configure a training parameter according to feature information of the sample data set, and generate a training parameter display interface, the training parameter displayed in the training parameter display interface including a test strategy, the test strategy including at least two numbers of training rounds, and the feature information including a number of samples in the sample data set. The training module 4140 may be configured to train, according to the training parameter, a deep learning model by using the training data set to obtain at least two trained models, the at least two trained models corresponding to the at least two numbers of training rounds respectively. The testing module 4150 may be configured to test the at least two trained models by using the verification data set to generate a verification test result. The generating module 4160 may be configured to generate, based on the verification test result, a verification test index display interface, the verification test index display interface being configured to display at least one of a confusion matrix, an accuracy rate, a recall rate and an F1 score. The determining module 4170 may be configured to determine, in response to a selection operation by the user for the at least two trained models, a model selected by the user as the target model.

Figure 42:
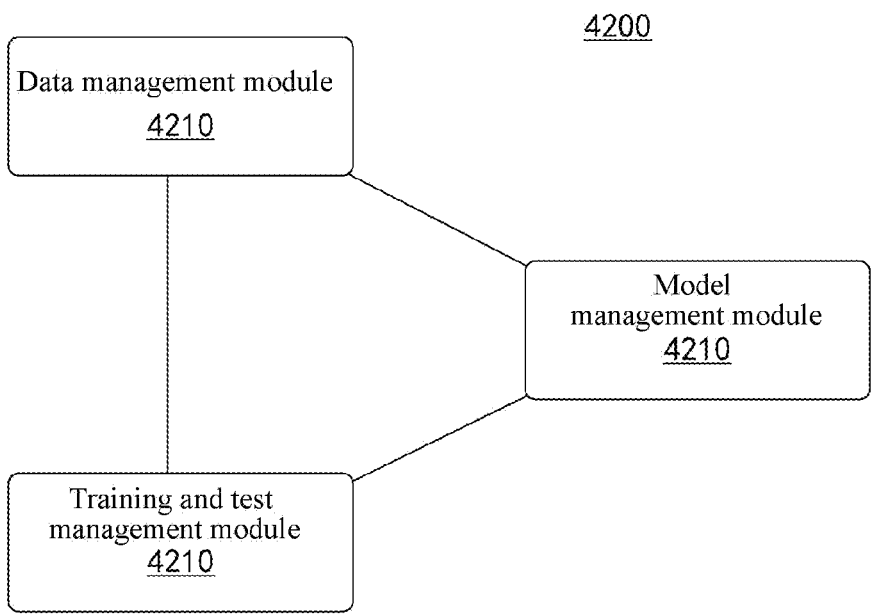
FIG. 42 illustrates an exemplary block diagram of a system for determining an image category according to an embodiment of the present disclosure.

FIG. 42 illustrates a block diagram of an exemplary structure of a system 4200 for determining an image category according to an embodiment of the present disclosure. As shown in FIG. 42, the system 4200 for determining the image category includes a data management module 4210, a training and test management module 4220, and a model management module 4230.

The data management module 4210 may be configured to store and manage sample data; the training and test management module 4220 may be configured to perform the method 1700 for determining the target model, the method 2300 for determining the image category, or the method 2400 for determining the target model as described according to various embodiments hereinbefore; and the model management module 4230 is configured to store, display, and manage the target model.

The specific details of the modules in the device or system described above are described in detail in the method embodiments, and undisclosed details may be found in the method embodiments and are therefore not repeated herein.

Those skilled in the art may understand that various aspects of the present disclosure may be implemented as systems, methods or program products. As such, the various aspects of the present disclosure may be specifically implemented in the form of a full hardware implementation, a full software implementation (including firmware, microcode and the like), or a combination implementation of hardware and software, which may be collectively referred to herein as a "circuit", "module" or "system".

The present disclosure provides a computer readable storage medium having computer readable instructions stored thereon that, when being executed, implement any of the above methods.

The present disclosure provides a computer program product or computer program including computer instructions that are stored in the computer readable storage medium. A processor of a computing device reads the computer instructions from the computer readable storage medium, and the processor executes the computer instructions such that the computing device performs any of the methods provided in the various optional embodiments described above.

It should be noted that the computer-readable medium shown in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. A more specific example of computer readable storage media may include, but is not limited to, electrical connection with one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination thereof.

In the present disclosure, the computer-readable storage medium may be any tangible medium that contains or stores a program that may be used by or in conjunction with an instruction execution system, apparatus, or device. In the present disclosure, however, the computer-readable signal medium may include a data signal propagated in baseband or as part of a carrier wave with computer-readable program code embodied thereon. Such propagated data signals may take a variety of forms, including but not limited to electromagnetic signal, optical signal, or any suitable combination thereof. The computer-readable signal medium may also be any computer-readable medium other than a computer-readable storage medium, and the computer-readable medium can transmit, propagate, or send the program for use by or in connection with the instruction execution system, apparatus, or device. Program code embodied on the computer-readable medium may be transmitted using any suitable medium including, but not limited to, wireless, wireline, optical fiber cable, RF or any suitable combination thereof.

Furthermore, the program code for performing the operations of the present disclosure may be written in any combination of one or more programming languages, including object-oriented programming languages such as Java, C++, as well as conventional procedural programming languages such as C language or similar programming language. The program code may be executed entirely on a user computing device, partly on the user device, as a stand-alone software package, partly on the user computing device and partly on a remote computing device, or entirely on the remote computing device or server. Where the remote computing device is involved, the remote computing device may be connected to the user computing device over any kind of network, including a local area network (LAN) or a wide area network (WAN), or may be connected to an external computing device, e.g., via the Internet provided by an Internet service provider.

Those skilled in the art may easily obtain other embodiments of the present disclosure upon consideration of the specification and practice of the invention disclosed herein. The present application is intended to cover any variations, uses, or adaptations of the present disclosure that follow the general principles of the present disclosure and include the common knowledge or techniques in the technical field not disclosed by the present disclosure. The specification and examples are to be regarded as exemplary only, with the true scope and spirit of the present disclosure being indicated by the claims.

It is to be understood that the present disclosure is not limited to the precise structures described above and illustrated in the accompanying drawings, and that various modifications and changes may be made without departing from the scope thereof. The scope of the present disclosure is limited only by the appended claims.

It should be understood that, for the sake of clarity, embodiments of the present disclosure are described with reference to different functional units. However, it will be apparent that, without departing from the present disclosure, the functionality of each functional unit may be implemented in a single unit, implemented in multiple units or implemented as part of other functional units. For example, functionality illustrated as being performed by a single unit may be performed by a plurality of different units. Thus, reference to a particular functional unit is considered to be a reference only to the appropriate unit used to provide the described functionality, and does not indicate a strictly logical or physical structure or organization. Thus, the present disclosure may be implemented in a single unit or may be physically and functionally distributed between different units and circuits.

It will be understood that although the terms first, second, third and the like may be used herein to describe various devices, components, parts or portions, such devices, components, parts or portions should not be limited by these terms. These terms are used only to distinguish one device, component, part or portion from another device, component, part or portion.

Although the present disclosure has been described in connection with a number of embodiments, it is not intended to be limited to the particular form set forth herein. Rather, the scope of the present disclosure is limited only by the appended claims. Additionally, while individual features may be included in different claims, these may be advantageously combined, and the inclusion in different claims does not imply that the combination of features is not feasible and/or advantageous. The order of the features in the claims does not imply that the features must be in any particular order in which they work. Furthermore, in the claims, the word "include" does not exclude other elements and the terms "a" or "an" do not exclude more than one. The reference numerals in the claims are provided as explicit examples only and should not be construed as limiting the scope of the claims in any way.

What is claimed is:

1. A method for determining a target model, comprising:
acquiring a sample data set, the sample data set comprising a plurality of sample images that have been labeled with a category, and the sample data set comprising a training data set and a verification data set;
training a same deep learning model by inputting the training data set into the same deep learning model to obtain at least two trained models, wherein the at least two trained models correspond to different numbers of training rounds of the same deep learning model;
testing the at least two trained models by inputting the verification data set into the at least two trained models respectively to generate a verification test result;
generating, based on the verification test result, a verification test index, the verification test index comprising a confusion matrix, an accuracy rate, a recall rate and an F1 score;
generating and displaying a verification test index display interface configured to display the confusion matrix, the accuracy rate, the recall rate and the F1 score of the verification test index; and
determining, according to the verification test index, the target model from the at least two trained models.

2. The method according to claim 1, further comprising:
acquiring an offline test data set, the offline test data set comprising at least one of a subset obtained by dividing the sample data set or an input sample data set provided by a user, and the input sample data set comprising a plurality of sample images which have been labeled with a category; and
testing the target model by using the offline test data set to generate an offline test result.

3. The method according to claim 2, further comprising:
generating, based on the verification test result or the offline test result, an accuracy curve and a recall curve for at least one category, the accuracy curve reflecting a relationship between the accuracy rate and a confidence threshold, and the recall curve reflecting a relationship between the recall rate and the confidence threshold; and
updating, according to the accuracy curve and the recall curve, the confidence threshold for the at least one category.

4. The method according to claim 3, wherein the updating, according to the accuracy curve and the recall curve, the confidence threshold for the at least one category comprises:
updating the confidence threshold for the at least one category according to an intersection point of the accuracy curve and the recall curve.

5. The method according to claim 2, further comprising:
based on the verification test result or the offline test result, determining a recommended confidence threshold for each category according to the accuracy rate or the recall rate; and
updating a confidence threshold for at least one category based on the recommended confidence threshold.

6. The method according to claim 5, further comprising:

generating, based on the offline test result, an offline test index, the offline test index comprising at least one of the accuracy rate, the recall rate, the F1 score, the confusion matrix, a distribution of a model output number and a true number for each category, or a confidence distribution for each category; and updating the confidence threshold for the at least one category according to the offline test index.

7. The method according to claim 6, further comprising:

according to an updated confidence threshold, generating, based on the offline test result, at least one of the accuracy rate, the recall rate, the F1 score, the confusion matrix, the distribution of the model output number and the true number for each category, or the confidence distribution for each category.

8. The method according to claim 1, further comprising:

acquiring an online test data set, the online test data set comprising a plurality of images of a target object that have not been labeled with the category; and testing the target model by using the online test data set to generate an online test index, the online test index comprising at least one of the accuracy rate, the recall rate, the confusion matrix, a distribution of a model output number and a manual review number for each category, or a confidence distribution for each category, and wherein the method further comprises:

putting the target model online in response to the online test index meeting a predetermined criterion; or putting the target model online in response to at least some online test indexes being higher than a corresponding test index of a relevant online model, wherein the corresponding test index is obtained based on an output result of the relevant online model for the online test data set.

9. The method according to claim 8, further comprising:

updating the target model by retraining or adjusting a confidence threshold in response to the online test index not meeting the predetermined criterion; or updating the target model by retraining or adjusting the confidence threshold in response to the online test index being not higher than the corresponding test index of the relevant online model.

10. The method according to claim 1, wherein the determining, according to the verification test index, the target model from the at least two trained models comprises:

determining the target model from the at least two trained models according to the F1 score.

11. The method according to claim 10, wherein the determining, according to the verification test index, the target model from the at least two trained models comprises:

determining whether the target model determined satisfies a predetermined requirement according to the confusion matrix; and updating the target model by retraining or adjusting a confidence threshold in response to the target model determined not satisfying the predetermined requirement.

12. A method for determining a target model comprising:

acquiring, in response to a configuration operation of a user on a sample data set, the sample data set, the sample data set comprising a plurality of sample images that have been labeled with a category, and the sample data set comprising a training data set and a verification data set;

configuring a training parameter according to feature information of the sample data set, and generating and displaying a training parameter display interface, the training parameter displayed in the training parameter display interface comprising a test strategy, the test strategy comprising at least two numbers of training rounds, and the feature information comprising a number of samples in the sample data set;

training, according to the training parameter, a same deep learning model by inputting the training data set into the same deep learning model to obtain at least two trained models, the at least two trained models corresponding to the at least two numbers of training rounds respectively;

testing the at least two trained models by inputting the verification data set into the at least two trained models respectively to generate a verification test result;

generating and displaying, based on the verification test result, a verification test index display interface, the verification test index display interface being configured to display a confusion matrix, an accuracy rate, a recall rate and an F1 score; and determining, in response to a selection operation by the user for the at least two trained models, a model selected by the user as the target model.

13. The method according to claim 12, further comprising:

generating, in response to an offline test task creation operation by the user for the target model, an offline test parameter configuration interface;

creating an offline test task according to a configuration input by the user on the offline test parameter configuration interface;

acquiring an offline test data set according to the configuration input, the offline test data set comprising a plurality of sample images which have been labeled with the category; and testing the target model by using the offline test data set to generate an offline test result.

14. The method according to claim 13, further comprising:

generating, based on the verification test result or the offline test result, a curve display interface configured to display an accuracy curve and a recall curve for each category, the accuracy curve reflecting a relationship between the accuracy rate and a confidence threshold, and the recall curve reflecting a relationship between the recall rate and the confidence threshold; and updating a confidence threshold for at least one category in response to a modification operation of the user on the confidence threshold for the at least one category.

15. The method according to claim 13, further comprising:

based on the verification test result or the offline test result, determining a recommended confidence threshold for each category according to the accuracy rate or the recall rate;

updating a confidence threshold for at least one category based on the recommended confidence threshold; and generating a confidence threshold display interface in response to a view operation of the user on the confidence threshold.

16. The method according to claim 13, further comprising:

generating, based on the offline test result, an offline test index display interface configured to display at least one of the accuracy rate, the recall rate, the F1 score, the confusion matrix, a distribution of a model output number and a true number for each category, or a confidence distribution for each category; and updating a confidence threshold for at least one category in response to a modification operation of the user on the confidence threshold for the at least one category.

17. The method according to claim 13, further comprising:

generating, based on the offline test result, an error result display interface configured to display data where a model output category is inconsistent with a true category.

18. The method according to claim 12, further comprising:

generating, in response to an online test task creation operation by the user for the target model, an online test parameter configuration interface;

creating an online test task according to a configuration input by the user on the online test parameter configuration interface;

acquiring an online test data set based on the configuration input, the online test data set comprising a plurality of images of a target object which have not been labeled with the category; and testing the target model by using the online test data set to generate an online test index comprising at least one of the accuracy rate, the recall rate, the confusion matrix, a distribution of a model output number and a manual review number for each category, or a confidence distribution for each category, wherein the method further comprises:

displaying an option for putting the target model online in response to the online test index meeting a predetermined criterion; or displaying the option for putting the target model online in response to at least some online test indexes being higher than a corresponding test index of a relevant online model, wherein the corresponding test index is obtained based on an output result of the relevant online model for the online test data set.

19. A computing device, comprising:

a processor; and a memory, storing computer-executable instructions that, when being executed by the processor, cause the computing device to perform:

acquiring a sample data set, the sample data set comprising a plurality of sample images that have been labeled with a category, and the sample data set comprising a training data set and a verification data set;

training a same deep learning model by inputting the training data set into the same deep learning model to obtain at least two trained models, wherein the at least two trained models correspond to different numbers of training rounds of the same deep learning model;

testing the at least two trained models by inputting the verification data set into the at least two trained models respectively to generate a verification test result;

generating, based on the verification test result, a verification test index, the verification test index comprising a confusion matrix, an accuracy rate, a recall rate and an F1 score;

generating and displaying a verification test index display interface configured to display the confusion matrix, the accuracy rate, the recall rate and the F1 score of the verification test index; and determining, according to the verification test index, the target model from the at least two trained models.

20. A non-transitory computer-readable storage medium having computer-executable instructions stored thereon that, when being executed, execute the method according to claim 1.

* * * * *